US012466782B2

United States Patent
El Sheikh et al.

(10) Patent No.: US 12,466,782 B2
(45) Date of Patent: Nov. 11, 2025

(54) ARYLCYCLOHEXYLAMINE DERIVATIVES AND PROCESS FOR PREPARING SAME

(71) Applicant: Technische Hochschule Köln, Cologne (DE)

(72) Inventors: Sherif El Sheikh, Mülheim an der Ruhr (DE); Henrik Weber, Leverkusen (DE)

(73) Assignee: Technische Hochschule Köln, Cologne (DE)

( * ) Notice: Subject to any disclaimer, the term of this patent is extended or adjusted under 35 U.S.C. 154(b) by 519 days.

(21) Appl. No.: 17/909,131

(22) PCT Filed: Mar. 3, 2021

(86) PCT No.: PCT/EP2021/055284
§ 371 (c)(1),
(2) Date: Sep. 2, 2022

(87) PCT Pub. No.: WO2021/175901
PCT Pub. Date: Sep. 10, 2021

(65) Prior Publication Data
US 2023/0139975 A1  May 4, 2023

(30) Foreign Application Priority Data
Mar. 3, 2020  (DE) .................. 10 2020 105 700

(51) Int. Cl.
*C07C 211/35* (2006.01)
*C07D 213/16* (2006.01)
*C07D 237/08* (2006.01)
*C07D 239/26* (2006.01)
*C07D 241/12* (2006.01)
*C07D 333/20* (2006.01)

(52) U.S. Cl.
CPC .......... *C07C 211/35* (2013.01); *C07D 213/16* (2013.01); *C07D 237/08* (2013.01); *C07D 239/26* (2013.01); *C07D 241/12* (2013.01); *C07D 333/20* (2013.01)

(58) Field of Classification Search
CPC ... C07C 211/35; C07D 213/16; C07D 237/08; C07D 239/26; C07D 241/12; C07D 333/20
USPC .......................................... 514/183
See application file for complete search history.

(56) References Cited

U.S. PATENT DOCUMENTS 3,957,851 A  5/1976  Satzinger et al.
2021/0171487 A1  6/2021  Xue et al.

FOREIGN PATENT DOCUMENTS

WO  WO 2013/056229 A1  4/2013
WO  WO 2019/192602 A1  10/2019

OTHER PUBLICATIONS

International Preliminary Report on Patentability for International Application No. PCT/EP2021/055284, mailed Sep. 15, 2022.
Hassner, Alfred et al. "Addition of Iodine Isocyanate to Olefins. Scope and Synthetic Utility" Journal of Organic Chemistry, American Chemical Society, Washington; vol. 32, pp. 540-549; 1967.
Zanos, Panos et al. "NMDAR Inhibition-Independent Antidepressant Actions of Ketamine Metabolites" Nature, vol. 533(7604); pp. 481-486; 2016.
International Search Report for International Application No. PCT/EP2021/055284, mailed Jun. 4, 2021.
Written Opinion for International Application No. PCT/EP2021/055284, mailed Jun. 4, 2021.

*Primary Examiner* — Kristin A Vajda
(74) *Attorney, Agent, or Firm* — Sheridan Ross P.C.

(57) ABSTRACT

The present invention relates to the technical field of pharmaceutical synthesis and development of drugs, and to a process for preparing cyclic 2-amino-1-one derivatives and to the reaction products and intermediates obtainable by this process. The present invention further relates to pharmaceutical compositions, in particular drugs or medicaments, comprising the cyclic 2-amino-1-one derivatives and to their use as medicaments, in particular in the prophylactic or therapeutic treatment of diseases of the human or animal body, preferably of neurodegenerative diseases or psychiatric disorders.

9 Claims, 5 Drawing Sheets

ARYLCYCLOHEXYLAMINE DERIVATIVES AND PROCESS FOR PREPARING SAME

CROSS-REFERENCE TO RELATED APPLICATIONS

This application is a national stage application under 35 U.S.C. § 371 of PCT Application No. PCT/EP2021/055284 having an international filing date of 3 Mar. 2021, which designated the United States, which PCT application claimed the benefit of German Application No. 10 2020 105 700.8, filed 3 Mar. 2020, both of which are incorporated herein by reference in their entirety.

FIELD

The present invention relates to the technical field of pharmaceutical synthesis and drug development.

In particular, the present invention relates to a process for preparing cyclic 2-amino-1-one derivatives and to reaction products and intermediates obtainable by the process.

More particularly, the present invention relates to cyclic 3-ene-2-oxy-1-carboxylic acid derivatives and bicyclic carbamate derivatives as (intermediate) products of said process, and to cyclic 2-amino-1-one derivatives, in particular 2-aminocyclohexan-1-one derivatives or 2-aminocyclohexen-1-one derivatives, their tautomers, stereoisomers, salts or solutions, as final reaction products and active pharmaceutical ingredients.

Furthermore, the present invention relates to pharmaceutical compositions, in particular medicaments or drugs, comprising the cyclic 2-amino-1-one derivatives and their use as medicaments, in particular in the prophylactic or therapeutic treatment of diseases of the human or animal body, preferably neurodegenerative diseases or mental diseases, respectively.

BACKGROUND

The term neurodegenerative disease covers a large number of diseases characterized by a gradual loss of synaptic or neuronal plasticity of nerve cells of the central nervous system. This progressive alteration of nerve cells also successively leads to a change in the brain, which in the further course of the neurodegenerative disease manifests itself in the form of various neurological and psychiatric symptoms. In Germany, about 2 million people are currently affected by a neurodegenerative disease. This number will increase to more than 3 million people by 2050 due to demographic change.

One syndrome that occurs as a result of neurodegenerative processes of the brain is dementia. Dementia is understood to be a combination of various symptoms of increasing deterioration of cognitive, emotional and social abilities, which, as they progress, lead to impairment of the person's occupational and later general social functions. Since 2013, the term "neurocognitive disorder" has been used as an equivalent or substitute for the term dementia.

A dementia or neurocognitive disorder can thus arise due to a neuro-degenerative disease, for example as a result of Alzheimer's disease, Parkinson's disease, Huntington's disease or Pick's disease. In addition, dementia or neurocognitive disorders can also be caused, for example, by craniocerebral trauma, tumors or water retention in the brain.

The risk of developing dementia increases with age, whereby the most common form of cognitive disorder, known as Alzheimer's dementia, does not usually appear until after the age of sixty. It is estimated that in the Federal Republic of Germany alone, around two million people are currently being affected by dementia. In addition to old age as the main risk factor, cardiovascular factors such as high blood pressure, obesity or diabetes also promote the development of dementia. Another significant factor for the occurrence of dementia is depression.

Depression is usually understood as a mental illness that is expressed by a depressed mood, persistent brooding and a generally diminished sense of drive. Furthermore, a decrease or loss of joy of life, self-esteem, performance, empathy or interest in daily life are regularly observed. The decisive factor here is that these symptoms last for a disproportionately long time and are not in proportion to the factors that trigger the symptoms. These triggering factors can be very diverse and can be attributed to both biological and psychological influences. The rate of depressive disorders in Germany is about 8%, which corresponds to about 4 million adults.

Like dementia, depression is ultimately caused by a loss of synaptic plasticity, whereby synapses, nerve cells or even entire brain areas lose the ability to change their anatomy and function in order to optimize ongoing processes. A specific therapy for the treatment of this loss of synaptic or neuronal plasticity, which is characteristic for neurodegenerative processes, does not yet exist.

For the dissociative anesthetic ketamine, which is a chiral arylcyclohexylamine, it was observed that it is unexpectedly effective in the treatment of particularly persistent or difficult-to-treat depression. Patients who were administered ketamine intravenously experienced an improvement in their depressive state within a short time, which in some cases lasted up to seven days. The effect underlying the antidepressant effect of ketamine could finally be attributed to a metabolite of ketamine, 6-hydroxynorketamine (HNK), wherein the exact mode of action is still controversial. However, it has been observed that 6-hydroxynorketamine, in contrast to ketamine, has no psychotropic effect, which in principle increases the possibility of its use as an active ingredient compared to ketamine.

As a drug for administration over a longer period of time, for example for the treatment of depression, ketamine is unsuitable due to its dissociative as well as intoxicating and narcotic effects, and carries an increased risk of dependence in the long term. In addition, ketamine comprises a chronic urinary bladder toxicity and can also have a nephrotoxic effect. For the aforementioned reasons, ketamine can only be administered under medical supervision and monitoring in a hospital setting.

Likewise, despite its non-existent psychotropic effect, 6-hydroxynorketamine is unsuitable for use as an active substance or drug. The compound is highly polar and comprises only a low bioavailability when administered directly. In the mouse model, for example, an effect comparable to that of 10 mg/kg ketamine was observed only at very high doses of 25 mg/kg and above (P Zanos et al., NMDAR inhibition-independent antidepressant actions of ketamine metabolites, Nature 2016, vol. 533(7604), pp. 481-6). The high polarity of 6-hydroxynorketamine makes it difficult to cross the blood-brain barrier, so that the site of action and, accordingly, the antidepressant effect of 6-hydroxynorketamine are only inadequately reached. As with ketamine, a high degree of urinary bladder and kidney toxicity can be assumed for 6-hydroxynorketamine.

There is therefore still an undiminished need for compounds or active ingredients that can be used in the treatment of mental or neurodegenerative diseases and comprise an improved efficacy profile.

Due to the general efficacy of ketamine or 6-hydroxynorketamine, derivatives of ketamine have already been synthesized.

For example, WO 2019/192602 A1 describes different derivatives of the ketamine metabolites norketamine and 6-hydroxynorketamine and a process for preparing them. However, the proposed process is only applicable to a limited selection of compounds and is particularly unsuitable for the synthesis of highly or multiply substituted derivatives.

In addition, all compounds bearing electron-rich substituents, in particular on the aryl residue, are ruled out due to their insufficient reactivity. The 6-hydroxynorketamine derivatives described are also highly polar, which prevents their effective use as drugs. Like the parent compound itself, the described 6-hydroxynorketamine derivatives can be expected to have too low bioavailability as well as too rapid excretion from the body.

WO 2013/056229 A1 also describes derivatives of norketamine and 6-hydroxynorketamine and, in addition, prodrugs of 6-hydroxynorketamines. The synthesis methods described for this purpose are again of limited applicability or variability and are not suitable, for example, for sterically demanding substituents or substituents with electron-rich groups. The range of accessible derivatives is thus ultimately severely limited.

In addition, prodrugs of polar compounds are often inefficient in practice and their approval as drugs is very difficult. Additional synthesis steps are required and it must be proven whether and how all cleavage products of the prodrug are metabolized. In this context, the cleavage of prodrugs into the actually active compound often results in reactive intermediates that have, for example, toxic properties.

The derivatives of ketamine and its metabolites described in the prior art are consequently severely limited in terms of the accessible structures by the underlying synthesis or production processes, which are restricted in their variability or flexibility. The derivatives obtained are generally highly polar compounds that have low bioavailability and are rapidly excreted. Thus, these compounds are hardly suitable as active agents for the treatment of, for example, depression.

Against this background, a process that enables the preparation of structurally diverse derivatives of ketamine, norketamine and 6-hydroxynorketamine would be highly desirable. In addition, the derivatives thus accessible are also of particular interest in providing potential new agents for the targeted and efficient treatment of neurodegenerative and mental disorders involving in particular the central nervous system. However, many of the compounds, which are potentially well cell-permeable and correspondingly effective, cannot be prepared by the synthesis methods known to date, since in particular the electron density at the aromatic compound represents a strongly limiting factor of the synthesis methods.

SUMMARY

It is therefore an object of the present invention to overcome the problems and disadvantages associated with the prior art described above, or at least to mitigate them.

In particular, an object of the present invention is to provide a process for preparing derivatives of ketamine or its metabolites norketamine and 6-hydroxynorketamine.

Moreover, a further object of the present invention is to provide new derivatives of ketamine or its metabolites norketamine and 6-hydroxynorketamine.

Subject-matter of the present invention according to a first aspect of the present invention is a process for preparing cyclic 2-amino-1-one derivatives according to claim 1; further advantageous embodiments of this aspect of the invention are subject of the respective dependent claims.

A further subject-matter of the present invention according to a second as well as a third aspect of the present invention are cyclic 3-ene-2-oxy-1-carboxylic acid derivatives according to claim 10, and a process for their preparation according to claim 11.

Further, subject-matter of the present invention are, according to a fourth aspect, bicyclic carbamates according to claim 12, and, according to a fifth aspect, a process for preparing them according to claim 13.

Moreover, subject-matter of the present invention according to a sixth aspect of the present invention are cyclic 2-amino-1-one derivatives according to claim 14.

Further subject-matter of the present invention according to a seventh as well as eighth aspect of the present invention are the use of cyclic 2-amino-1-one derivatives for stimulating or restoring synaptic plasticity of neurons according to claim 16 and neuronal plasticity of neurons according to claim 17.

Finally, subject-matter of the present invention according to a ninth as well as a tenth aspect of the present invention are the use of the cyclic 2-amino-1-one derivatives as a medicament according to claim 18 and a pharmaceutical composition comprising cyclic 2-amino-1-one derivatives according to claim 19.

DETAILED DESCRIPTION

Figure 1:
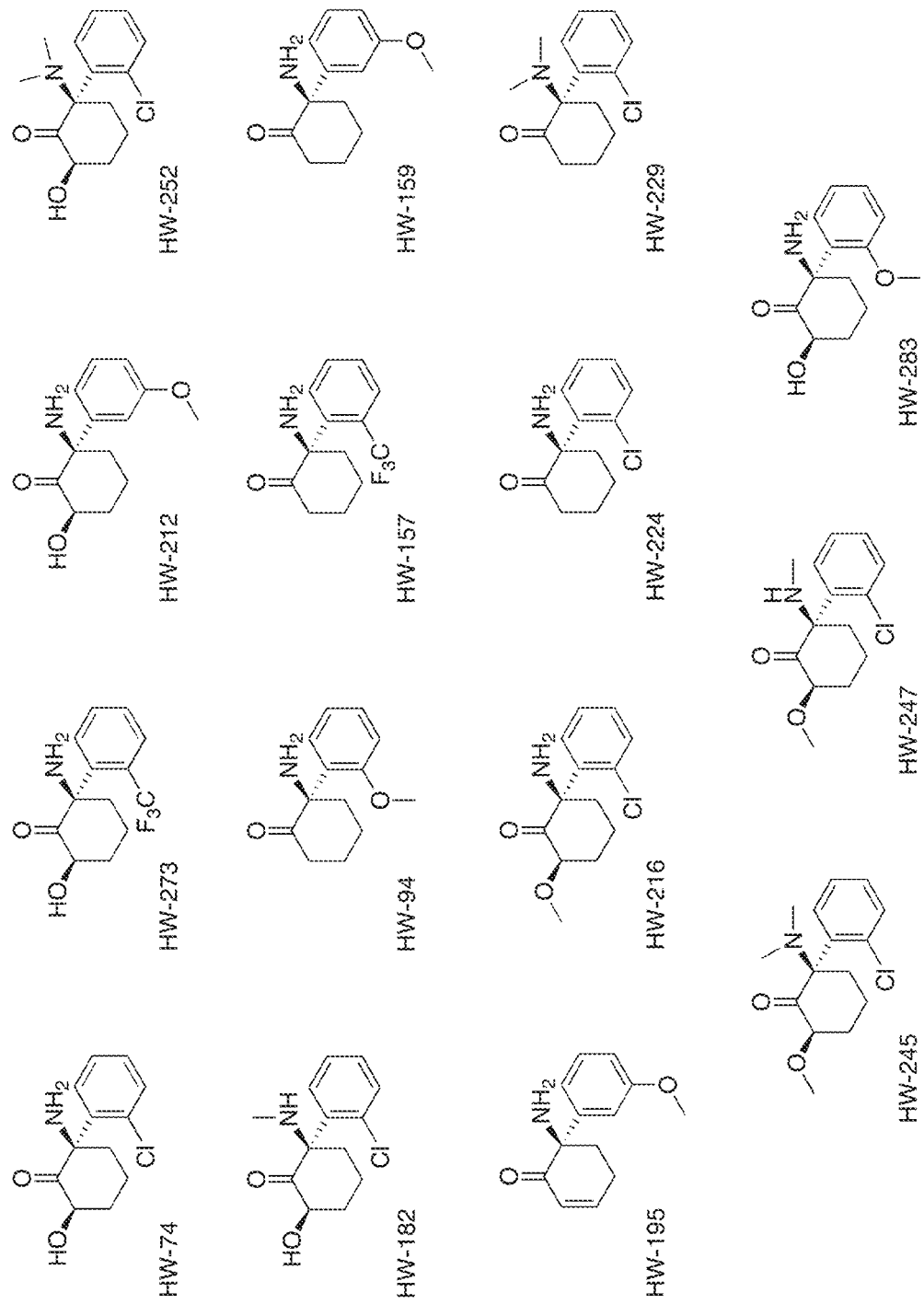
FIG. 1 is an illustration of the structures of cyclic 2-amino-1-one derivatives of the invention iused to investigate the potential neuroregenerative effects thereof.

It is understood that in the following mentioned, special features, in particular special embodiments or the like, which are described only in context with one aspect of the invention, are also valid with respect to the other aspects of the invention, without this requiring an explicit mention.

Furthermore, it should be noted with respect to all relative or percentage, in particular weight-related, quantitative data mentioned below that, within the scope of the present invention, these are to be selected by the person skilled in the art in such a way that, in the sum of the ingredients, additives or adjuvants or the like, 100% or 100 wt. % always results. However, this is self-evident for the person skilled in the art.

In addition, it applies that all parameter data or the like mentioned in the following can basically be determined or ascertained with standardized or explicitly stated determination methods or with determination methods familiar to the person skilled in the art.

With this proviso made, the subject-matter of the present invention will be explained in more detail below.

The subject-matter of the present invention—according to a first aspect of the present invention—is a process for preparing cyclic 2-amino-1-one derivatives, wherein in a first reaction step an aromatic acrylic acid derivative, in particular an -carbon aromatic-substituted acrylic acid derivative, is converted into a cyclic 3-ene-2-oxy-1-carboxylic acid derivative in a cyclization reaction.

As was surprisingly found out, the process according to the invention provides access to a large number of different cyclic 2-amino-1-one derivatives in a particularly simple and efficient manner.

In the context of the present invention, derivatives are understood to be substances that are derived from a chemical compound, i.e. a so-called parent compound, and thus have a close structural relationship to one another. In particular, derivatives comprise structural units which are similar to the functionalities or functional groups of the underlying parent compound, wherein at least one structural element of these functionalities or functional groups is present in the derivative in the same oxidation state as in the parent compound. For example, oximes and hydrazones are derivatives of aldehydes and ketones, or esters and amides are derivatives of carboxylic acids.

As a parent compound in the sense of the present invention, according to this definition, a cyclic 2-amino-1-ketone can be considered. Accordingly, this structural unit is regularly found in the cyclic 2-amino-1-one derivatives according to the invention.

The basic structure of the derivatives according to the invention is now preferably derived from cyclohexane, wherein cyclic hydrocarbons which comprise a double bond, i.e. cyclohexenes, are also included. The basic structure of cyclic 2-amino-1-one derivatives according to the invention also comprises a carbonyl group and, in particular, a primary, secondary or tertiary amino group in proximity to the carbonyl group, i.e. in the 2-position according to IUPAC. In this context, derivatives with primary or tertiary amino groups, preferably tertiary amino groups, are more preferably used.

In particular, it is thus provided according to the invention that the cyclic 2-amino-1-one derivative is selected from the group of 2-aminocyclohexan-1-one derivatives, 2-aminocyclohexen-1-one derivatives, in particular 2-aminocyclohexan-1-one derivatives.

A special advantage of the production process according to the invention is in particular that it allows access to a large number of different derivatives of cyclic 2-amino-1-ketones, wherein in particular also such products become accessible which could not be produced with previous synthesis processes. In particular, the preparing of cyclic 2-amino-1-one derivatives bearing sterically demanding substituents or substituents rich in electrons was previously not possible, or only possible to a very limited extent. In particular, when a residue with the above-mentioned substituents is to be introduced in the 2-position in addition to the amino group, no preparation process has been available up to now that would enable the synthesis of these derivatives in a meaningful or practically reliable manner.

In the context of the present invention, a substituent is understood to be an atom or an atomic group, i.e. in particular an organic residue or a functional group, which replaces a hydrogen atom in a molecule, i.e. substitutes it. In particular, one or more hydrogen atoms may be replaced by other atoms or atomic groups.

The residues introduced in addition to the 2-amino group are preferably selected from aromatic, in particular aryl or hetaryl residues.

In the context of the present invention, an aromat, an aromatic residue or an aromatic group, is understood in particular as a cyclic compound or a cyclic residue or a cyclic group with a continuous, conjugated 7-electron system, which contains $4n+2$ $\pi$-electrons, with $n=0$ or a natural number, according to the Hückel rule. In this context, the aromatics or aromatic groups or aromatic residues can also be further substituted.

In the context of the present invention, the term "aryl" refers to an aromatic system whose conjugated $\pi$-system comprises exclusively carbon atoms.

The term "heteroaryl" in the context of the present invention is preferably understood to mean an aromatic system whose conjugated $\pi$-system comprises at least one atom other than carbon, i.e. a heteroatom. Preferably, this heteroatom is selected from elements of the 3rd, 5th and 6th main groups of the periodic table of the elements, in particular boron, nitrogen, oxygen, phosphorus and sulfur.

Preferably, the cyclic 2-amino-1-one derivatives are thus cyclic 2-amino-2-aryl-1-one derivatives or cyclic 2-amino-2-heteroaryl-1-one derivatives, wherein the derivatives are preferably selected from the group of 2-amino-2-aryl-cyclohexan-1-one derivatives, 2-amino-2-heteroaryl-cyclohexan-1-one derivatives, 2-amino-2-aryl-cyclohexen-1-one derivatives, 2-amino-2-heteroaryl-cyclohexen-1-one derivatives, in particular 2-amino-2-aryl-cyclohexan-1-one derivatives and 2-amino-2-aryl-cyclohexan-1-one derivatives. Moreover, particularly good results are obtained in the context of the present invention if the amino group is selected from primary and tertiary amino groups, in particular tertiary amino groups.

An appropriately substituted derivative of the cyclic 2-amino-1-ketones according to the present invention thus also represents in particular a derivative of ketamine or its metabolites norketamine and 6-hydroxynorketamine. Only a few preparation processes are currently available for these compounds, and they are generally very limited in terms of their variability.

The preparation processes known from the prior art are usually based on available or already existing cyclohexanones, which, however, can only be modified or functionalized to a limited extent in the α-position to the carbonyl group. Space-occupying groups, such as substituted aromatics, cannot be attached in this way, since unfavorable steric ratios prevent or hinder the corresponding reactions. Accordingly, the methods known in the prior art are severely limited in terms of their variability and thus their general applicability.

The present invention overcomes this disadvantage by first establishing the basic cyclic structure. For this purpose, a cyclization reaction is carried out in which an aromatic acrylic acid derivative is converted to a cyclic 3-ene-2-oxy-1-carboxylic acid derivative, i.e. a cyclohexene. In this reaction, only the double bond of the aromatic acrylic acid derivative participates, so that in particular in the periphery of the double bond, structural variation can be broad. This represents a particular and central advantage of the preparation process according to the invention.

Thus, within the scope of the present invention, it is possible for the first time to prepare also such cyclic 2-amino-1-one derivatives which carry in particular structurally demanding or electron-rich substituents, so that a particular variability and flexibility is inherent in the process according to the invention.

In particular, within the scope of the present invention, a particularly large number of structurally diverse compounds becomes accessible with only one production process, so that a broad spectrum of compounds with different chemical, biological or physical properties can also be covered in an advantageous manner.

In addition, the process according to the invention is characterized in particular by the fact that cyclic 2-amino-1-one derivatives can be obtained from aromatic acrylic acid derivatives as starting point in only a few process or reaction steps. Furthermore, the comparatively few reaction steps preferably do not require any complex cleaning steps, so that the preparation process according to the invention is also very time-efficient and easy to carry out. In addition, the starting compounds, as well as the reagents and solvents used in the process, can be obtained in particular in an uncomplicated manner or can be readily prepared synthetically.

Moreover, the individual reaction steps comprise in particular a high degree of specificity and selectivity, so that the production process according to the invention can be carried out in a targeted manner and without significant production of by-products. The preparation process according to the invention is therefore also particularly user-friendly and easy to handle.

The intermediates obtained in the process according to the invention are further characterized in particular by the fact that they allow a wide scope for additional modifications or functionalizations. For example, the cyclic 3-ene-2-oxy-1-carboxylic acid derivative obtained in the first reaction step can be modified by modifying the double bond of the cyclohexene skeleton. This allows in particular direct as well as uncomplicated access to cyclic 2-amino-1-one derivatives, or their precursors, which comprise different substitution patterns. In particular, such a synthetic flexibility as well as the allowance of such a degree of structural diversity is made possible for the first time with the process according to the invention for the target compound class, i.e. for the cyclic 2-amino-1-one derivatives according to the invention.

The preparation process according to the invention thus also enables, in particular with regard to the use of the cyclic 2-amino-1-one derivatives, the provision of a large number of different potential new active ingredients, for example for the treatment of neurodegenerative diseases, in particular dementia, or mental diseases, in particular depression. In particular, it is also advantageous that the cyclic 2-amino-1-one derivatives of the invention can comprise a more balanced hydrophilic and lipophilic profile, so that their uptake into the body and, in particular, their passage through the blood-brain barrier are facilitated.

Within the scope of the present invention, it thus becomes possible for the first time to produce a wide range of ketamine, norketamine and hydroxynorketamine derivatives as well as other structurally similar compounds. In particular, the polarity of the target compounds can be easily adjusted, and it is possible to access derivatives that comprise significantly lower polarities than ketamine, norketamine or hydroxynorketamine. On the one hand, this results in a potentially higher efficacy, especially with regard to the treatment of neurodegenerative diseases, since the bioavailability of the derivatives according to the invention, especially their ability to pass cell membranes or the blood-brain barrier, is significantly increased. On the other hand, the residence time of the compounds of the invention in the body can also be increased, which is due in particular to slower metabolization or renal excretion of the derivatives. In principle, this allows access to new active ingredients and drugs that comprise improved efficacy with fewer side effects, such as reduced urinary bladder toxicity.

With regard to the first reaction step of the process according to the invention, it is now preferably provided for the cyclization reaction to be a cycloaddition, in particular a [4+2]-cycloaddition, preferably a Diels-Alder reaction.

In the context of the present invention, a cyclization reaction is generally understood to be a reaction that yields a cyclic product. The reaction can start from one or more starting compounds, which react in the cyclization reaction, for example, to configure a four-membered ring, five-membered ring, six-membered ring, etc. According to the invention, it is more preferable if the cyclization reaction proceeds bimolecularly, i.e. with the participation of two molecules.

Furthermore, in the context of the present invention, a [4+2]-cycloaddition is understood as such a type of reaction in which four π-electrons of a starting compound and two π-electrons of a second starting compound are involved in the reaction. A special case of [4+2] cycloaddition is the Diels-Alder reaction, in which generally a diene, i.e., a starting compound with four π-electrons, and a dienophile, i.e., a starting compound with two π-electrons, are reacted with each other to form a cyclohexene derivative.

In this sense, the aromatic acrylic acid derivative is preferably a dienophile according to the invention. Accordingly, according to the preferred embodiments described for the cyclization reaction, it is in particular provided that the aromatic acrylic acid derivative is converted into the cyclic 3-ene-2-oxy-1-carboxylic acid derivative by reaction with a diene.

In this regard, particularly good results are obtained in the context of the present invention if the aromatic acrylic acid derivative is converted into the cyclic 3-ene-2-oxy-1-carboxylic acid derivative by reaction with a 1,3-butadienol derivative. Thus, according to this embodiment of the present invention, 1,3-butadienol derivatives are preferably used as dienes in the cyclization reaction.

According to the present invention, it is further preferred if the aromatic acrylic acid derivative is selected from compounds of the general formula I

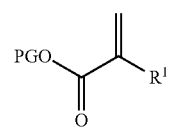

I with
R$^1$=aryl, heteroaryl;
PG=protecting group.

With regard to the residue R$^1$, it has proved well in particular if R$^1$ for R$^1$=aryl is selected from annulated aryl residues, in particular selected from the group of naphthyl, anthracyl, phenanthryl residues and aryl residues of the general formula II

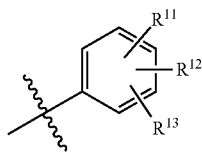

with, each independently of the other,
$R^{11}$, $R^{12}$, $R^{13}$=H;
$NH_2$, OH, SH, F, Cl, Br, $NO_2$, in particular $NH_2$, OH, F, Cl;
$C_1$-$C_x$-monoalkylamino, $C_1$-$C_x$-dialkylamino, $C_1$-$C_x$-alkoxy, $C_1$-$C_x$-alkylsulfanyl, $C_1$-$C_x$-alkyl, $C_1$-$C_x$-perfluoroalkoxy, $C_1$-$C_x$-perfluoroalkyl, in particular $C_1$-$C_x$-monoalkylamino, $C_1$-$C_x$-alkoxy, $C_1$-$C_x$-alkyl, $C_1$-$C_x$-perfluoroalkoxy, $C_1$-$C_x$-perfluoroalkyl;
COOH, —$CONH_2$, COSH, CHO, in particular COOH, $CONH_2$;
COO($C_1$-$C_x$-alkyl), CONH($C_1$-$C_x$-alkyl), COS($C_1$-$C_x$-alkyl), C(O)($C_1$-$C_x$-alkyl), in particular COO($C_1$-$C_x$-alkyl), CONH($C_1$-$C_x$-alkyl);
phenyl, naphtyl;
with
x=2 to 20, in particular 2 to 15, preferably 2 to 10.

Preferably, $R^1$ for $R^1$=aryl is selected from aryl residues of the general formula II. Furthermore, within the scope of the present invention, in particular with regard to the residues $R^{11}$, $R^{12}$, $R^{13}$, it is more preferably if x=2 to 5, in particular 2 to 3.

Likewise, with regard to the structure or composition of the residue $R^1$, it may be provided that $R^1$ for $R^1$=heteroaryl is selected from the group of 5-ring heteroaryls, in particular pyrryolyl, imidazyl, pyrazoyl, oxazyl, isoxazyl, thiazoyl, furyl, thienyl residues and substituted derivatives thereof, preferably pyrryolyl, imidazyl, pyrazoyl, thienyl residues and substituted derivatives thereof, and/or 6-membered heteroaryls, in particular pyridyl, pyrazyl, pyridazyl, pyrimidyl residues and substituted derivatives thereof, preferably pyridyl residues and substituted derivatives thereof.

Particularly preferably in the context of the present invention, if $R^1$=heteroaryl is selected from the group of thienyl residues, pyridyl residues and substituted derivatives thereof.

In the context of the present invention, it is further preferred that the heteroaryls have substituents selected from the group of alkyl residues, in particular methyl, ethyl, propyl residues, haloalkyl residues, in particular fluoroalkyl, chloroalkyl residues, perfluoroalkyl residues, in particular trifluoromethyl, pentafluoroethyl residues, alkoxy residues, in particular methoxy, ethoxy, propoxy residues, perfluoroalkoxy residues, in particular trifluoromethoxy, pentafluoroethoxy residues, and/or nitro residues. This applies to all embodiments of the present invention where $R^1$=heteroaryl.

In particular, the present invention thus allows a large number of aromatic structures with a wide variety of substitution patterns or different heteroatoms to be used in the process according to the invention. In this way, in particular, a particularly high richness of variants and a high flexibility are achieved for the process according to the invention.

This particular advantage of the process according to the invention is based in particular on the fact that the hexane or hexene backbone of the cyclic 2-amino-1-one derivatives, which enables simple derivatization and synthesis of various active ingredients, is not built up until the process according to the invention, in particular the cyclization reaction. Advantageously, only the related double bonds are involved in the cyclization reaction. In particular, this opens up a wide scope for the selection of the residue $R^1$, since it has little influence on the course of the reaction and can thus be configured, for example, as space-occupying or electron-pushing.

With regard to the carboxylic acid function of the aromatic acrylic acid derivative, it is preferably provided according to the present invention that this is blocked with a protecting group (PG), preferably esterified with the latter.

In the context of the present invention, a protecting group (PG) is understood to mean in particular a substituent which is introduced into a compound during a chemical synthesis, in particular a multistage chemical synthesis, at a specific functional group in order to temporarily protect the latter and thus prevent an undesired reaction at this group.

As mentioned above, the carboxylic acid is preferably esterified or, in particular, converted into an ester for this purpose. With regard to the protecting group (PG) used for this purpose, it can usually be selected from a large number of different protecting groups or substituents, in particular wherein the selection is based on the respective intended reaction conditions.

In particular, the protecting group (PG) is selected from organic residues. Organic residues are understood to be substituents or groups which are predominantly composed of carbon, hydrogen and oxygen, and optionally nitrogen, sulfur, phosphorus, etc. Furthermore, the organic residues may comprise functional groups. For example, according to the invention, it may be provided that the carboxylic acid function of the aromatic acrylic acid derivative is blocked or esterified with an organic residue comprising a carboxylic acid or a derivative of a carboxylic acid as a functional group, in particular wherein a carbonic anhydride results. More preferably, however, the carboxylic acid function of the aromatic acrylic acid derivative is converted into an ester within the scope of the invention.

Suitable protecting groups or substituents may include, for example, alkyl residues, aryl residues or functional units such as auxiliaries or comparable space-occupying or sterically demanding groups.

In the context of the present invention, an auxiliary is understood to be a substituent or group that is suitable for influencing the stereochemical course of a subsequent reaction. In particular, chiral auxiliaries can influence the course of a reaction which is not stereoselective or not very stereoselective per se in such a way that, irrespective of the selectivity which is not given or hardly given on the reaction side, a diastereomer is formed in excess or ideally exclusively in relation to the compound protected with the chiral auxiliary or, in relation to the compound obtained after cleavage of the auxiliary, an enantiomer of the desired chiral compound is formed.

Auxiliaries suitable as protecting groups (PG) according to the invention can be selected, for example, from the group of Evans auxiliaries, menthyl auxiliaries, Enders reagents, derivatives derived from these, and mixtures thereof.

Furthermore, particularly good results, in particular also with regard to selectivity or, in particular, stereoselectivity in the process according to the invention, are obtained if the protecting group (PG) comprises aryl residues, i.e. aromatic groups.

Moreover, more preferably protecting groups (PG) comprise in particular protecting groups or in particular ester groups which can be cleaved under comparatively mild conditions.

It has been well proven if the protecting group (PG) is selected from the group of pH-labile protecting groups and/or redox-labile protecting groups, in particular selected from the group of benzyl-, para-methoxybenzyl-, dimethoxybenzyl, alkyloxycarbonyl, triphenylmethyl, alkyl, allyl groups, preferably para-methoxybenzyl, dimethoxybenzyl, alkyloxycarbonyl, triphenylmethyl groups, more preferably para-methoxybenzyl, alkyloxycarbonyl groups.

Equally or in addition to para-methoxybenzyl and alkyloxycarbonyl groups more preferably the protecting group is selected from alkyl groups, in particular from the group of methyl, ethyl, propyl group, preferably methyl group.

The aforementioned protecting groups are characterized in particular by the fact that they can be introduced in an uncomplicated manner and in high yields, as well as reliably limiting the reactivity of the carboxylic acid function. At the same time, the aforementioned protecting groups can be almost completely removed under comparatively mild conditions, wherein the corresponding conditions can in particular be well integrated into the production process according to the invention.

For the preparation process according to the invention, it has now proved advantageous if the aromatic acrylic acid derivative is selected from compounds of the general formula III

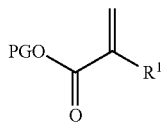

III with
$R^1$=aryl, heteroaryl;
  wherein $R^1$ for $R^1$=aryl is selected from aryl residues of the general formula IV

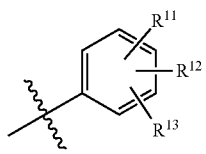

IV with, each independently of the other,
$R^{11}$, $R^{12}$, $R^{13}$=H;
  $NH_2$, OH, F, Cl;
  $C_1$-$C_x$-alkoxy, $C_1$-$C_x$-alkyl, $C_1$-$C_x$-perfluoroalkoxy, $C_1$-$C_x$-perfluoroalkyl;
  $COO(C_1$-$C_x$-alkyl), $CONH(C_1$-$C_x$-alkyl);
and
x=2 to 10, in particular 2 to 5, preferably 2 to 3;
and wherein $R^1$ for $R^1$=heteroaryl is selected from the group of pyridyl, pyrazyl, pyridazyl, pyrimidyl residues as well as substituted derivatives thereof and/or pyrryolyl, imidazyl, pyrazoyl, thienyl residues as well as substituted derivatives thereof;

PG=pH-labile protecting group and/or redox-labile protecting group, in particular
  para-methoxybenzyl, dimethoxybenzyl, alkyloxycarbonyl, triphenylmethyl group.

In a very particularly preferred embodiment of the present invention, it is further preferred if the aromatic acrylic acid derivative is selected from compounds of the general formula V

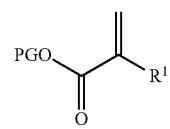

V with
$R^1$=aryl, heteroaryl;
  wherein $R^1$ for $R^1$=aryl is selected from aryl residues of the general formula VI

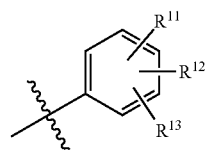

VI with, each independently of the other,
$R^{11}$, $R^{12}$, $R^{13}$=H;
  $NH_2$, OH, F, Cl;
  $C_1$-$C_x$-alkoxy, $C_1$-$C_x$-alkyl, $C_1$-$C_x$-perfluoroalkoxy, $C_1$-$C_x$-perfluoroalkyl;
and
x=2 to 5, in particular 2 to 3;
and wherein $R^1$ for $R^1$=heteroaryl is selected from the group of thienyl residues, pyridyl residues as well as substituted derivatives thereof;

PG=pH-labile protecting group and/or redox-labile protecting group, in particular
  para-methoxybenzyl, dimethoxybenzyl, alkyloxycarbonyl.

As far as the 1,3-butadienol derivative is concerned, in the context of the present invention this can usually be selected from derivatives of 1,3-butadienol known per se to the skilled person. According to the invention, however, it has been well proven if the 1,3-butadienol derivative is selected from electro-rich 1,3-butadienol derivatives, in particular from 1,3-butadienol derivatives of the general formula VII

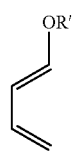

VII with
$R'$ =$C_1$-$C_x$-alkyl, $C_1$-$C_x$-vinyl, $C_1$-$C_x$-allyl;
  phenyl, benzyl;
  trialkylsilyl;

and
x=2 to 10.

Particularly preferably, in the context of the present invention, the 1,3-butadienol derivative is selected from butadienoxysilanes of the general formula VIII

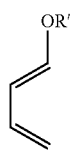

VIII with
R'=trialkylsilyl;
  trialkylsilyl, in particular trimethylsilyl, triethylsilyl, triisopropylsilyl, tert-butyldimethylsilyl, triphenylsilyl, tert-butyldiphenylsilyl; preferably triethylsilyl, triisopropylsilyl, tert-butyldimethylsilyl.

In the context of the present invention, the use of electron-rich 1,3-butadienol derivatives ensures in particular that the reactivity of the diene is high enough so that the cyclization reaction preferably proceeds rapidly and completely. Furthermore, a possibly too high electron density of the dienophile, i.e. of the aromatic acrylic acid derivative, can be compensated in an advantageous manner or the discrepancy of the electronic states can be used in particular to the advantage of a sufficiently favored course of the reaction. In particular, the aforementioned residues R' contribute to the fact that the electron density in the diene is increased.

With regard to the reaction conditions under which the cyclization reaction, or in particular the reaction of the aromatic acrylic acid derivative with the 1,3-butadienol derivative, is carried out, these can be selected in the context of the present invention from reaction conditions for cyclizations known per se to the skilled person.

In accordance with the present invention, good results are obtained in particular if the reaction of the aromatic acrylic acid derivative with the 1,3-butadienol derivative is carried out with a ratio of aromatic acrylic acid derivatives to 1,3-butadienol derivative in the range from 0.5:1 to 1:20, in particular 1:1 to 1:15, preferably 1:2 to 1:10.

Furthermore, it has proven useful if the reaction is carried out in an inert solvent, in particular a solvent of cyclic, in particular aromatic, hydrocarbons, preferably tetrahydrofuran, xylene or mixtures thereof.

According to the invention, an inert solvent is understood to be a solvent which does not itself participate in the reaction. Nevertheless, it is possible that the solvent influences the course of the reaction to a certain extent, for example by coordinating the starting compound in a certain, in particular advantageous, way, for example through possible π-interactions, in such a way that the cyclization is favored or, in particular, accelerated.

Furthermore, it has been well proven within the scope of the present invention if the reaction is carried out under supply of heat, in particular at temperatures in a range from 50 to 250° C., preferably 75 to 200° C., more preferably 100 to 175° C.

Within the aforementioned temperature ranges, in particular high or complete conversions were observed for the preparation process according to the invention, as well as equally high selectivity and specificity of the cyclization reaction.

Furthermore, it is preferred in accordance with the invention if the reaction is carried out over a period of 5 to 300 min, in particular 10 to 250 min, preferably 15 to 200 min.

Within the scope of the aforementioned reaction durations, a complete conversion of the starting compounds to the cyclized product can usually be observed, whereas the production of by-products is negligible.

Finally, it has been found to be particularly advantageous in the context of the present invention if the reaction is carried out in the presence of a radical scavenger, in particular in the presence of a dihydroxybenzene, preferably in the presence of hydroquinone.

In the context of the present invention, it has been observed in particular with regard to the radical scavenger additive that the reaction of the starting compounds with one another can be improved in an advantageous manner in that production of interfering by-products, in particular polymerized by-products, is suppressed particularly effectively.

For the first reaction step, it is now provided in particular according to the invention that the cyclic 3-ene-2-oxy-1-carboxylic acid derivative obtained is selected from compounds of the general formula IX

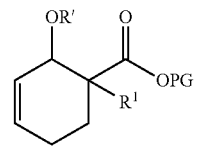

IX with
$R^1$=aryl, heteroaryl;
  in particular wherein $R^1$ for $R^1$=aryl is selected from annulated aryl residues, in particular selected from the group of naphthyl, anthracyl, phenanthryl residues and aryl residues of the general formula II

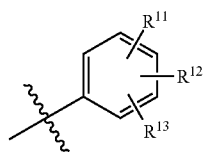

II with, each independently of the other,
$R^{11}$, $R^{12}$, $R^{13}$=H;
  $NH_2$, OH, SH, F, Cl, Br, $NO_2$, in particular $NH_2$, OH, F, Cl;
  $C_1$-$C_x$-monoalkylamino, $C_1$-$C_x$-dialkylamino, $C_1$-$C_x$-alkoxy, $C_1$-$C_x$-alkylsulfanyl, $C_1$-$C_x$-alkyl, $C_1$-$C_x$-perfluoroalkoxy, $C_1$-$C_x$-perfluoroalkyl, in particular $C_1$-$C_x$-monoalkylamino, $C_1$-$C_x$-alkoxy, $C_1$-$C_x$-alkyl, $C_1$-$C_x$-perfluoroalkoxy, $C_1$-$C_x$-perfluoroalkyl;
  COOH, —$CONH_2$, COSH, CHO, in particular COOH, $CONH_2$;

COO($C_1$-$C_x$-alkyl), CONH($C_1$-$C_x$-alkyl), COS($C_1$-$C_x$-alkyl), C(O)($C_1$-$C_x$-alkyl), in particular COO($C_1$-$C_x$-alkyl), CONH($C_1$-$C_x$-alkyl);

phenyl, naphtyl;

with x=2 to 20, in particular 2 to 15, preferably 2 to 10;

and, in particular wherein $R^1$ for $R^1$=heteroaryl is selected from the group of 5-membered ring heteroaryls, in particular pyrryolyl, imidazyl, pyrazoyl, oxazyl, isoxazyl, thiazoyl, furyl, thienyl residues and substituted derivatives thereof, preferably pyrryolyl, imidazyl, pyrazoyl, thienyl residues and substituted derivatives thereof, and/or 6-membered heteroaryls, in particular pyridyl, pyrazyl, pyridazyl, pyrimidyl residues and substituted derivatives thereof, preferably pyridyl residues and substituted derivatives thereof;

PG=pH-labile protecting group and/or redox-labile protecting group, in particular benzyl, para-methoxybenzyl, dimethoxybenzyl, alkyloxycarbonyl, triphenylmethyl, alkyl, allyl groups, more preferably para-methoxybenzyl, dimethoxybenzyl, alkyloxycarbonyl, triphenylmethyl groups, more preferably para-methoxybenzyl, alkyloxycarbonyl groups;

R'=trialkylsilyl, in particular trimethylsilyl, triethylsilyl, triisopropylsilyl, tert-butyldimethylsilyl, triphenylsilyl, tert-butyldiphenylsilyl; preferably triethylsilyl, triisopropylsilyl, tert-butyldimethylsilyl.

Likewise, it has been well proven in the context of the present invention if the cyclic 3-ene-2-oxy-1-carboxylic acid derivative is selected from compounds of the general formula X

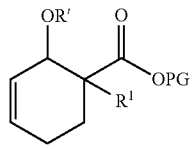

X with
$R^1$=aryl, heteroaryl
wherein $R^1$ for $R^1$=aryl is selected from aryl residues of the general formula IV

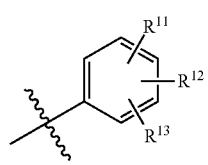

IV with, each independently of the other,
$R^{11}$, $R^{12}$, $R^{13}$=H;
$NH_2$, OH, F, Cl;
$C_1$-$C_x$-alkoxy, $C_1$-$C_x$-alkyl, $C_1$-$C_x$-perfluoroalkoxy, $C_1$-$C_x$-perfluoroalkyl;
COO($C_1$-$C_x$-alkyl), CONH($C_1$-$C_x$-alkyl);
and
x=2 to 10, in particular 2 to 5, preferably 2 to 3;
and wherein $R^1$ for $R^1$=heteroaryl is selected from the group of pyridyl, pyrazyl, pyridazyl, pyrimidyl residues as well as substituted derivatives thereof and/or pyrryolyl, imidazyl, pyrazoyl, thienyl residues as well as substituted derivatives thereof;

PG=pH-labile protecting group and/or redox-labile protecting group, in particular
para-methoxybenzyl, dimethoxybenzyl, alkyloxycarbonyl, triphenylmethyl group;
R'=triethylsilyl, triisopropylsilyl, tert-butyldimethylsilyl.

In a more preferred embodiment of the method according to the invention, it is further provided that the cyclic 3-ene-2-oxy-1-carboxylic acid derivative is selected from compounds of the general formula XI

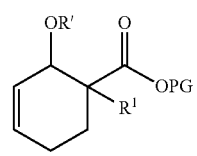

XI with
$R^1$=aryl, heteroaryl
wherein $R^1$ for $R^1$=aryl is selected from aryl residues of the general formula VI

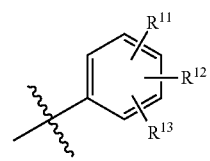

VI with, each independently of the other,
$R^{11}$, $R^{12}$, $R^{13}$=H;
$NH_2$, OH, F, Cl;
$C_1$-$C_x$-alkoxy, $C_1$-$C_x$-alkyl, $C_1$-$C_x$-perfluoroalkoxy, $C_1$-$C_x$-perfluoroalkyl;
and
x=2 to 5, in particular 2 to 3;
and wherein $R_1$ for $R_1$=heteroaryl is selected from the group of thienyl residues, pyridyl residues as well as substituted derivatives thereof;

PG=pH-labile protecting group and/or redox-labile protecting group, in particular
para-methoxybenzyl, dimethoxybenzyl, alkyloxycarbonyl;
R'=triethylsilyl, triisopropylsilyl, tert-butyldimethylsilyl.

In the further course of the process according to the invention, it is now preferably provided that the producing of the cyclic 3-ene-2-oxy-1-carboxylic acid derivative in the first reaction step is followed by a second reaction step. In this context, it has been well proven if in a second reaction step the cyclic 3-ene-2-oxy-1-carboxylic acid derivative is converted into a bicyclic carbamate derivative.

In this context, it can preferably be provided that in a sub-step of the second reaction step the cyclohexene framework, in particular the double bond of the cyclohexene framework, is functionalized, preferably to compound XII

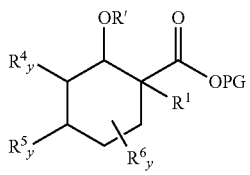

XII with the residues $R^4$, $R^5$, $R^6$, in particular wherein the residues $R^4$, $R^5$, $R^6$, each independently of the other, are selected from the group of $R^4$, $R^5$, $R^6$ =H;

NH$_2$, OH, SH, F, Cl, Br, NO$_2$, in particular NH$_2$, OH, SH;

$C_1$-$C_x$-monoalkylamino, $C_1$-$C_x$-dialkylamino, $C_1$-$C_x$-alkoxy, $C_1$-$C_x$-alkylsulfanyl, $C_1$-$C_x$-alkyl, $C_1$-$C_x$-perfluoroalkoxy, $C_1$-$C_x$-perfluoroalkyl, in particular $C_1$-$C_x$-monoalkylamino, $C_1$-$C_x$-alkoxy, $C_1$-$C_x$-alkyl, $C_1$-$C_x$-perfluoroalkoxy, $C_1$-$C_x$-perfluoroalkyl;

COOH, CONH$_2$, COSH, CHO, in particular COOH, CONH$_2$;

COO($C_1$-$C_x$-alkyl), CONH($C_1$-$C_x$-alkyl), COS($C_1$-$C_x$-alkyl), C(O)($C_1$-$C_x$-alkyl), in particular COO($C_1$-$C_x$-alkyl), CONH($C_1$-$C_x$-alkyl);

with x=2 to 20, in particular 2 to 15, preferably 2 to 10, more preferably 2 to 5, more preferably 2 to 3; and y=0, 1, wherein y=1 for at least one of the residues $R^4$, $R^5$, $R^6$.

Thus, within the framework of the process according to the invention, a further modification or functionalization of the cyclohexane backbone can be performed at an early stage of the preparation process, so that a large number of structurally different compounds are still accessible at the stage of the cyclic 3-ene-2-oxy-1-carboxylic acid derivative in an advantageous manner.

This is particularly advantageous if cyclic 2-amino-1-one derivatives with different substitution patterns are to be provided by the process according to the invention, since this form of functionalization or modification is in particular easily and directly accessible by targeted reactions of the double bond.

Furthermore, it has been well proven in accordance with the invention if, in a further sub-step of the second reaction step, the carboxylic acid group is converted into a carboxylic acid azide by azidation.

In the context of the present invention, azidation is understood to mean the introduction of an azide group, in particular at the carboxylic acid function. Carboxylic acid azides are thus derivatives of carboxylic acid and comprise the general structure R—C(O)N$_3$.

In accordance with the invention, it has proved advantageous if the protecting group (PG) and/or the residue R', in particular the protecting group (PG) and the residue R', are removed in a reaction step preceding the azidation, preferably under reductive and/or basic or acidic conditions.

In this sense, it is more preferably in accordance with the present invention if the removal of the protecting group (PG) and/or the residue R', in particular the protecting group (PG) and the residue R', is carried out hydrogenolytically, i.e. by reduction in the presence of hydrogen on a metal catalyst, and/or under basic or acidic conditions, preferably in the presence of fluoride ions, for example using tetrabutylammonium fluoride (TBAF). Equally, however, within the scope of the present invention, protocols common to those skilled in the art for the removal of protecting groups may also be used.

For the second reaction step, it has also been well proven in the context of the present invention if the azidation is carried out with a reagent selected from the group of inorganic azides, in particular sodium azide, and/or organic azides, in particular sulfonyl azides, phosphoryl azides, preferably tosylazide, diphenyl phosphoryl azide, or mixtures thereof.

Particularly good results are obtained in the process according to the invention if the reagent for the azidation is used in a 1- to 20-fold excess, in particular a 1- to 10-fold excess, preferably a 1.5- to 7-fold excess, in each case based on the amount of the cyclic 3-ene-2-oxy-1-carboxylic acid derivative used.

The azides used permit in particular a mild azidation of the carboxylic acid function and also have the advantage that by-products formed from the reagents can be easily and inexpensively separated. Thus, within the scope of the second reaction step, elaborate cleaning or separation procedures can be advantageously dispensed with.

In addition, particularly good results are obtained for the process according to the present invention if the azidation is carried out in the presence of a base, in particular an organic base, preferably a nitrogen base, more preferably a tertiary amine, more preferably triethylamine.

Alternatively, other bases, in particular nitrogen bases, may be used within the scope of the present invention, wherein suitable bases, in particular nitrogen bases, are in and of themselves familiar to those skilled in the art. Particularly preferably in the context of the present invention are generally those bases which comprise only low nucleophilic properties, as is the case, for example, for more highly substituted amines.

In conjunction with the aforementioned azide reagents, particularly mild conditions for azidation can thus be provided within the scope of the present invention, which in particular can also be well tolerated by further possible substituents as enumerated previously. At the same time, the use of the above-mentioned reagents results in particularly high conversions as well as an extremely specific or selective reactivity of the carboxylic acid.

As far as the choice of solvent is concerned, this can generally be selected from solvents commonly used by those skilled in the art. In particular, it is only relevant that the solvent is capable of dissolving the starting materials and reagents used for the azidation well and at the same time does not participate in the azidation.

Particularly good results are obtained in the context of the present invention if the azidation is carried out in an inert solvent, in particular a solvent consisting of cyclic, in particular aromatic, hydrocarbons, preferably toluene.

Furthermore, it is advantageous for the process according to the invention if the azidation is carried out under supply of heat, in particular at temperatures in a range from 40 to 200° C., preferably 50 to 150° C., more preferably 60 to 125° C.

Furthermore, it has been well proven if the azidation is carried out over a period of 1 hour to 48 hours, in particular 1.5 to 36 hours, preferably 1.5 to 24 hours.

In particular, in the context of the present invention, very good or complete conversions of the starting compounds can be observed in the aforementioned temperature or time ranges, without any formation of by-products being recorded. In this sense, the second reaction step is also preferably characterized by a high selectivity and specificity and can accordingly also be reliably carried out for a broad selection of different starting compounds.

Finally, for the conversion to the bicyclic carbamate derivative, it has proved to be particularly advantageous if, in a further sub-step of the second reaction step, the carboxylic acid azide is cyclized to the carbamate, in particular by rearrangement to the corresponding isocyanate.

According to the invention, the carbamate production takes place in particular in situ, i.e. directly as a consequence of the azidation to the carboxylic acid azide. The cyclization is preferably based on a preceding rearrangement of the carboxylic acid azide to the corresponding isocyanate according to the so-called Curtius reaction.

The subsequent intramolecular reaction to the bicyclic carbamate derivative involving the neighboring hydroxy group then yields the corresponding bicyclic carbamate derivative in a targeted manner and in particular with high yields.

A particular advantage of the process according to the invention is that the cyclization to the carbamate, depending on the configuration of the starting material, which can be, for example, endo- and/or exo-configured, yields a syn-/anti-isomer mixture, but for this generally a time-consuming separation of the isomers can be dispensed with. In the further course of the process according to the invention, all isomers can usually be further used equivalently, since the 1-hydroxy group is subsequently generally oxidized to a ketone.

In this context, it is more preferably provided according to the invention that the bicyclic carbamate derivative is selected from derivatives of the general formula XIII

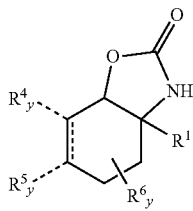

XIII with
R$^1$=aryl, heteroaryl;
in particular wherein R$_1$ for R$_1$=aryl is selected from annulated aryl residues, in particular selected from the group of naphthyl, anthracyl, phenanthryl residues and aryl residues of the general formula II

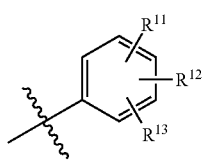

II with, each independently of the other,
R$^{11}$, R$^{12}$, R$^{13}$=H;
NH$_2$, OH, SH, F, Cl, Br, NO$_2$, in particular NH$_2$, OH, F, Cl;
C$_1$-C$_x$-monoalkylamino, C$_1$-C$_x$-dialkylamino, C$_1$-C$_x$-alkoxy, C$_1$-C$_x$-alkylsulfanyl, C$_1$-C$_x$-alkyl, C$_1$-C$_x$-perfluoroalkoxy, C$_1$-C$_x$-perfluoroalkyl, in particular C$_1$-C$_x$-monoalkylamino, C$_1$-C$_x$-alkoxy, C$_1$-C$_x$-alkyl, C$_1$-C$_x$-perfluoroalkoxy, C$_1$-C$_x$-perfluoroalkyl;
COOH, —CONH$_2$, COSH, CHO, in particular COOH, CONH$_2$;
COO(C$_1$-C$_x$-alkyl), CONH(C$_1$-C$_x$-alkyl), COS(C$_1$-C$_x$-alkyl), C(O)(C$_1$-C$_x$-alkyl), in particular COO(C$_1$-C$_x$-alkyl), CONH(C$_1$-C$_x$-alkyl);
phenyl, naphtyl;
and wherein R$^1$ for R$^1$=heteroaryl is selected from the group of 5-membered ring heteroaryls, in particular pyrryolyl, imidazyl, pyrazoyl, oxazyl, isoxazyl, thiazoyl, furyl, thienyl residues and substituted derivatives thereof, preferably pyrryolyl, imidazyl, pyrazoyl, thienyl residues and substituted derivatives thereof, and/or 6-membered heteroaryls, in particular pyridyl, pyrazyl, pyridazyl, pyrimidyl residues and substituted derivatives thereof, preferably pyridyl residues and substituted derivatives thereof;
R$^2$, R$^3$=each independently of the other,
H;
C$_1$-C$_x$-alky; C$_1$-C$_x$-cycloalkyl;
R$^4$, R$^5$, R$^6$=H;
NH$_2$, OH, SH, F, Cl, Br, NO$_2$, in particular NH$_2$, OH, SH;
C$_1$-C$_x$-monoalkylamino, C$_1$-C$_x$-dialkylamino, C$_1$-C$_x$-alkoxy, C$_1$-C$_x$-alkylsulfanyl, C$_1$-C$_x$-alkyl, C$_1$-C$_x$-perfluoroalkoxy, C$_1$-C$_x$-perfluoroalkyl, in particular C$_1$-C$_x$-monoalkylamino, C$_1$-C$_x$-alkoxy, C$_1$-C$_x$-alkyl, C$_1$-C$_x$-perfluoroalkoxy, C$_1$-C$_x$-perfluoroalkyl;
COOH, CONH$_2$, COSH, CHO, in particular COOH, CONH$_2$;
COO(C$_1$-C$_x$-alkyl), CONH(C$_1$-C$_x$-alkyl), COS(C$_1$-C$_x$-alkyl), C(O)(C$_1$-C$_x$-alkyl), in particular COO(C$_1$-C$_x$-alkyl), CONH(C$_1$-C$_x$-alkyl);
with
x=2 to 20, in particular 2 to 15, preferably 2 to 10; and
y=0, 1.

Furthermore, it has proven advantageous in the context of the present invention if the bicyclic carbamate derivative is selected from derivatives of the general formula XIV

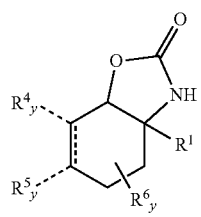

XIV with
R$^1$=aryl, heteroaryl;
wherein R$^1$ for R$^1$=aryl is selected from aryl residues of the general formula IV

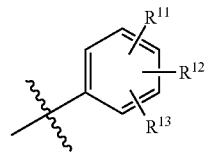

IV with, each independently of the other,
$R^{11}$, $R^{12}$, $R^{13}$=H;
  $NH_2$, OH, F, Cl;
  $C_1$-$C_x$-alkoxy, $C_1$-$C_x$-alkyl, $C_1$-$C_x$-perfluoroalkoxy, $C_1$-$C_x$-perfluoroalkyl;
  $COO(C_1$-$C_x$-alkyl), $CONH(C_1$-$C_x$-alkyl);
and wherein $R^1$ for $R^1$=heteroaryl is selected from the group of pyridyl, pyrazyl, pyridazyl, pyrimidyl residues as well as substituted derivatives thereof and/or pyrryolyl, imidazyl, pyrazoyl, thienyl residues as well as substituted derivatives thereof;
$R^4$, $R^5$, $R^6$=each independently of the other,
H;
  $NH_2$, OH, SH;
  $C_1$-$C_x$-monoalkylamino, $C_1$-$C_x$-alkoxy, $C_1$-$C_x$-alkyl, $C_1$-$C_x$-perfluoroalkoxy, $C_1$-$C_x$-perfluoroalkyl;
with
x=2 to 10, in particular 2 to 5, preferably 2 to 3; and
y=0, 1.

Furthermore, according to a more preferred embodiment of the present invention, it may be provided that the bicyclic carbamate derivative is selected from derivatives of the general formula XV

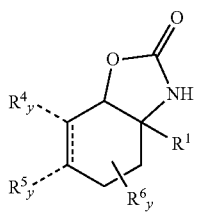

XV with
$R^1$=aryl, heteroaryl;
  wherein $R^1$ for $R^1$=aryl is selected from aryl residues of the general formula VI

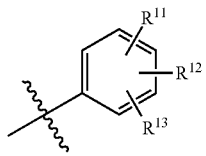

VI with, each independently of the other,
$R^{11}$, $R^{12}$, $R^{13}$=H;
  $NH_2$, OH, F, Cl;
  $C_1$-$C_x$-alkoxy, $C_1$-$C_x$-alkyl, $C_1$-$C_x$-perfluoroalkoxy, $C_1$-$C_x$-perfluoroalkyl;
and wherein $R^1$ for $R^1$=heteroaryl is selected from the group of thienyl residues, pyridyl residues as well as substituted derivatives thereof;
$R^4$, $R^5$, $R^6$=each independently of the other,
H;
  $NH_2$, OH, SH;
  $C_1$-$C_x$-monoalkylamino, $C_1$-$C_x$-alkoxy, $C_1$-$C_x$-perfluoroalkoxy;
with
x=2 to 5, in particular 2 to 3; and
y=0, 1.

In the context of the present invention, in particular with regard to the residues $R^4$, $R^5$, $R^6$, it may thus preferably be provided that the bicyclic carbamate comprises a cyclohexene framework or a cyclohexane framework. In the case that the bicyclic carbamate comprises a cyclohexene framework, y=0 applies in particular to the residues $R^4$, $R^5$. If the bicyclic carbamate comprises a cyclohexane framework, y=1 applies in particular to the residues $R^4$, $R^5$. This is illustrated in the aforementioned structural formulae by the dotted bonds to the residues $R^4$, $R^5$ or the dotted double bond.

Starting from the bicyclic carbamate derivative obtained in the second reaction step, it is now preferably provided in the context of the present invention that in a third reaction step the bicyclic carbamate derivative is converted into the cyclic 2-amino-1-one derivative, in particular the 2-aminocyclohexan-1-one derivative or 2-aminocyclohexen-1-one derivative, preferably the 2-aminocyclohexan-1-one derivative.

For this purpose, it has first been well proven if, in a sub-step of the third reaction step, the carbamate group is removed under formation of a monocyclic 2-amino-1-ol derivative.

According to the invention, particularly good results are obtained here if the removal of the carbamate group is carried out under reductive and/or basic conditions, in particular in the presence of alkali metal salts, preferably sodium salts, lithium salts or mixtures thereof, preferably lithium salts.

In particular, it is more preferably used if the alkali metal salt, in particular the lithium salt, is selected from the group of hydroxides and/or tetrahydridometallates, in particular lithium hydroxide and/or lithium aluminium hydride.

In this context it has proved advantageous if the removal of the carbamate group is carried out in a polar solvent, in particular a solvent of cyclic, in particular oxygencontaining, hydrocarbons, preferably tetrahydrofuran, dioxane or their mixtures.

Likewise, it has been well proven if the removal of the carbamate group is carried out at temperatures in a range from −10 to 250° C., preferably −5 to 200° C., more preferably 0 to 175° C.

In addition, it is preferably provided that the reaction is carried out over a period of 10 minutes to 48 hours, in particular 15 minutes to 36 hours, preferably 20 minutes to 24 hours.

Under the aforementioned reaction conditions, in particular within the aforementioned time or reaction duration, a reliable and complete removal of the carbamate group can be achieved, without any substantial production of by-products being observed.

Likewise, it is in particular an advantage of the process according to the invention that, depending on the selection of the reductive and/or basic conditions, in particular of the alkali metal salt, different reaction products, such as, for example, a primary or methyl-substituted secondary amine, can be obtained. Thus, the process according to the invention allows in particular easy and direct access to derivatives of ketamine or its metabolites norketamine and 6-hydroxynorketamine. The reaction step in question can thus also be understood, in particular in a certain way, as a branching point which makes it possible to easily access a large number of different metabolic stages of ketamine. Thus, a reaction with bases, such as in particular lithium hydroxide, selectively leads to the production of the primary amine, whereas reductive conditions, such as in particular the reaction with lithium aluminum hydride (LiAlH4), selectively yield a secondary amine as product.

Following this sub-step, it is now preferably provided according to the invention that in a further sub-step of the third reaction step, the hydroxy group is oxidized with production of the 2-amino-1-one derivative.

In this context, it has proved advantageous if the oxidation is carried out under acidic conditions, in particular in the presence of a chromium(VI) compound.

In this connection, it is particularly preferred in accordance with the invention if the chromium(VI) compound is chromium(VI) oxide, in particular dissolved in sulfuric acid. Preferably, the oxidation of the hydroxy group is carried out under formation of the 2-amino-1-one derivative, i.e., under conditions corresponding to those of the Jones oxidation. In this context, it was found, in particular surprisingly, that especially the Jones oxidation is suitable to achieve the desired oxidation of the hydroxy group to the ketone, whereas alternative oxidations lead primarily to the corresponding, in particular undesirable, N-oxide.

For this purpose, it is further preferred if the oxidation is carried out in a polar solvent, in particular a low-boiling solvent, preferably dichloromethane, acetone or a mixture thereof.

Furthermore, it has been well proven if the oxidation is carried out at temperatures in a range from −30 to 60° C., preferably −25 to 50° C., more preferably −20 to 45° C.

Finally, in the context of the present invention, particularly good results are obtained if the reaction is carried out over a period of 5 minutes to 24 hours, in particular 10 minutes to 18 hours, preferably 15 minutes to 12 hours.

If further diversification, i.e. modification or functionalization, of the cyclic 2-amino-1-one derivative is desired, it may also be appropriate in the context of the present invention for the 2-amino group to be functionalized, in particular alkylated, preferably doubly alkylated, in a further sub-step of the third reaction step.

In this case it has proved well in particular if the functionalization, in particular alkylation, preferably double alkylation, is carried out with residues selected from the group of $C_1$-$C_x$-alkyl, $C_1$-$C_x$-cycloalkyl, in particular with x=2 to 20, preferably 2 to 15, more preferably 2 to 10, further preferably 2 to 5, more preferably 2 to 3. In this context, it is more preferably, in particular for the twofold alkylation, if the residues are each selected independently of one another.

In the context of a more preferred embodiment of the present invention, it is also possible, in particular for the twofold alkylation, that the residues are selected together. Then it is preferably provided that the residues are selected from the group of $C_1$-$C_x$-cycloalkyl with x=2 to 10, in particular 2 to 5, preferably 2 to 3, preferably pyrrolidyl, piperidyl, imidazyl, pyridyl residues as well as their substituted derivatives.

Likewise, within the framework of a more preferably embodiment of the present invention, it is possible, if not already carried out at an earlier stage of the preparation process according to the invention, that in a further sub-step of the third reaction step the cyclohexene framework, in particular the double bond of the cyclohexene framework, is functionalized, preferably to compound XVI

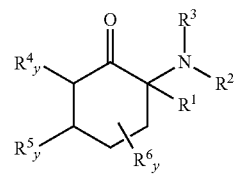

XVI with the residues $R^4$, $R^5$, $R^6$ in particular wherein the residues $R^4$, $R^5$, $R^6$, each independently of the other, are selected from the group of $R^4$, $R^5$, $R^6$ =H;

$NH_2$, OH, SH, F, Cl, Br, $NO_2$, in particular $NH_2$, OH, SH;

$C_1$-$C_x$-monoalkylamino, $C_1$-$C_x$-dialkylamino, $C_1$-$C_x$-alkoxy, $C_1$-$C_x$-alkylsulfanyl, $C_1$-$C_x$-alkyl, $C_1$-$C_x$-perfluoroalkoxy, $C_1$-$C_x$-perfluoroalkyl, in particular $C_1$-$C_x$-monoalkylamino, $C_1$-$C_x$-alkoxy, $C_1$-$C_x$-alkyl, $C_1$-$C_x$-perfluoroalkoxy, $C_1$-$C_x$-perfluoroalkyl;

COOH, $CONH_2$, COSH, CHO, in particular COOH, $CONH_2$;

COO($C_1$-$C_x$-alkyl), CONH($C_1$-$C_x$-alkyl), COS($C_1$-$C_x$-alkyl), C(O)($C_1$-$C_x$-alkyl), in particular COO($C_1$-$C_x$-alkyl), CONH($C_1$-$C_x$-alkyl);

with x=2 to 20, in particular 2 to 15, preferably 2 to 10, more preferably 2 to 5, more preferably 2 to 3; and y=0, 1, wherein y=1 for at least one of the residues $R^4$, $R^5$, $R^6$.

With regard to the further functionalization of the cyclohexene framework, it is on the one hand particularly preferred in the context of the present invention if the double bond of the cyclohexene framework is functionalized, in particular to obtain the corresponding cyclohexane derivative.

It has proven to be a particular advantage of the present invention that compounds with a cyclohexene framework can be obtained or used within the framework of the process according to the invention, in particular wherein it has been shown that these compounds can be modified and functionalized in a particularly versatile manner. On this basis, a large number of very different cyclohexane derivatives can be obtained from, for example, only one cyclohexene compound and, accordingly, a wide range of differently substituted cyclohexane derivatives can be provided. In particular, such derivatives can also be made accessible which are not accessible with known preparation processes, in particular for ketamine derivatives, according to the prior art. Accordingly, the process according to the invention is characterized by a high degree of flexibility and in particular facilitates access to as well as the provision of a large number of novel cyclohexane derivatives or, preferably, ketamine derivatives.

Such a functionalization can be performed in the context of the present, for example, by means of hydrogenation, in particular under a hydrogen atmosphere, preferably on a palladium catalyst.

Further, in the context of a particularly preferred embodiment of the present invention, it is provided that the 6-position of the cyclic 2-amino-1-one derivatives according to the invention is functionalized, in particular hydroxylated.

In this context, it is quite particularly preferred if the functionalization, in particular hydroxylation, of the 6-position of the cyclic 2-amino-1-one derivatives according to the invention is carried out oxidatively, preferably using an organic peracid.

Such an oxidative hydroxylation of the cyclic 2-amino-1-one derivatives according to the invention can be achieved, for example, by means of Rubottom oxidation. Here, in particular using lithium diisopropylamide, the carbonyl group of the cyclic 2-amino-1-one derivatives is first deprotonated in the α-position to the corresponding enolate, which is then reacted to form the silylenol ether, for example with trimethylsilyl chloride. Alternatively, it is also possible that the cyclic 2-amino-1-one derivative is converted to the silylenol ether by means of catalytic hydrosilylation. In this case, it is then preferably provided that a platinum complex, in particular a Pt(0) complex, is used as catalyst. In particular, the Karstedt catalyst has proved well proven as a catalyst. The Karstedt catalyst is an organoplatinum complex obtained from the reaction of a suitable platinum compound, in particular usually hexachloroplatinic acid, with a divinyl-containing disiloxane to give platinum(0)-1,3-divinyl-1,1,3,3-tetramethyldisiloxane complex. In addition, it has been well proven for this alternative of silylenol ether formation if a trialkylsilane, in particular triethylsilane, is used as silylating reagent.

Subsequently, formal oxidation is carried out, in particular using an organic peracid, preferably meta-chloroperbenzoic acid, in the α-position, in particular to configure an epoxide, which subsequently rearranges to form the α-siloxyketone.

Finally, the silyl ether is preferably cleaved to the corresponding α-hydroxyketone.

In the context of the present invention, it is in particular advantageous that this preferred version of the functionalization, in particular hydroxylation, of the 6-position of the cyclic 2-amino-1-one derivatives according to the invention yields exclusively syn-configured products, i.e. only those cyclic 2-amino-1-one derivatives in which the 2-amino group and the introduced 6-hydroxy group are arranged on the same side of the cyclohexane ring. In particular, this also represents a particular advantage of the present invention because not only can complex cleaning and separation steps be circumvented, but also in particular only those derivatives are synthesized in a targeted manner which are potentially effective as active ingredients or active analogues of ketamine and its metabolites. In particular, the configuration of the 2-amino group and the 6-hydroxy group is decisive for this, wherein in particular R,R-configured derivatives are preferred as well as potentially most effective.

Within the framework of the process according to the invention, it is thus provided in particular that the cyclic 2-amino-1-one derivative, in particular the 2-aminocyclohexan-1-one derivative or 2-aminocyclohexen-1-one derivative, preferably the 2-aminocyclohexan-1-one derivative, is selected from derivatives of the general formula XVII

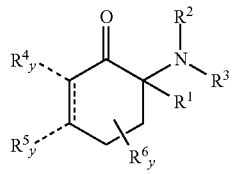

XVII with
$R^1$=aryl, heteroaryl;
in particular wherein $R^1$ for $R^1$=aryl is selected from annulated aryl residues, in particular selected from the group of naphthyl, anthracyl, phenanthryl residues and aryl residues of the general formula II

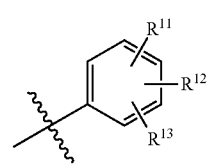

II with, each independently of the other,
$R^{11}$, $R^{12}$, $R^{13}$=H;
$NH_2$, OH, SH, F, Cl, Br, $NO_2$, in particular $NH_2$, OH, F, Cl;
$C_1$-$C_x$-monoalkylamino, $C_1$-$C_x$-dialkylamino, $C_1$-$C_x$-alkoxy, $C_1$-$C_x$-alkylsulfanyl, $C_1$-$C_x$-alkyl, $C_1$-$C_x$-perfluoroalkoxy, $C_1$-$C_x$-perfluoroalkyl, in particular $C_1$-$C_x$-monoalkylamino, $C_1$-$C_x$-alkoxy, $C_1$-$C_x$-alkyl, $C_1$-$C_x$-perfluoroalkoxy, $C_1$-$C_x$-perfluoroalkyl;
COOH, —$CONH_2$, COSH, CHO, in particular COOH, $CONH_2$;
COO($C_1$-$C_x$-alkyl), CONH($C_1$-$C_x$-alkyl), COS($C_1$-$C_x$-alkyl), C(O)($C_1$-$C_x$-alkyl), in particular COO($C_1$-$C_x$-alkyl), CONH($C_1$-$C_x$-alkyl);
phenyl, naphtyl;
and, in particular wherein $R^1$ for $R^1$=heteroaryl is selected from the group of 5-membered ring heteroaryls, in particular pyrryolyl, imidazyl, pyrazoyl, oxazyl, isoxazyl, thiazoyl, furyl, thienyl residues and substituted derivatives thereof, preferably pyrryolyl, imidazyl, pyrazoyl, thienyl residues and substituted derivatives thereof, and/or 6-membered heteroaryls, in particular pyridyl, pyrazyl, pyridazyl, pyrimidyl residues and substituted derivatives thereof, preferably pyridyl residues and substituted derivatives thereof;
$R^2$, $R^3$=each independently of the other,
H;
$C_1$-$C_x$-alky; $C_1$-$C_x$-cycloalkyl;
or together $C_1$-$C_x$-cycloalkyl, in particular pyrrolidyl, piperidyl, imidazyl, pyridyl residues and their substituted derivatives;
$R^4$, $R^5$, $R^6$=H;
$NH_2$, OH, SH, F, Cl, Br, $NO_2$, in particular $NH_2$, OH, SH;
$C_1$-$C_x$-monoalkylamino, $C_1$-$C_x$-dialkylamino, $C_1$-$C_x$-alkoxy, $C_1$-$C_x$-alkylsulfanyl, $C_1$-$C_x$-alkyl, $C_1$-$C_x$-perfluoroalkoxy, $C_1$-$C_x$-perfluoroalkyl, in particular $C_1$-$C_x$-monoalkylamino, $C_1$-$C_x$-alkoxy, $C_1$-$C_x$-alkyl, $C_1$-$C_x$-perfluoroalkoxy, $C_1$-$C_x$-perfluoroalkyl;
COOH, $CONH_2$, COSH, CHO, in particular COOH, $CONH_2$;
COO($C_1$-$C_x$-alkyl), CONH($C_1$-$C_x$-alkyl), COS($C_1$-$C_x$-alkyl), C(O)($C_1$-$C_x$-alkyl), in particular COO($C_1$-$C_x$-alkyl), CONH($C_1$-$C_x$-alkyl);
with
x=2 to 20, in particular 2 to 15, preferably 2 to 10; and
y=0, 1.
It is further preferred in the context of the present invention if the cyclic 2-amino-1-one derivative, in particular the 2-aminocyclohexan-1-one derivative or 2-aminocyclohexen-1-one derivative, preferably the 2-aminocyclohexan-1-one derivative, is selected from derivatives of the general formula XVIII

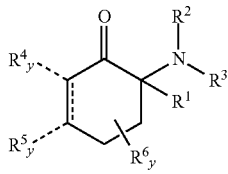

XVIII with
R$^1$=aryl, heteroaryl;
wherein R$^1$ for R$^1$=aryl is selected from aryl residues of the general formula IV

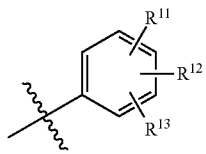

IV with, each independently of the other,
R$^{11}$, R$^{12}$, R$^{13}$=H;
NH$_2$, OH, F, Cl;
C$_1$-C$_x$-alkoxy, C$_1$-C$_x$-alkyl, C$_1$-C$_x$-perfluoroalkoxy, C$_1$-C$_x$-perfluoroalkyl;
COO(C$_1$-C$_x$-alkyl), CONH(C$_1$-C$_x$-alkyl);
and wherein R$^1$ for R$^1$=heteroaryl is selected from the group of pyridyl, pyrazyl, pyridazyl, pyrimidyl residues as well as substituted derivatives thereof and/or pyrryolyl, imidazyl, pyrazoyl, thienyl residues as well as substituted derivatives thereof;
R$^2$, R$^3$=each independently of the other,
H;
C$_1$-C$_x$-alky; C$_1$-C$_x$-cycloalkyl;
R$^4$, R$^5$, R$^6$=each independently of the other,
H;
NH$_2$, OH, SH;
C$_1$-C$_x$-monoalkylamino, C$_1$-C$_x$-alkoxy, C$_1$-C$_x$-alkyl, C$_1$-C$_x$-perfluoroalkoxy, C$_1$-C$_x$-perfluoroalkyl;
with
x=2 to 10, in particular 2 to 5, preferably 2 to 3; and
y=0, 1.

Furthermore, in a very particularly preferred embodiment of the present invention, it may be provided that the cyclic 2-amino-1-one derivative, in particular the 2-aminocyclohexan-1-one derivative or 2-aminocyclohexen-1-one derivative, preferably the 2-aminocyclohexan-1-one derivative, is selected from derivatives of the general formula XIX

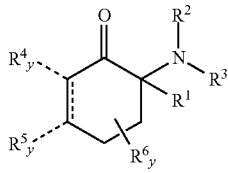

XIX with
R$^1$=aryl, heteroaryl;
wherein R$^1$ for R$^1$=aryl is selected from aryl residues of the general formula VI

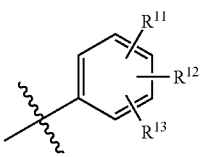

VI with, each independently of the other,
R$^{11}$, R$^{12}$, R$^{13}$=H;
NH$_2$, OH, F, Cl;
C$_1$-C$_x$-alkoxy, C$_1$-C$_x$-alkyl, C$_1$-C$_x$-perfluoroalkoxy, C$_1$-C$_x$-perfluoroalkyl;
and wherein R$^1$ for R$^1$=heteroaryl is selected from the group of thienyl residues, pyridyl residues as well as substituted derivatives thereof;
R$^2$, R$^3$=each independently of the other,
H;
C$_1$-C$_x$-alky; C$_1$-C$_x$-cycloalkyl;
R$^4$, R$^5$, R$^6$=each independently of the other,
H;
NH$_2$, OH, SH;
C$_1$-C$_x$-monoalkylamino, C$_1$-C$_x$-alkoxy, C$_1$-C$_x$-perfluoroalkoxy;
with
x=2 to 5, in particular 2 to 3; and
y=0, 1.

In the context of the present invention, in particular with regard to the residues R$^4$, R$^5$, R$^6$, it may thus preferably be provided that the cyclic 2-amino-1-one derivative comprises a cyclohexene framework or a cyclohexane framework. In the case that the cyclic 2-amino-1-one derivative comprises a cyclohexene framework, y=0 applies in particular to the residues R$^4$, R$^5$. If the cyclic 2-amino-1-one derivative comprises a cyclohexane framework, y=1 applies in particular to the residues R$^4$, R$^5$. This is illustrated in the aforementioned structural formulae by the dotted bonds to the residues R$^4$, R$^5$ and the dotted double bond.

As already mentioned at the outset, access to a large number of different derivatives of 2-amino-1-ketones can be achieved with the process according to the invention. In particular, within the scope of the targeted as well as short preparation process according to the present invention, a wide range of very different cyclic 2-amino-1-one derivatives can be generated in a simple manner and under mild process conditions from readily available starting compounds in only a few steps.

Furthermore, the preparation process according to the invention is characterized in particular by high conversions and yields as well as a high specificity or selectivity of the reactions carried out. Accordingly, the desired reaction products result in particular reliably from the respective reaction steps, whereas a production of by-products can hardly or not at all be observed or determined.

An essential component of the preparation process according to the invention is the initial cyclization reaction, which for the first time permits in particular the use of sterically demanding substituents, such as aryl or heteroaryl groups with optionally further sterically demanding or electron-rich residues, in a synthesis of cyclic 2-amino-1-one derivatives. In this way, the process according to the invention can also be used to provide, in particular, completely novel derivatives of cyclic 2-amino-1-ketones.

A further subject-matter of the present invention—according to a second aspect of the present invention—is a cyclic 3-ene-2-oxy-1-carboxylic acid derivative, its tautomers, stereoisomers, salts or solutions, wherein the compound is selected from compounds of the general formula IX

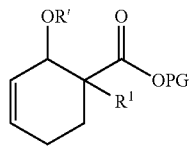

IX with
$R^1$=aryl, heteroaryl;
in particular wherein $R^1$ for $R^1$=aryl is selected from annulated aryl residues, in particular selected from the group of naphthyl, anthracyl, phenanthryl residues and aryl residues of the general formula II

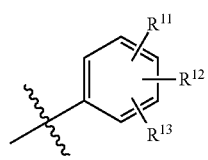

II with, each independently of the other,
$R^{11}$, $R^{12}$, $R^{13}$=H;
$NH_2$, OH, SH, F, Cl, Br, $NO_2$, in particular $NH_2$, OH, F, Cl;
$C_1$-$C_x$-monoalkylamino, $C_1$-$C_x$-dialkylamino, $C_1$-$C_x$-alkoxy, $C_1$-$C_x$-alkylsulfanyl, $C_1$-$C_x$-alkyl, $C_1$-$C_x$-perfluoroalkoxy, $C_1$-$C_x$-perfluoroalkyl, in particular $C_1$-$C_x$-monoalkylamino, $C_1$-$C_x$-alkoxy, $C_1$-$C_x$-alkyl, $C_1$-$C_x$-perfluoroalkoxy, $C_1$-$C_x$-perfluoroalkyl;
COOH, —$CONH_2$, COSH, CHO, in particular COOH, $CONH_2$;
COO($C_1$-$C_x$-alkyl), CONH($C_1$-$C_x$-alkyl), COS($C_1$-$C_x$-alkyl), C(O)($C_1$-$C_x$-alkyl), in particular COO($C_1$-$C_x$-alkyl), CONH($C_1$-$C_x$-alkyl);
phenyl, naphtyl;
with
x=2 to 20, in particular 2 to 15, preferably 2 to 10;
and, in particular wherein $R^1$ for $R^1$=heteroaryl is selected from the group of 5-membered ring heteroaryls, in particular pyrryolyl, imidazyl, pyrazoyl, oxazyl, isoxazyl, thiazoyl, furyl, thienyl residues and substituted derivatives thereof, preferably pyrryolyl, imidazyl, pyrazoyl, thienyl residues and substituted derivatives thereof, and/or 6-membered heteroaryls, in particular pyridyl, pyrazyl, pyridazyl, pyrimidyl residues and substituted derivatives thereof, preferably pyridyl residues and substituted derivatives thereof;
PG=pH-labile protecting group and/or redox-labile protecting group, in particular benzyl, para-methoxybenzyl, dimethoxybenzyl, alkyloxycarbonyl, triphenylmethyl, alkyl, allyl groups, more preferably para-methoxybenzyl, dimethoxybenzyl, alkyloxycarbonyl, triphenylmethyl groups, more preferably para-methoxybenzyl, alkyloxycarbonyl groups;
R'=trialkylsilyl, in particular trimethylsilyl, triethylsilyl, triisopropylsilyl, tert-butyldimethylsilyl, triphenylsily, tert-butyldiphenylsilyl; preferably triethylsilyl, triisopropylsilyl, tert-butyldimethylsilyl.

The cyclic 3-ene-2-oxy-1-carboxylic acid derivatives according to the invention are characterized in particular by their high structural diversity or variability and also by the possibility of being further modified or functionalized, in particular in the region of the double bond of the cyclohexene backbone. In this sense, the cyclohexenone derivatives according to the invention represent particularly versatile intermediates in the synthesis of cyclic 2-amino-1-one derivatives, which are both easily and inexpensively accessible and can be used in a variety of ways in subsequent reactions.

In this context, it is further preferred according to the invention if the cyclic 3-ene-2-oxy-1-carboxylic acid derivative is selected from compounds of the general formula X

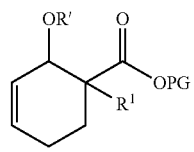

X with
$R^1$=aryl, heteroaryl
wherein $R^1$ for $R^1$=aryl is selected from aryl residues of the general formula IV

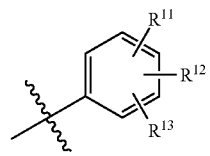

IV with, each independently of the other,
$R^{11}$, $R^{12}$, $R^{13}$=H;
$NH_2$, OH, F, Cl;
$C_1$-$C_x$-alkoxy, $C_1$-$C_x$-alkyl, $C_1$-$C_x$-perfluoroalkoxy, $C_1$-$C_x$-perfluoroalkyl;
COO($C_1$-$C_x$-alkyl), CONH($C_1$-$C_x$-alkyl);
and
x=2 to 10, in particular 2 to 5, preferably 2 to 3;
and wherein $R^1$ for $R^1$=heteroaryl is selected from the group of pyridyl, pyrazyl, pyridazyl, pyrimidyl residues as well as substituted derivatives thereof and/or pyrryolyl, imidazyl, pyrazoyl, thienyl residues as well as substituted derivatives thereof;
PG=pH-labile protecting group and/or redox-labile protecting group, in particular
para-methoxybenzyl, dimethoxybenzyl, alkyloxycarbonyl, triphenylmethyl group;
R'=triethylsilyl, triisopropylsilyl, tert-butyldimethylsilyl.

In a more preferred embodiment of the process according to the invention, it may also be provided that the cyclic 3-ene-2-oxy-1-carboxylic acid derivative is selected from compounds of the general formula XI

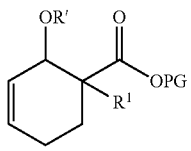

XI with
$R^1$=aryl, heteroaryl
wherein $R^1$ for $R^1$=aryl is selected from aryl residues of the general formula VI

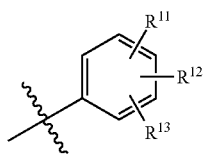

VI with, each independently of the other,
$R^{11}$, $R^{12}$, $R^{13}$=H;
NH$_2$, OH, F, Cl;
$C_1$-$C_x$-alkoxy, $C_1$-$C_x$-alkyl, $C_1$-$C_x$-perfluoroalkoxy, $C_1$-$C_x$-perfluoroalkyl;
and
x=2 to 5, in particular 2 to 3;
and wherein $R^1$ for $R^1$=heteroaryl is selected from the group of thienyl residues, pyridyl residues as well as substituted derivatives thereof;
PG=pH-labile protecting group and/or redox-labile protecting group, in particular
para-methoxybenzyl, dimethoxybenzyl, alkyloxycarbonyl;
R'=triethylsilyl, triisopropylsilyl, tert-butyldimethylsilyl.

For further details on the cyclic 3-ene-2-oxy-1-carboxylic acid derivatives according to the invention, reference can be made to the above explanations on the process according to the invention, which apply analogously with respect to the cyclic 3-ene-2-oxy-1-carboxylic acid derivatives.

Again, a further subject-matter of the present invention—according to a third aspect of the present invention—is a process for producing cyclic 3-ene-2-oxy-1-carboxylic acid derivatives, in particular according to the present invention, wherein an aromatic acrylic acid derivative, in particular an α-carbon aromatic-substituted acrylic acid derivative, is reacted in a cyclization reaction with a 1,3-butadienol derivative.

In accordance with the invention, it is preferably provided here that the cyclization reactions is a cycloaddition, in particular a [4+2]-cycloaddition, preferably a Diels-Alder reaction.

For carrying out the process according to the invention, it has also been well proven if the aromatic acrylic acid derivative is selected from compounds of the general formula I

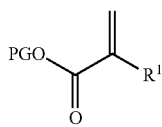

I with
$R^1$=aryl, heteroaryl
in particular wherein $R^1$ for $R^1$=aryl is selected from annulated aryl residues, in particular selected from the group of naphthyl, anthracyl, phenanthryl residues and aryl residues of the general formula II

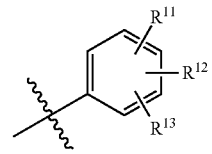

II with, each independently of the other,
$R^{11}$, $R^{12}$, $R^{13}$=H;
NH$_2$, OH, SH, F, Cl, Br, NO$_2$, in particular NH$_2$, OH, F, Cl;
$C_1$-$C_x$-monoalkylamino, $C_1$-$C_x$-dialkylamino, $C_1$-$C_x$-alkoxy, $C_1$-$C_x$-alkylsulfanyl, $C_1$-$C_x$-alkyl, $C_1$-$C_x$-perfluoroalkoxy, $C_1$-$C_x$-perfluoroalkyl, in particular $C_1$-$C_x$-monoalkylamino, $C_1$-$C_x$-alkoxy, $C_1$-$C_x$-alkyl, $C_1$-$C_x$-perfluoroalkoxy, $C_1$-$C_x$-perfluoroalkyl;
COOH, —CONH$_2$, COSH, CHO, in particular COOH, CONH$_2$;
COO($C_1$-$C_x$-alkyl), CONH($C_1$-$C_x$-alkyl), COS($C_1$-$C_x$-alkyl), C(O)($C_1$-$C_x$-alkyl), in particular COO ($C_1$-$C_x$-alkyl), CONH($C_1$-$C_x$-alkyl);
phenyl, naphtyl;
with
x=2 to 20, in particular 2 to 15, preferably 2 to 10;
and, in particular wherein $R^1$ for $R^1$=heteroaryl is selected from the group of 5-membered ring heteroaryls, in particular pyrryolyl, imidazyl, pyrazoyl, oxazyl, isoxazyl, thiazoyl, furyl, thienyl residues and substituted derivatives thereof, preferably pyrryolyl, imidazyl, pyrazoyl, thienyl residues and substituted derivatives thereof, and/or 6-membered heteroaryls, in particular pyridyl, pyrazyl, pyridazyl, pyrimidyl residues and substituted derivatives thereof, preferably pyridyl residues and substituted derivatives thereof;
PG=pH-labile protecting group and/or redox-labile protecting group,
in particular benzyl, para-methoxybenzyl, dimethoxybenzyl, alkyloxycarbonyl, triphenylmethyl, alkyl, allyl groups, more preferably para-methoxybenzyl, dimethoxybenzyl, alkyloxycarbonyl, triphenylmethyl groups, more preferably para-methoxybenzyl, alkyloxycarbonyl groups.

Particularly good results are obtained in the context of the present invention if the aromatic acrylic acid derivative is selected from compounds of the general formula III

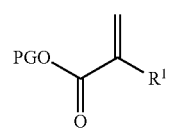

III with
R$^1$=aryl, heteroaryl;
wherein R$^1$ for R$^1$=aryl is selected from aryl residues of the general formula IV

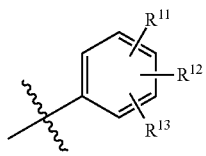

with, each independently of the other,
R$^{11}$, R$^{12}$, R$^{13}$=H;
NH$_2$, OH, F, Cl;
C$_1$-C$_x$-alkoxy, C$_1$-C$_x$-alkyl, C$_1$-C$_x$-perfluoroalkoxy, C$_1$-C$_x$-perfluoroalkyl;
COO(C$_1$-C$_x$-alkyl), CONH(C$_1$-C$_x$-alkyl);
and
x=2 to 10, in particular 2 to 5, preferably 2 to 3;
and wherein R$^1$ for R$^1$=heteroaryl is selected from the group of pyridyl, pyrazyl, pyridazyl, pyrimidyl residues as well as substituted derivatives thereof and/or pyrryolyl, imidazyl, pyrazoyl, thienyl residues as well as substituted derivatives thereof;
PG=pH-labile protecting group and/or redox-labile protecting group, in particular
para-methoxybenzyl, dimethoxybenzyl, alkyloxycarbonyl, triphenylmethyl group.

According to a very particularly preferred embodiment of the present invention, it is preferred if the aromatic acrylic acid derivative is selected from compounds of the general formula V

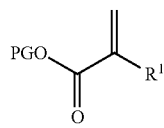

with
R$^1$=aryl, heteroaryl;
wherein R$^1$ for R$^1$=aryl is selected from aryl residues of the general formula VI

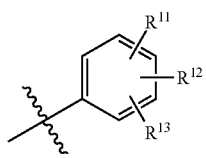

with, each independently of the other,
R$^{11}$, R$^{12}$, R$^{13}$=H;
NH$_2$, OH, F, Cl;
C$_1$-C$_x$-alkoxy, C$_1$-C$_x$-alkyl, C$_1$-C$_x$-perfluoroalkoxy, C$_1$-C$_x$-perfluoroalkyl;
and
x=2 to 5, in particular 2 to 3;
and wherein R$_1$ for R$_1$=heteroaryl is selected from the group of thienyl residues, pyridyl residues as well as substituted derivatives thereof;
PG=pH-labile protecting group and/or redox-labile protecting group, in particular
para-methoxybenzyl, dimethoxybenzyl, alkyloxycarbonyl.

With regard to the 1,3-butadienol derivative, it has proved advantageous in the context of the present invention if the 1,3-butadienol derivative is selected from electron-rich 1,3-butadienol derivatives, in particular from 1,3-butadienol derivatives of the general formula VII

with
R' =C1-Cx-alkyl, C1-Cx-vinyl, C1-Cx-allyl;
phenyl, benzyl;
trialkylsilyl;
and
x=2 to 10.

Particularly preferably, in the context of the present invention, the 1,3-butadienol derivative is selected from butadienoxysilanes of the general formula VIII

with
R'=trialkylsilyl;
trialkylsilyl, in particular trimethylsilyl, triethylsilyl, triisopropylsilyl, tert-butyldimethylsilyl, triphenylsily, tert-butyldiphenylsilyl; preferably triethylsilyl, triisopropylsilyl, tert-butyldimethylsilyl.

With regard to the reaction conditions or conditions during the reaction of the two aforementioned starting compounds in the cyclization reaction, these are generally known to the person skilled in the art.

However, particularly good results are obtained for the process according to the invention if the reaction of the aromatic acrylic acid derivative with the 1,3-butadienol derivative is carried out with a ratio of aromatic acrylic acid derivative to 1,3-butadienol derivative in the range from 0.5:1 to 1:20, in particular 1:1 to 1:15, preferably 1:2 to 1:10.

Furthermore, it has proved advantageous if the reaction is carried out in an inert solvent, in particular a solvent of cyclic, in particular aromatic, hydrocarbons, preferably tetrahydrofuran, xylene or mixtures thereof.

Likewise, it has been well proven in the process according to the invention if the reaction is carried out under supply of heat, in particular at temperatures in a range from 50 to 250° C., preferably 75 to 200° C., preferably 100 to 175° C.

In addition, it is preferably provided that the reaction is carried out over a period of 5 to 300 min, in particular 10 to 250 min, preferably 15 to 200 min.

Last but not least, particularly good results are obtained in the context of the present invention if the reaction is carried out in the presence of a radical scavenger, in particular in the presence of a dihydroxybenzene, preferably in the presence of hydroquinone.

The process for preparing cyclic 3-ene-2-oxy-1-carboxylic acid derivatives according to the invention is characterized in particular by a reliable achievement of high conversions, wherein, at the same time, a highly selective production of the desired reaction products can be observed. This is surprising in particular, since the process according to the invention also preferably involves the use of electron-rich or sterically tendentially hindered dienes, whose reactivity is correspondingly reduced. The fact that high conversions and good yields are nevertheless achieved is due in particular to the advantageous combination of starting compounds according to the invention, which was described for the first time in the context of the synthesis of cyclic 3-ene-2-oxy-1-carboxylic acid derivatives and cyclic 2-amino-1-one derivatives based thereon.

For further details on the process according to the invention, reference can be made to the above explanations on the other aspects of the invention, which apply accordingly with respect to processes according to the invention.

A further subject-matter of the present invention—according to a fourth aspect of the present invention—is a bicyclic carbamate derivative, its tautomers, stereoisomers, salts or solutions, characterized in that the compound is selected from compounds of the general formula XIII,

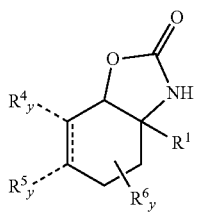

XIII with
$R^1$=aryl, heteroaryl;
  in particular wherein $R_1$ for $R_1$=aryl is selected from annulated aryl residues, in particular selected from the group of naphthyl, anthracyl, phenanthryl residues and aryl residues of the general formula II

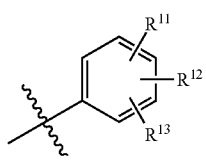

II with, each independently of the other,
$R^{11}$, $R^{12}$, $R^{13}$=H;
  $NH_2$, OH, SH, F, Cl, Br, $NO_2$, in particular $NH_2$, OH, F, Cl;
  $C_1$-$C_x$-monoalkylamino, $C_1$-$C_x$-dialkylamino, $C_1$-$C_x$-alkoxy, $C_1$-$C_x$-alkylsulfanyl, $C_1$-$C_x$-alkyl, $C_1$-$C_x$-perfluoroalkoxy, $C_1$-$C_x$-perfluoroalkyl, in particular $C_1$-$C_x$-monoalkylamino, $C_1$-$C_x$-alkoxy, $C_1$-$C_x$-alkyl, $C_1$-$C_x$-perfluoroalkoxy, $C_1$-$C_x$-perfluoroalkyl;
  COOH, —$CONH_2$, COSH, CHO, in particular COOH, $CONH_2$;
  COO($C_1$-$C_x$-alkyl), CONH($C_1$-$C_x$-alkyl), COS($C_1$-$C_x$-alkyl), C(O)($C_1$-$C_x$-alkyl), in particular COO($C_1$-$C_x$-alkyl), CONH($C_1$-$C_x$-alkyl);
  phenyl, naphtyl;
or wherein $R^1$ for $R^1$=heteroaryl is selected from the group of 5-membered ring heteroaryls, in particular pyrryolyl, imidazyl, pyrazoyl, oxazyl, isoxazyl, thiazoyl, furyl, thienyl residues and substituted derivatives thereof, preferably pyrryolyl, imidazyl, pyrazoyl, thienyl residues and substituted derivatives thereof, and/or 6-membered heteroaryls, in particular pyridyl, pyrazyl, pyridazyl, pyrimidyl residues and substituted derivatives thereof, preferably pyridyl residues and substituted derivatives thereof;
$R^2$, $R^3$=each independently of the other,
H;
$C_1$-$C_x$-alky; $C_1$-$C_x$-cycloalkyl;
$R^4$, $R^5$, $R^6$ =H;
  $NH_2$, OH, SH, F, Cl, Br, $NO_2$, in particular $NH_2$, OH, SH;
  $C_1$-$C_x$-monoalkylamino, $C_1$-$C_x$-dialkylamino, $C_1$-$C_x$-alkoxy, $C_1$-$C_x$-alkylsulfanyl, $C_1$-$C_x$-alkyl, $C_1$-$C_x$-perfluoroalkoxy, $C_1$-$C_x$-perfluoroalkyl, in particular $C_1$-$C_x$-monoalkylamino, $C_1$-$C_x$-alkoxy, $C_1$-$C_x$-alkyl, $C_1$-$C_x$-perfluoroalkoxy, $C_1$-$C_x$-perfluoroalkyl;
  COOH, $CONH_2$, COSH, CHO, in particular COOH, $CONH_2$;
  COO($C_1$-$C_x$-alkyl), CONH($C_1$-$C_x$-alkyl), COS($C_1$-$C_x$-alkyl), C(O)($C_1$-$C_x$-alkyl), in particular COO($C_1$-$C_x$-alkyl), CONH($C_1$-$C_x$-alkyl);
with
x=2 to 20, in particular 2 to 15, preferably 2 to 10; and
y=0, 1.

Like the cyclic 3-ene-2-oxy-1-carboxylic acid derivative, the bicyclic carbamate derivative according to the invention is characterized in particular by the fact that it comprises a special potential for further diverse modifications or functionalizations of the molecular structure.

Preferably, starting from the bicyclic carbamate derivative, a wide range of target compounds can be provided in a few and uncomplicated steps. In particular, these target compounds can be selected from derivatives of ketamine or its metabolites norketamine and 6-hydroxynorketamine.

Thus, the bicyclic carbamate derivative according to the invention, as well as the cyclic 3-ene-2-oxy-1-carboxylic acid derivative according to the invention, represents a central intermediate step in the facile synthesis of cyclic 2-amino-1-one derivatives. For example, starting from the bicyclic carbamate derivatives of the present invention, it is possible to prepare both cyclohexene-based and cyclohexane-based target compounds, which may further comprise a variant substitution pattern on the cyclohexane ring.

In the context of the present invention, it is particularly preferred if the compound, i.e. the bicyclic carbamate derivative, is selected from compounds of the general formula XIV

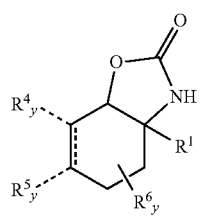

XIV with
R¹=aryl, heteroaryl;
  wherein R¹ for R¹=aryl is selected from aryl residues of the general formula IV

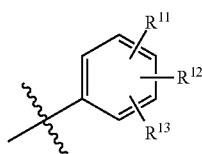

IV with, each independently of the other,
R¹¹, R¹², R¹³=H;
  NH$_2$, OH, F, Cl;
  C$_1$-C$_x$-alkoxy, C$_1$-C$_x$-alkyl, C$_1$-C$_x$-perfluoroalkoxy, C$_1$-C$_x$-perfluoroalkyl;
  COO(C$_1$-C$_x$-alkyl), CONH(C$_1$-C$_x$-alkyl);
and wherein R¹ for R¹=heteroaryl is selected from the group of pyridyl, pyrazyl, pyridazyl, pyrimidyl residues as well as substituted derivatives thereof and/or pyrryolyl, imidazyl, pyrazoyl, thienyl residues as well as substituted derivatives thereof;
R⁴, R⁵, R⁶=each independently of the other,
H;
NH$_2$, OH, SH;
C$_1$-C$_x$-monoalkylamino, C$_1$-C$_x$-alkoxy, C$_1$-C$_x$-alkyl, C$_1$-C$_x$-perfluoroalkoxy, C$_1$-C$_x$-perfluoroalkyl;
with
x=2 to 10, in particular 2 to 5, preferably 2 to 3; and
y=0, 1.

Furthermore, according to a more preferred embodiment of the present invention, it may be provided that the bicyclic carbamate derivative is selected from derivatives of the general formula XV

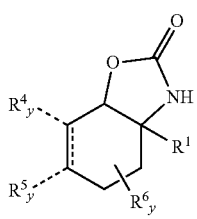

XV with
R¹=aryl, heteroaryl;
  wherein R¹ for R¹=aryl is selected from aryl residues of the general formula VI

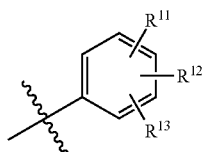

VI with, each independently of the other,
R¹¹, R¹², R¹³=H;
  NH$_2$, OH, F, Cl;
  C$_1$-C$_x$-alkoxy, C$_1$-C$_x$-alkyl, C$_1$-C$_x$-perfluoroalkoxy, C$_1$-C$_x$-perfluoroalkyl;
and wherein R¹ for R¹=heteroaryl is selected from the group of thienyl residues, pyridyl residues as well as substituted derivatives thereof;
R⁴, R⁵, R⁶=each independently of the other,
H;
NH$_2$, OH, SH;
C$_1$-C$_x$-monoalkylamino, C$_1$-C$_x$-alkoxy, C$_1$-C$_x$-perfluoroalkoxy;
with
x=2 to 5, in particular 2 to 3; and
y=0, 1.

For further details on the bicyclic carbamate derivatives according to the invention, reference can be made to the above explanations on the other aspects of the invention, which apply analogously with respect to the bicyclic carbamate derivatives.

Again, further subject-matter of the present invention—according to a fifth aspect of the present invention—is a process for preparing a bicyclic carbamate derivative, in particular according to the present invention, wherein a cyclic 3-ene-2-oxy-1-carboxylic acid derivative, in particular according to the present invention, is azided with an azide reagent.

In the process according to the invention, it has been well proven in this context if the protecting group (PG) and/or the residue R', in particular the protecting group (PG) and the residue R', are preferably removed under reductive and/or basic or acidic conditions.

In this sense, it is preferred according to the present invention if the removal of the protecting group (PG) and/or the residue R', in particular the protecting group (PG) and the residue R', is carried out hydrogenolytically, i.e. by reduction in the presence of hydrogen on a metal catalyst, and/or under basic or acidic conditions, preferably in the presence of fluoride ions, for example using tetrabutylammonium fluoride (TBAF). Equally, however, the present invention may also employ protocols for the removal of protecting groups commonly used by those skilled in the art.

In the context of a more preferably embodiment of the present invention, it is preferred if first the protecting group (PG) is removed hydrogenolytically, i.e. by reduction in the presence of hydrogen on a metal catalyst, and/or under basic or acidic conditions, before subsequently the residue R' is removed under basic or acidic conditions, in particular in the presence of fluoride ions. In this context, it is also preferably possible that the cyclohexene framework, in particular the double bond of the cyclohexene framework, is functionalized in the course of the removal of the protecting group (PG) or in advance of the removal of the residue R'.

With regard to the azidation conditions, it has furthermore proved advantageous in the context of the present invention if the azidation is carried out with a reagent selected from the group of inorganic azides, in particular sodium azide, and/or organic azides, in particular sulfonyl azides, phosphoryl azides, preferably tosylazide, diphenylphos-phorylazide, or mixtures thereof.

Here, particularly good results are obtained in the process according to the invention if the reagent for the azidation is used in a 1- to 20-fold excess, in particular a 1- to 10-fold excess, preferably a 1.5- to 7-fold excess, in each case based on the amount of the cyclic 3-ene-2-oxy-1-carboxylic acid derivative used.

Furthermore, particularly good results are obtained for the process according to the present invention if the azidation is carried out in the presence of a base, in particular an organic base, preferably a nitrogen base, more preferably a tertiary amine, more preferably triethylamine.

Alternatively, other bases, in particular nitrogen bases, may be used within the scope of the present invention, wherein suitable bases, in particular nitrogen bases, are in and of themselves familiar to those skilled in the art. Particularly preferably in the context of the present invention are generally those bases which comprise only low nucleophilic properties, as is the case, for example, for more highly substituted amines.

Likewise, it has proven advantageous if the azidation is carried out in an inert solvent, in particular a solvent of cyclic, in particular aromatic, hydrocarbons, preferably toluene.

Furthermore, it is preferred in accordance with the present invention if the azidation is carried out with the supply of heat, in particular at temperatures in a range from 40 to 200° C., preferably 50 to 150° C., preferably 60 to 125° C.

Finally, in the context of the present invention, it is preferably provided that the acidification is carried out over a period of 1 hour to 48 hours, in particular 1.5 to 36 hours, preferably 1.5 to 24 hours.

In particular, it is also provided in the context of the present invention that the carboxylic acid azide is cyclized to the carbamate, in particular by rearrangement to the corresponding isocyanate.

If, in addition, a further modification or functionalization is desired, it has proved particularly useful in the context of the present invention if, in a reaction step preceding the azidation, the cyclohexene framework, in particular the double bond of the cyclohexene framework, is functionalized, preferably to give compound XII

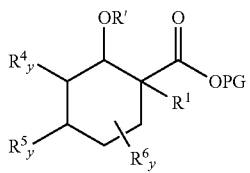

XII with the residues $R^4$, $R^5$, $R^6$, in particular wherein the residues $R^4$, $R^5$, $R^6$, each independently of the other, are selected from the group of
$R^4$, $R^5$, $R^6$ =H;
NH$_2$, OH, SH, F, Cl, Br, NO$_2$, in particular NH$_2$, OH, SH;
$C_1$-$C_x$-monoalkylamino, $C_1$-$C_x$-dialkylamino, $C_1$-$C_x$-alkoxy, $C_1$-$C_x$-alkylsulfanyl, $C_1$-$C_x$-alkyl, $C_1$-$C_x$-perfluoroalkoxy, $C_1$-$C_x$-perfluoroalkyl, in particular $C_1$-$C_x$-monoalkylamino, $C_1$-$C_x$-alkoxy, $C_1$-$C_x$-alkyl, $C_1$-$C_x$-perfluoroalkoxy, $C_1$-$C_x$-perfluoroalkyl;
COOH, CONH$_2$, COSH, CHO, in particular COOH, CONH$_2$;
COO($C_1$-$C_x$-alkyl), CONH($C_1$-$C_x$-alkyl), COS($C_1$-$C_x$-alkyl), C(O)($C_1$-$C_x$-alkyl), in particular COO($C_1$-$C_x$-alkyl), CONH($C_1$-$C_x$-alkyl);
with
x=2 to 20, in particular 2 to 15, preferably 2 to 10, more preferably 2 to 5, more preferably 2 to 3; and
y=0, 1, wherein y=1 for at least one of the residues $R^4$, $R^5$, $R^6$.

For further details on the process according to the present invention, reference can be made to the above explanations on the other aspects of the present invention, which apply analogously with respect to processes according to the present invention.

A further subject-matter of the present invention—according to a sixth aspect of the present invention—is a cyclic 2-amino-1-one derivative, in particular 2-aminocyclohexan-1-one derivative or 2-aminocyclohexen-1-one derivative, preferably 2-aminocyclohexan-1-one derivative, its tautomers, stereoisomers, salts or solutions, wherein the compound is selected from compounds of the general formula XVII,

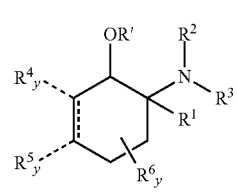

XVII with
$R^1$=aryl, heteroaryl;
in particular wherein $R^1$ for $R^1$=aryl is selected from annulated aryl residues, in particular selected from the group of naphthyl, anthracyl, phenanthryl residues and aryl residues of the general formula II

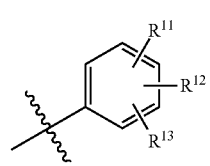

II with, each independently of the other,
$R^{11}$, $R^{12}$, $R^{13}$=H;
NH$_2$, OH, SH, F, Cl, Br, NO$_2$, in particular NH$_2$, OH, F, Cl;
$C_1$-$C_x$-monoalkylamino, $C_1$-$C_x$-dialkylamino, $C_1$-$C_x$-alkoxy, $C_1$-$C_x$-alkylsulfanyl, $C_1$-$C_x$-alkyl, $C_1$-$C_x$-perfluoroalkoxy, $C_1$-$C_x$-perfluoroalkyl, in particular $C_1$-$C_x$-monoalkylamino, $C_1$-$C_x$-alkoxy, $C_1$-$C_x$-alkyl, $C_1$-$C_x$-perfluoroalkoxy, $C_1$-$C_x$-perfluoroalkyl;
COOH, —CONH$_2$, COSH, CHO, in particular COOH, CONH$_2$;
COO($C_1$-$C_x$-alkyl), CONH($C_1$-$C_x$-alkyl), COS($C_1$-$C_x$-alkyl), C(O)($C_1$-$C_x$-alkyl), in particular COO ($C_1$-$C_x$-alkyl), CONH($C_1$-$C_x$-alkyl);
phenyl, naphtyl;
and, in particular wherein $R^1$ for $R^1$=heteroaryl is selected from the group of 5-membered ring heteroaryls, in particular pyrryolyl, imidazyl, pyrazoyl, oxazyl, isoxazyl, thiazoyl, furyl, thienyl residues and substituted derivatives thereof, preferably pyrryolyl, imidazyl, pyrazoyl, thienyl residues and substituted derivatives thereof, and/or 6-membered heteroaryls, in particular pyridyl, pyrazyl, pyridazyl, pyrimidyl residues and substituted derivatives thereof, preferably pyridyl residues and substituted derivatives thereof;

$R^2$, $R^3$=each independently of the other,

H;

$C_1$-$C_x$-alky; $C_1$-$C_x$-cycloalkyl;

or together $C_1$-$C_x$-cycloalkyl, in particular pyrrolidyl, piperidyl, imidazyl, pyridyl residues and their substituted derivatives;

$R^4$, $R^5$, $R^6$ =H;

$NH_2$, OH, SH, F, Cl, Br, $NO_2$, in particular $NH_2$, OH, SH;

$C_1$-$C_x$-monoalkylamino, $C_1$-$C_x$-dialkylamino, $C_1$-$C_x$-alkoxy, $C_1$-$C_x$-alkylsulfanyl, $C_1$-$C_x$-alkyl, $C_1$-$C_x$-perfluoroalkoxy, $C_1$-$C_x$-perfluoroalkyl, in particular $C_1$-$C_x$-monoalkylamino, $C_1$-$C_x$-alkoxy, $C_1$-$C_x$-alkyl, $C_1$-$C_x$-perfluoroalkoxy, $C_1$-$C_x$-perfluoroalkyl;

COOH, $CONH_2$, COSH, CHO, in particular COOH, $CONH_2$;

COO($C_1$-$C_x$-alkyl), CONH($C_1$-$C_x$-alkyl), COS($C_1$-$C_x$-alkyl), C(O)($C_1$-$C_x$-alkyl), in particular COO($C_1$-$C_x$-alkyl), CONH($C_1$-$C_x$-alkyl);

with x=2 to 20, in particular 2 to 15, preferably 2 to 10; and y=0, 1.

In particular, it is preferred in the context of the present invention if the compound, i.e., the cyclic 2-amino-1-one derivative, is selected from compounds of the general formula XVIII

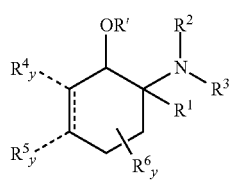

XVIII with $R^1$=aryl, heteroaryl;

wherein $R^1$ for $R^1$=aryl is selected from aryl residues of the general formula IV

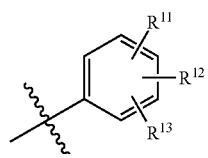

IV with, each independently of the other, $R^{11}$, $R^{12}$, $R^{13}$=H;

$NH_2$, OH, F, Cl;

$C_1$-$C_x$-alkoxy, $C_1$-$C_x$-alkyl, $C_1$-$C_x$-perfluoroalkoxy, $C_1$-$C_x$-perfluoroalkyl;

COO($C_1$-$C_x$-alkyl), CONH($C_1$-$C_x$-alkyl);

and wherein $R^1$ for $R^1$=heteroaryl is selected from the group of pyridyl, pyrazyl, pyridazyl, pyrimidyl residues as well as substituted derivatives thereof and/or pyrryolyl, imidazyl, pyrazoyl, thienyl residues as well as substituted derivatives thereof;

$R^2$, $R^3$=each independently of the other,

H;

$C_1$-$C_x$-alky; $C_1$-$C_x$-cycloalkyl;

$R^4$, $R^5$, $R^6$=each independently of the other,

H;

$NH_2$, OH, SH;

$C_1$-$C_x$-monoalkylamino, $C_1$-$C_x$-alkoxy, $C_1$-$C_x$-alkyl, $C_1$-$C_x$-perfluoroalkoxy, $C_1$-$C_x$-perfluoroalkyl;

with x=2 to 10, in particular 2 to 5, preferably 2 to 3; and y=0, 1.

Furthermore, in a very particularly preferred embodiment of the present invention, it may be provided that the cyclic 2-amino-1-one derivative, in particular the 2-aminocyclohexan-1-one derivative or 2-aminocyclohexen-1-one derivative, preferably the 2-aminocyclohexan-1-one derivative, is selected from derivatives of the general formula XIX

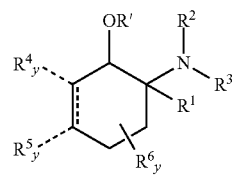

XIX with $R^1$=aryl, heteroaryl;

wherein $R^1$ for $R^1$=aryl is selected from aryl residues of the general formula VI

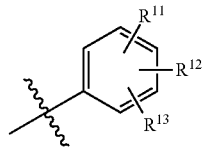

VI with, each independently of the other, $R^{11}$, $R^{12}$, $R^{13}$=H;

$NH_2$, OH, F, Cl;

$C_1$-$C_x$-alkoxy, $C_1$-$C_x$-alkyl, $C_1$-$C_x$-perfluoroalkoxy, $C_1$-$C_x$-perfluoroalkyl;

and wherein $R^1$ for $R^1$=heteroaryl is selected from the group of thienyl residues, pyridyl residues as well as substituted derivatives thereof;

$R^2$, $R^3$=each independently of the other,

H;

$C_1$-$C_x$-alky; $C_1$-$C_x$-cycloalkyl;

$R^4$, $R^5$, $R^6$=each independently of the other,

H;

$NH_2$, OH, SH;

$C_1$-$C_x$-monoalkylamino, $C_1$-$C_x$-alkoxy, $C_1$-$C_x$-perfluoroalkoxy;

with x=2 to 5, in particular 2 to 3; and y=0, 1.

It is now preferred in the context of the present invention if the compound, i.e. the cyclic 2-amino-1-one derivative, is selected from the group of

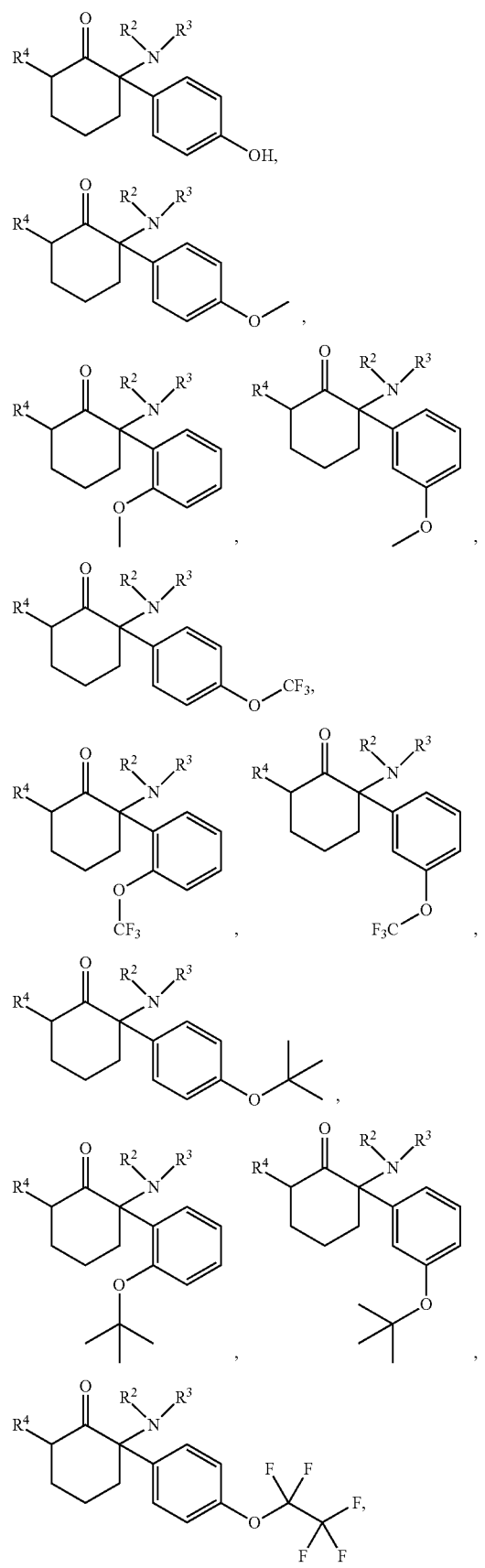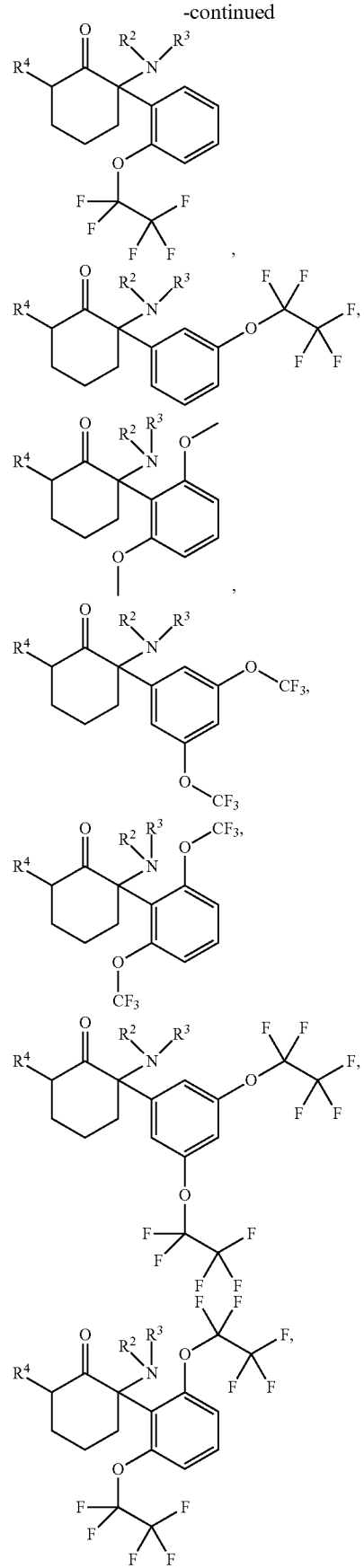

-continued
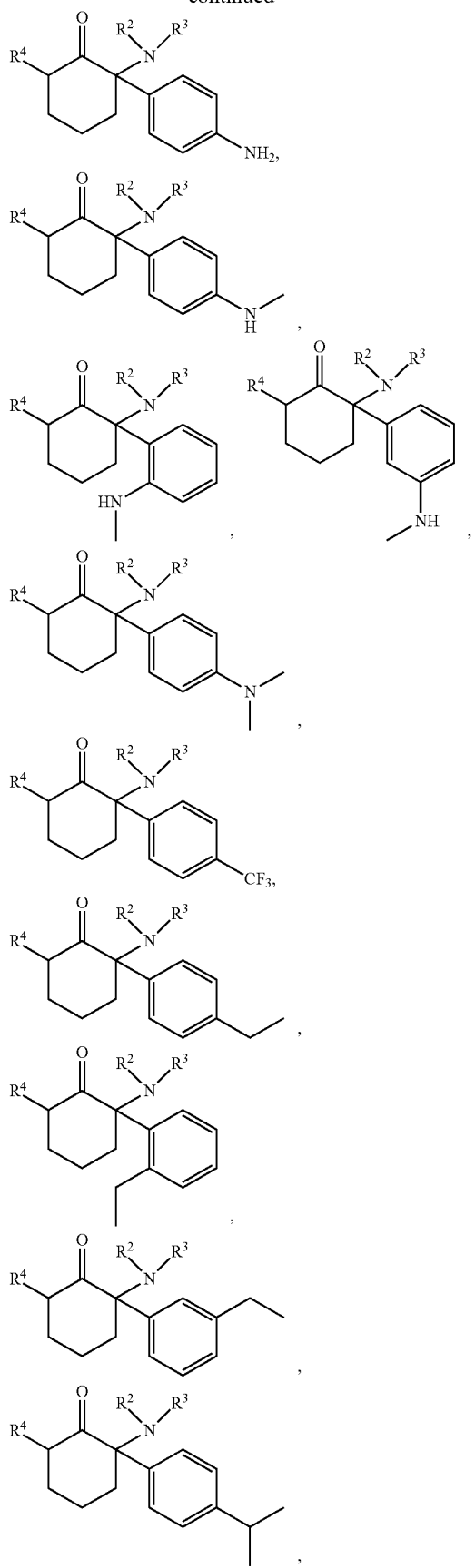
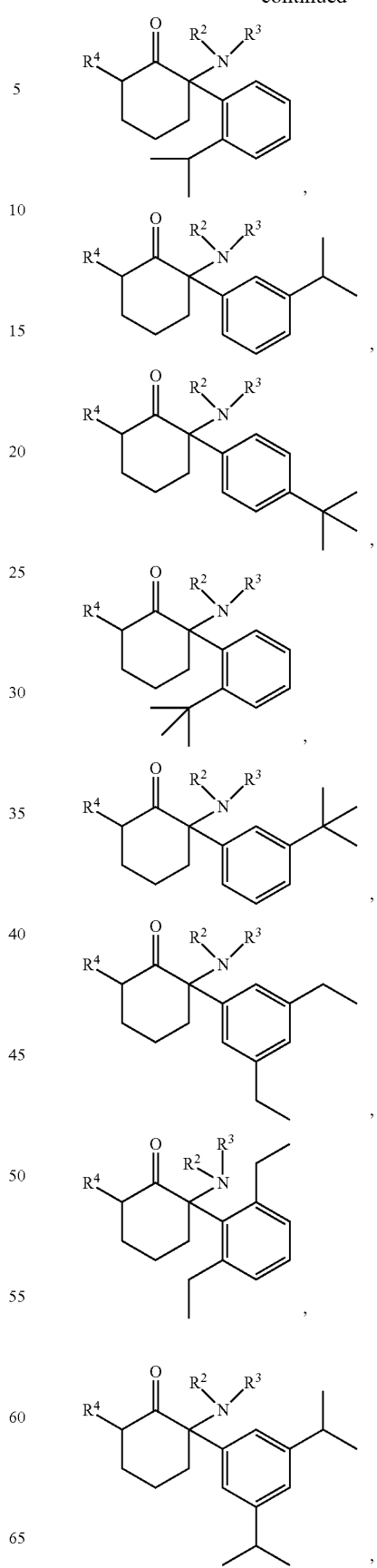

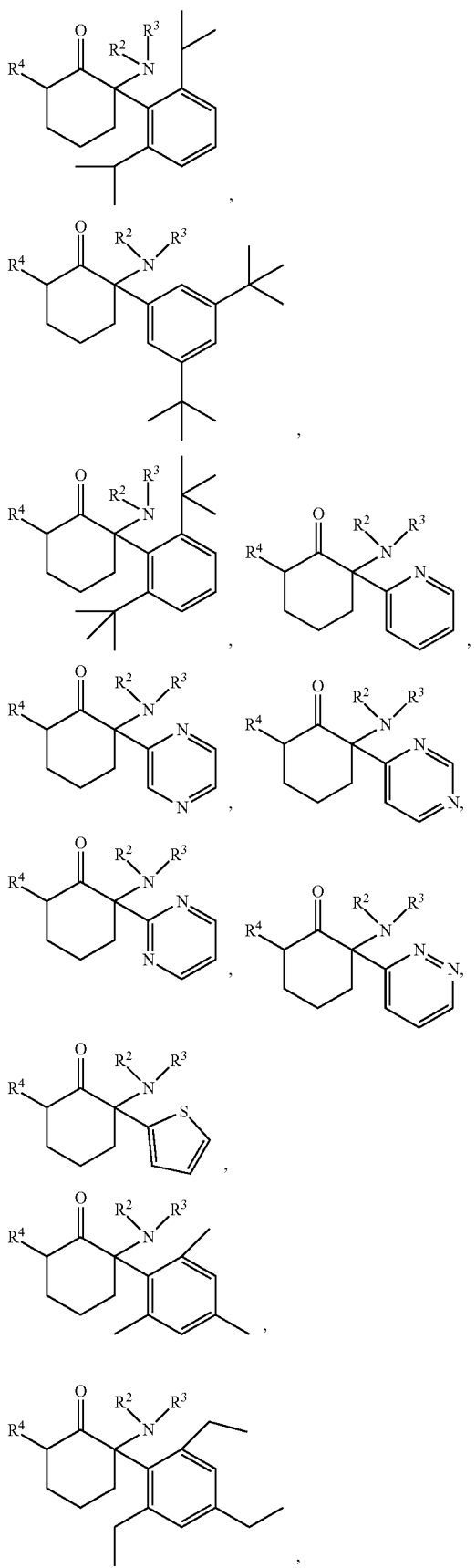
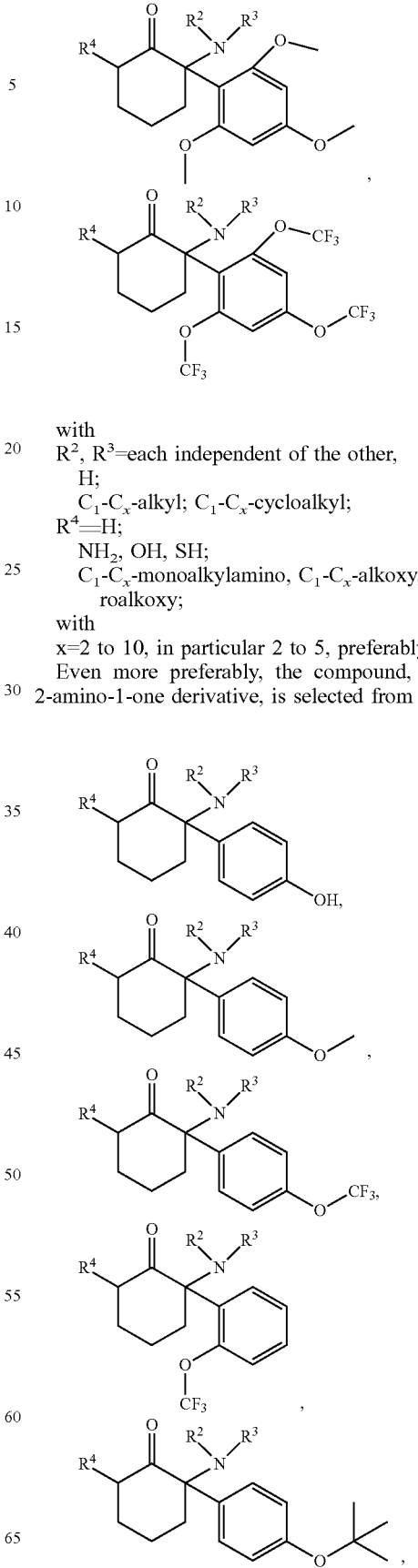
with
R², R³=each independent of the other,
H;
$C_1$-$C_x$-alkyl; $C_1$-$C_x$-cycloalkyl;
R⁴=H;
NH₂, OH, SH;
$C_1$-$C_x$-monoalkylamino, $C_1$-$C_x$-alkoxy, $C_1$-$C_x$-perfluoroalkoxy;
with
x=2 to 10, in particular 2 to 5, preferably 2 to 3.
Even more preferably, the compound, i.e., the cyclic 2-amino-1-one derivative, is selected from the group of

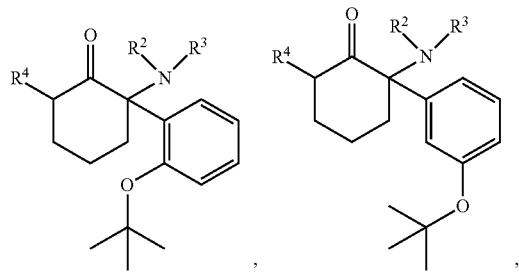
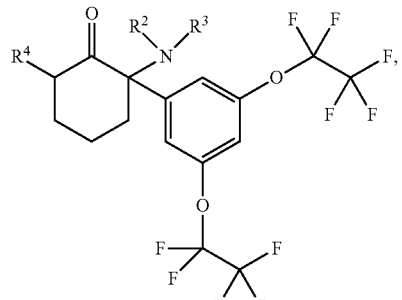
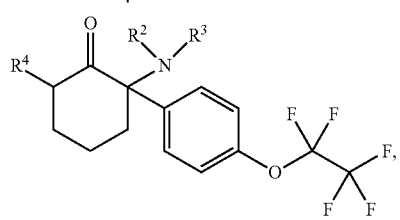
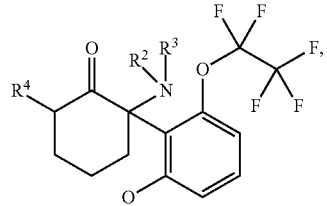
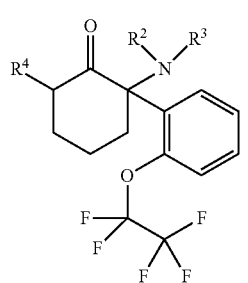
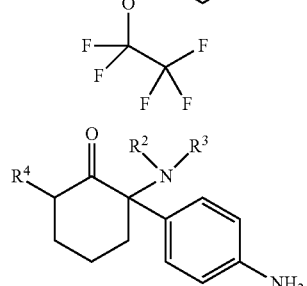
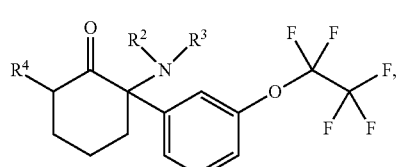
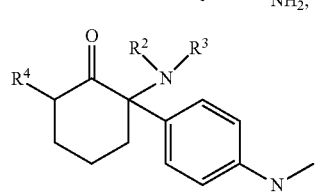
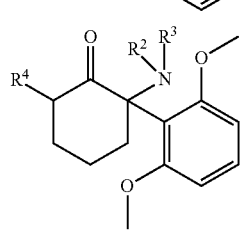
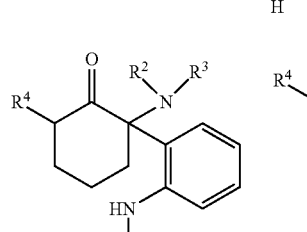
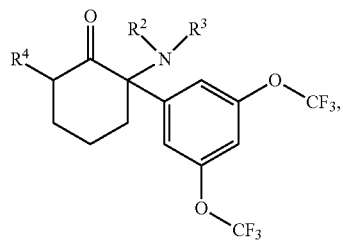
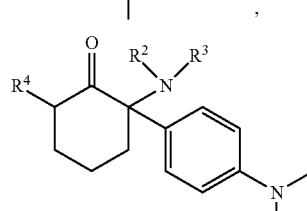
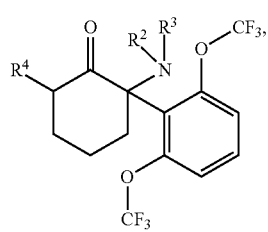
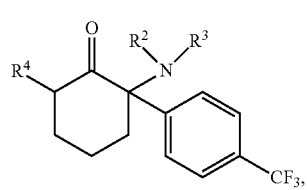

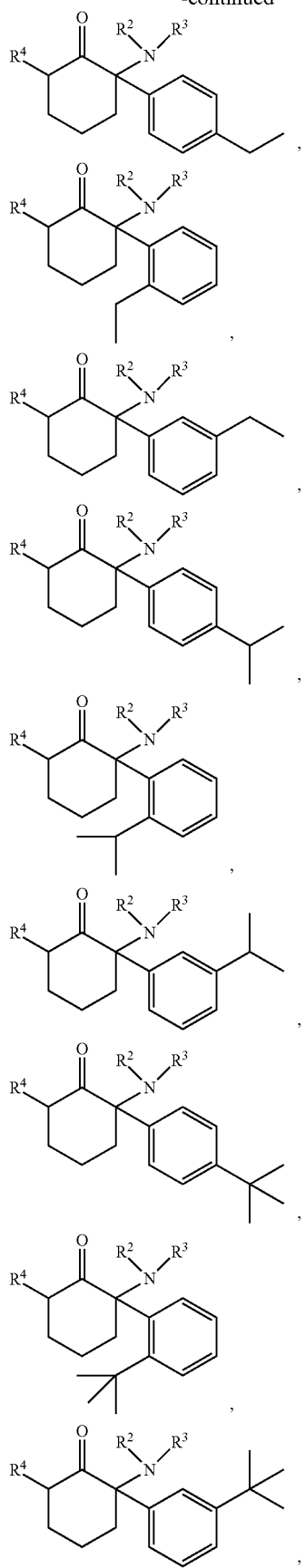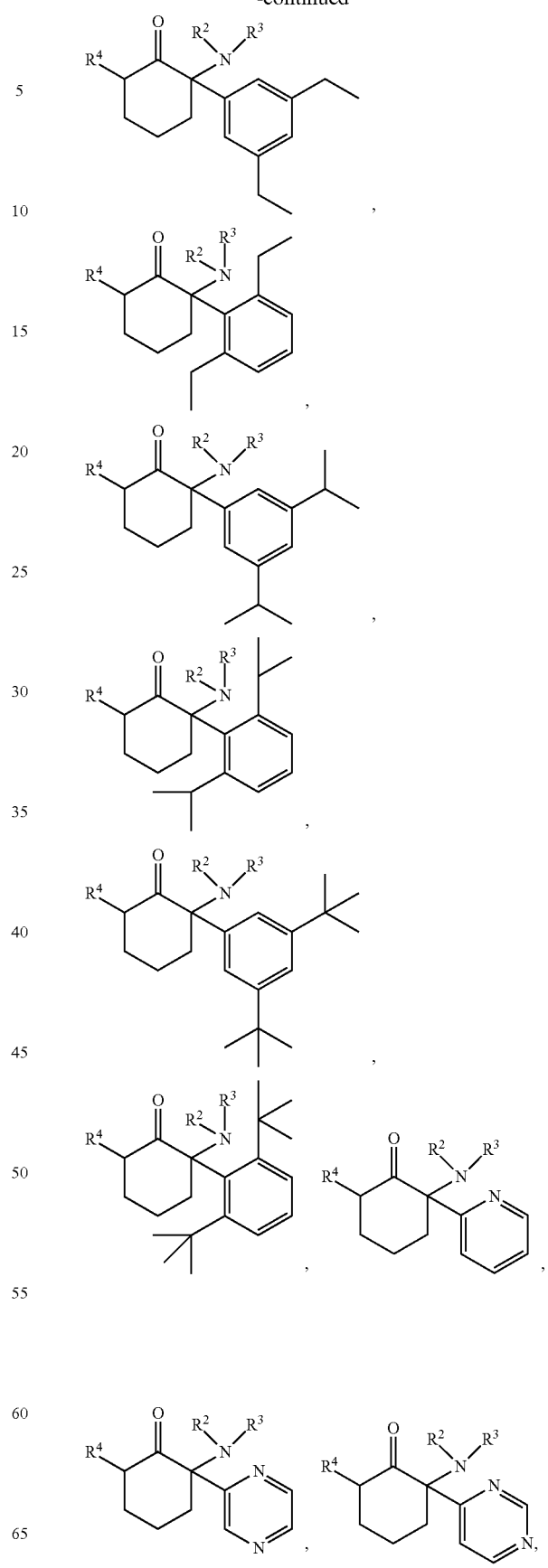

-continued

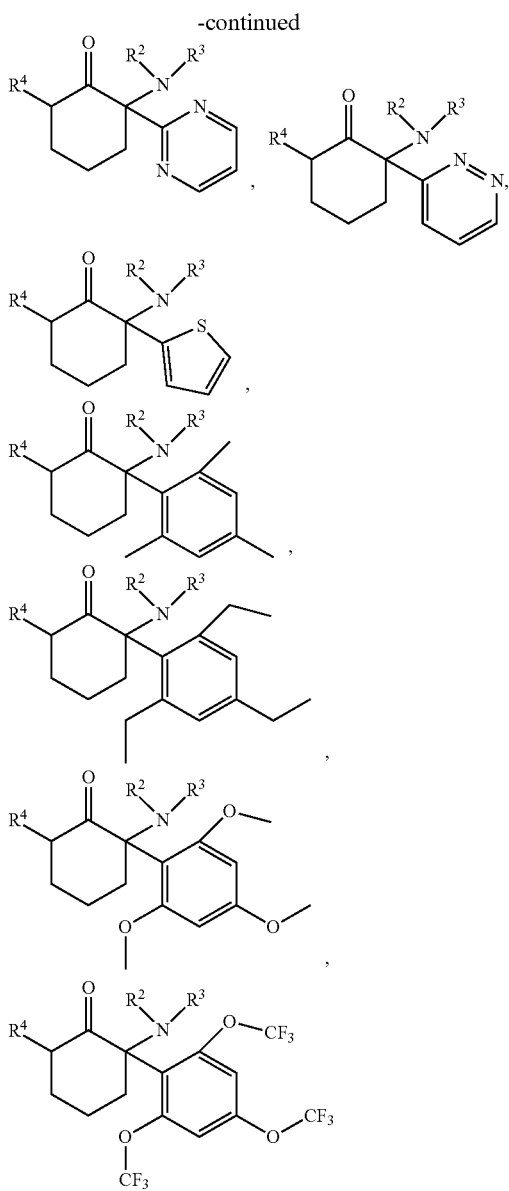

with
R³, R³=each independent of the other,
H;
$C_1$-$C_x$-alkyl; $C_1$-$C_x$-cycloalkyl;
R⁴=H;
NH₂, OH, SH;
$C_1$-$C_x$-monoalkylamino, $C_1$-$C_x$-alkoxy, $C_1$-$C_x$-perfluoroalkoxy;
with
x=2 to 10, in particular 2 to 5, preferably 2 to 3.

For further details on the cyclic 2-amino-1-one derivatives according to the invention, reference can be made to the above explanations on the other aspects of the invention, which apply analogously with respect to the cyclic 2-amino-1-one derivatives.

A further subject-matter of the present invention—according to a seventh aspect of the present invention—is the use of cyclic 2-amino-1-one derivatives according to the invention, in particular 2-aminocyclohexan-1-one derivatives or 2-aminocyclohexen-1-one derivatives, preferably 2-aminocyclohexan-1-one derivatives, their tautomers, stereoisomers, salts or solutions, for use in stimulating and/or restoring neuronal plasticity of neurons.

In this sense also subject-matter of the present invention is the use of cyclic 2-amino-1-one derivatives, in particular 2-aminocyclohexan-1-one derivatives or 2-aminocyclohexen-1-one derivatives, preferably 2-aminocyclohexan-1-one derivatives, according to the present invention or obtainable by the process according to the invention, their tautomers, stereoisomers, salts or solutions, for stimulating and/or restoring neuronal plasticity of neurons.

For further details on the use of cyclic 2-amino-1-one derivatives according to the invention, reference can be made to the above explanations on the other aspects of the invention, which apply analogously with respect to the use according to the invention.

Again a further subject-matter of the present invention—according to an eighth aspect of the present invention—are cyclic 2-amino-1-one derivatives according to the invention, in particular 2-aminocyclohexan-1-one derivatives or 2-aminocyclohexen-1-one derivatives, preferably 2-aminocyclohexan-1-one derivatives, their tautomers, stereoisomers, salts or solutions, for use in stimulating and/or restoring synaptic plasticity of neurons.

In this sense also subject-matter of the present invention is the use of cyclic 2-amino-1-one derivatives, in particular 2-aminocyclohexan-1-one derivatives or 2-aminocyclohexen-1-one derivatives, preferably 2-aminocyclohexan-1-one derivatives, according to the present invention or obtainable by the process according to the invention, their tautomers, stereoisomers, salts or solutions, for stimulating and/or restoring the synaptic plasticity of neurons.

For further details on the use of cyclic 2-amino-1-one derivatives according to the present invention, reference can be made to the above explanations on the other aspects of the invention, which apply analogously with respect to the use according to the present invention.

A further subject-matter of the present invention—according to a ninth aspect of the present invention—are cyclic 2-amino-1-one derivatives according to the invention, in particular 2-aminocyclohexan-1-one derivatives or 2-aminocyclohexen-1-one derivatives, preferably 2-aminocyclohexan-1-one derivatives, their tautomers, stereoisomers, salts or solutions, for use as a medicament, in particular in the prophylactic or therapeutic treatment of diseases of the human or animal body, preferably neurodegenerative diseases, in particular dementia, Alzheimer's disease, Parkinson's disease, and/or mental diseases, in particular depression.

In particular, it has been observed for the cyclic 2-amino-1-one derivatives according to the invention that they are able to initiate processes which can contribute to the restoration of synaptic plasticity of nerve cells. The compounds of the invention contribute to this in an advantageous manner, in particular by supporting the formation and further branching of dendrites of the nerve cells.

In this way, neurodegenerative processes can ultimately be stopped, if not reversed, so that in particular an effective treatment of underlying neurodegenerative diseases can be made possible on the basis of the compounds according to the invention.

Also, the cyclic 2-amino-1-one derivatives according to the invention have the potential to effectively support the regeneration of nerve cells during rehabilitation after strokes, traumatic or hypoxic brain damage.

For further details on the use of the cyclic 2-amino-1-one derivatives according to the present invention, reference can be made to the above explanations on the other aspects of the invention, which apply analogously with respect to the use.

Finally, a further subject-matter of the present invention—according to a tenth aspect of the present invention—is a pharmaceutical composition, in particular drug or medicament, comprising cyclic 2-amino-1-one derivatives, in particular 2-aminocyclohexan-1-one derivatives or 2-aminocyclohexen-1-one derivatives, preferably 2-aminocyclohexan-1-one derivatives, according to the present invention, preferably for use in the prophylactic or therapeutic treatment of diseases of the human or animal body, in particular neurodegenerative diseases, in particular dementia and/or neurocognitive disorder due to Alzheimer's disease, Parkinson's disease, Pick's disease, craniocerebral trauma, Huntington's disease, with Lewy bodies, and/or mental diseases, in particular depression.

For further details of the pharmaceutical composition, reference can be made to the above explanations on the other aspects of the invention, which apply analogously with respect to the composition.

The subject-matter of the present invention will be illustrated below in a non-limiting manner with reference to examples of embodiments.

EXEMPLARY EMBODIMENTS

The preparation process according to the invention and in particular the individual reaction steps of the preparation process according to the invention are to be further illustrated by means of the following embodiments.

In overview, it is thereby preferably provided according to the invention that the process for preparing cyclic 2-amino-1-one derivatives proceeds according to the following general reaction scheme, wherein reference is made to the above explanations on the individual aspects of the present invention for the definitions of the residues R', PG, $R^1$, $R^2$, $R^3$, $R^4_y$, $R^5_y$, and $R^6_y$:

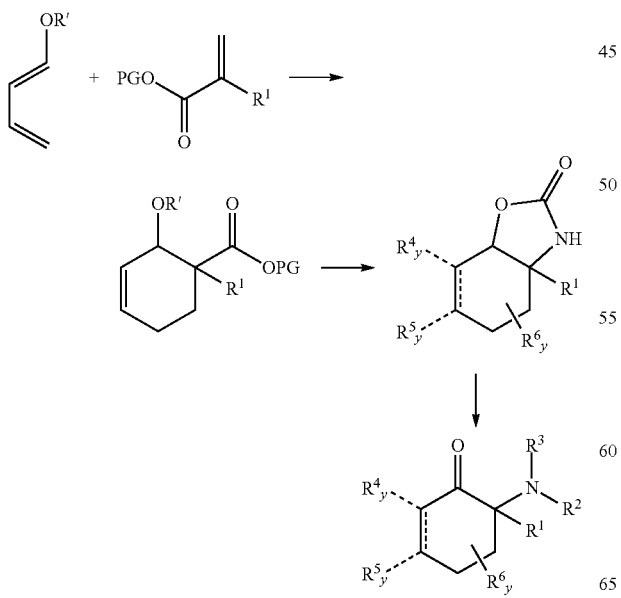

1. Synthesis of cyclic 3-ene-2-oxy-1-carboxylic acid Derivates

1.1. General Procedure

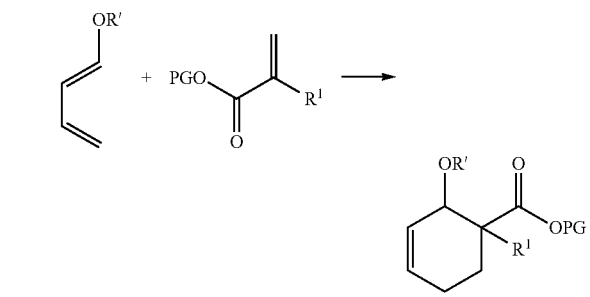

To a solution of the aromatic acrylic acid derivative in xylene and/or THF, a 2- to 8-fold excess of the 1,3-butadienol derivative is added at room temperature. The resulting mixture is then stirred at 75° C. to 200° C. for 5 to 250 minutes.

After this time, the reaction is terminated by removing the solvent in vacuo. The residue obtained is purified by column chromatography on silica gel using a solvent mixture of cyclohexane and ethyl acetate.

1.2. Specific Examples (a) Synthesis of rac-4-methoxybenzyl-6-((triethylsilyl)oxy)-1,2,3,6-tetrahydro[1,1'-biphenyl]-1-carboxylate To a solution of 134 mg of 4-methoxybenzyl-2-phenylacrylate (0.50 mmol, 1.00 eq.) in 0.5 ml of o-xylene, 553 mg of (E)-(buta-1,3-dien-1-yloxy)triethylsilane (3.00 mmol, 6.00 eq.) and a small spatula tip of hydroquinone are added. The reaction mixture is heated in the microwave at 140° C. for 20 minutes.

After removal of the solvent under reduced pressure, the residue is purified by column chromatography on silica gel (0→10% ethyl acetate vs. cyclohexane).

180 mg (0.40 mmol, 80%) of an endo/exo mixture (1:1) of rac-4-methoxybenzyl-6-((triethylsilyl)oxy)-1,2,3,6-tetrahydro-[1,1'-biphenyl]-1-carboxylate is obtained as a colorless oil.

(b) Synthesis of rac-methyl 2'-methoxy-6-((triethylsilyl)oxy)-3,6-dihydro-[1,1'-biphenyl]-1(2H)-carboxylate To a solution of 96 mg methyl 2-(2'-methoxy) phenylacrylate (0.50 mmol, 1.00 eq.) in 0.5 ml o-xylene, 368 mg (E)-(buta-1,3-dien-1-yloxy)triethylsilane (2.00 mmol, 4.00 eq.) and a small spatula tip of hydroquinone are added. The reaction mixture is heated in a microwave oven at 140° C. for 6 h.

After removal of the solvent under reduced pressure, the residue is purified by column chromatography on silica gel (0→10% ethyl acetate versus cyclohexane).

117 mg (0.31 mmol, 62%) of an endo/exo mixture (9:1) of rac-methyl 2'-methoxy-6-((triethylsilyl)oxy)-3,6-dihydro-[1,1'-biphenyl]-1(2H)-carboxylate is obtained as a colorless oil.

(c) Synthesis of rac-4-methoxybenzyl-6-((triethylsilyl)oxy)-2'-(trifluoromethoxy)-3,6-dihydro-[1,1'-biphenyl]-1(2H)-carboxylate To a solution of 96 mg of 4-methoxybenzyl-2-(2'-trifluoromethoxy) phenylacrylate (0.26 mmol, 1.00 eq.) in 0.3 ml of o-xylene is added 167 mg of (E)-(buta-1,3-dien-1-yloxy) triethylsilane (2.00 mmol, 4.00 eq.) and a small spatula tip of hydroquinone. The reaction mixture is heated in a microwave oven at 140° C. for 7 h.

After removal of the solvent under reduced pressure, the residue is purified by column chromatography on silica gel (0→10% ethyl acetate versus cyclohexane).

60 mg (0.11 mmol, 42%) of an endo-/exo mixture (3:1) of rac-4-methoxybenzyl-6-((triethylsilyl)oxy)-2'-(trifluoromethoxy)-3,6-dihydro-[1,1'-biphenyl]-1(2H)-carboxylate is obtained as a colorless oil.

1.3. Overview and Characterization of the Prepared Cyclic 3-Ene-2-Oxy-1-Carboxylic Acid Derivates The following table gives an overview of the 3-ene-2-oxy-1-carboxylic acid derivatives prepared according to the invention and the yields obtained in each case.

| product | characterization |
|---|---|
| 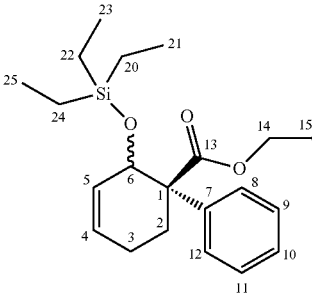<br>(endo-/exo-mix (1:1))<br>yield: 80% | $^1$H-NMR (400 MHz, CDCl$_3$): δ [ppm] = 7.37-6.69 (m, 9H, H8-12, H16-17), 6.03-5.67 (m, 2H, H4/H5), 5.18-4.60 (m, 3H, H6/H14), 3.82-3.71 (m, 3H, H19), 2.55-1.34 (m, 4H, H2/H3), 0.97-0.65 (m, 9H, H21/H23/H25), 0.62-0.09 (m, 6H, H20/H22/H24).<br>$^{13}$C-NMR (101 MHz, CDCl$_3$): δ [ppm] = 174.1, 174.0, 159.4, 159.2, 141.4, 139.5, 131.5, 129.9, 129.5, 129.3, 128.8, 128.4, 128.1, 128.0, 128.0, 127.0, 126.8, 126.7, 126.7, 126.7, 113.7, 113.6, 68.2, 67.1, 66.1, 65.8, 55.3, 55.3, 55.2, 55.0, 25.0, 23.9, 23.1, 22.8, 7.0, 6.7, 5.5, 4.8. |
| 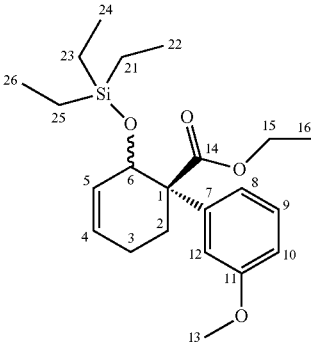<br>(endo-/exo-mix (1:1))<br>yield: 73% | $^1$H-NMR (400 MHz, CDCl$_3$): δ [ppm] = 7.36-6.68 (m, 8H, H8-10/H12/H17-18), 5.99-5.69 (m, 2H, H4-5), 5.16-4.61 (m, 3H, H6/H15), 3.85-3.68 (m, 6H, H13/H20), 2.50-1.38 (m, 4H, H2-3), 1.02-0.68 (m, 9H, H22/H24/H26), 0.62-0.15 (m, 6H, H21/H23/H25).<br>$^{13}$C-NMR (101 MHz, CDCl$_3$): δ [ppm] = 174.0, 173.8, 159.4, 159.4, 159.2, 159.2, 143.0, 141.1, 131.6, 130.1, 129.9, 129.5, 129.4, 128.9, 128.8, 128.4, 128.1, 127.0, 119.3, 119.2, 113.7, 113.6, 113.1, 112.8, 112.2, 111.5, 68.3, 67.1, 66.1, 65.8, 55.3, 55.2, 55.1, 55.1, 25.2, 23.9, 23.1, 22.8, 6.9, 6.7, 5.4, 4.8. |
| 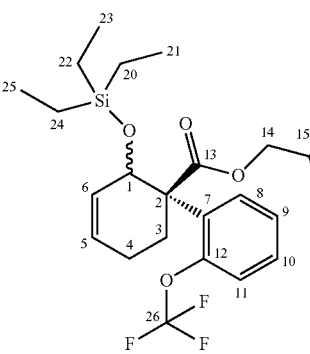<br>endo-/exo-mix (3:1))<br>yield: 42% | $^1$H-NMR (400 MHz, CDCl$_3$): δ [ppm] = 7.49-6.79 (m, 8H, H8-11, H16-17), 6.06-5.69 (m, 2H, H5-6), 5.20-4.82 (m, 2H, H14), 4.70 (m, 1H, H1), 3.79 (m, 3H, H19), 2.42-1.28 (m, 4H, H3-4), 0.98-0.69 (m, 9H, H21/H23/H25), 0.60-0.22 (m, 6H, H20/H22/H24).<br>$^{13}$C-NMR (101 MHz, CDCl$_3$): δ [ppm] = 174.15, 173.34, 159.30, 159.20, 147.71, 147.60, 131.97, 131.32, 131.31, 130.41, 130.04, 129.71, 129.54, 129.23, 128.26, 128.18, 128.13, 127.94, 127.35, 127.24, 125.15, 125.09, 121.69, 121.68, 117.57, 116.82, 113.65, 113.63, 68.44, 66.67, 66.67, 66.39, 66.14, 55.25, 55.25, 53.57, 53.10, 26.17, 23.26, 23.23, 22.95, 6.92, 6.62, 5.43, 4.78. |

| product | characterization |
|---|---|
| (endo-/exo-mix (9:1))<br>yield: 62% | $^1$H-NMR (400 MHz, CDCl$_3$): δ [ppm] = 7.38-6.78 (m, 4H, H8-11), 6.03-5.72 (m, 2H, H5-6), 4.72-4.56 (m, 1H, H1), 3.74 (s, 3H, H21), 3.61-3.53 (m, 3H, H14), 2.53-1.25 (m, 4H, H3-4), 0.98-0.69 (m, 9H, H16/H18/H20), 0.63-0.17 (m, 6H, H15/H17/H19).<br>$^{13}$C-NMR (101 MHz, CDCl$_3$): δ [ppm] = 174.68, 157.06, 131.65, 129.31, 127.95, 127.69, 127.67, 119.91, 110.93, 68.53, 55.24, 53.11, 51.38, 23.09, 22.78, 6.89, 5.39. |
| (endo-/exo-mix (1:1))<br>yield: 79% | $^1$H-NMR (400 MHz, CDCl$_3$): δ [ppm] = 7.58-6.69 (m, 8H, H8-9/H17-18), 6.05-5.67 (m, 2H, H4-5), 5.17-4.61 (m, 3H, H6/H15), 3.80-3.76 (m, 3H, H20), 2.57-1.30 (m, 4H, H2-3), 0.98-0.63 (m, 9H, H22/H24/H26), 0.63-0.11 (m, 6H, H21/H23/H25).<br>$^{13}$C-NMR (101 MHz, CDCl$_3$): δ [ppm] = 173.4, 173.2, 159.6, 159.4, 145.5, 143.7, 131.7, 130.0, 129.5, 129.1, 128.9, 128.0, 127.7, 127.2, 127.1, 126.7, 124.9, 124.9, 113.7, 113.6, 68.2, 66.6, 66.4, 66.1, 55.5, 55.2, 55.2, 55.2, 25.0, 23.7, 23.2, 22.6, 6.9, 6.6, 5.4, 4.8. |
| (endo-/exo-mix (2:1))<br>yield: 78% | $^1$H-NMR (400 MHz, CDCl$_3$): δ [ppm] = 7.52-6.72 (m, 8H, H8-11, H16-17), 6.05-5.67 (m, 2H, H4-5), 5.15-4.55 (m, 3H, H6/H14), 3.77-3.73 (m, 3H, H19), 2.58-1.17 (m, 4H, H2-3), 0.96-0.70 (m, 9H, H21/H23/H25), 0.61-0.23 (m, 6H, H20/H22/H24).<br>$^{13}$C-NMR (101 MHz, CDCl$_3$): δ [ppm] = 173.6, 173.3, 159.4, 159.3, 139.2, 137.8, 133.5, 131.9, 130.8, 130.5, 130.1, 129.9, 129.7, 129.2, 128.3, 128.1, 128.1, 127.9, 127.4, 127.1, 126.2, 126.0, 113.6, 68.8, 66.4, 66.4, 55.6, 55.2, 55.1, 26.9, 23.4, 23.0, 22.3, 7.0, 6.7, 5.5, 4.8. |
| (endo-/exo-mix (8:3))<br>yield: 92% | $^1$H-NMR (400 MHz, CDCl$_3$): δ [ppm] = 8.56 (d, $^3$J = 4.8 Hz, 1H, H11), 7.59 (t, $^3$J = 7.8, 1H, H9), 7.24 (d, $^3$J = 8.0 Hz, 1H, H8), 7.13 (dd, $^3$J = 7.5, 4.8, 1H, H10), 6.01-5.95 (m, 1H, H5), 5.76-5.70 (m, 1H, H4), 5.04 (d, $^3$J = 5.1 Hz, 1H, H6), 3.61 (s, 3H, H13), 2.50-2.33 (m, 2H, H2), 2.08-1.97 (m, 1H, H3A), 1.45-1.26 (m, 1H, H3B), 0.96 (t, $^3$J = 7.9 Hz, 9H, H15/H17/H19), 0.62 (q, $^3$J = 7.9, 6H, H14/H16/H18).<br>$^{13}$C-NMR (101 MHz, CDCl$_3$): δ [ppm] = 173.9 (s, 1C, C12), 159.4 (s, 1C, C7), 149.1 (d, 1C, C11), 136.0 (d, 1C, C9), 130.7 (d, 1C, C4), 127.5 (d, 1C, C5), 121.7 (d, 1C, C8), 121.2 (d, 1C, C10), 66.8 (d, 1C, C6), 58.0 (s, 1C, C1), 51.9 (q, 1C, C13), 24.6 (t, 1C, C2), 22.6 (t, 1C, C3), 6.9 (q, 3C, C15/C17/C19), 5.4 (t, 3C, C14/C16/C18). |

2. Synthesis of Bicyclic Carbamate Derivates

2.1. General Procedure

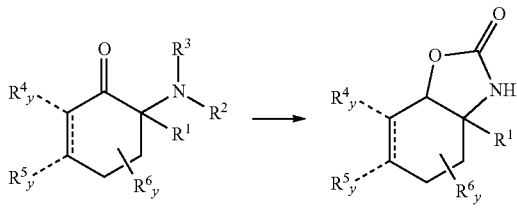

The cyclic 3-ene-2-oxy-1-carboxylic acid derivatives obtained from the first reaction step are first deprotected or deblocked under standard conditions, i.e. the PG and R' residues are removed according to general standard protocols, e.g. under reductive or acidic conditions. The crude mixtures obtained are then purified by column chromatography on silica gel using a solvent mixture of cyclohexane and ethyl acetate.

The deprotected or deblocked cyclic 3-ene-2-oxy-1-carboxylic acid derivatives are dissolved in THF or toluene in a next sub-step of the second reaction step, and a 1- to 5-fold excess of triethylamine and a 1- to 5-fold excess of diphenylphosphoryl azide are added. The resulting reaction mixture is stirred at 40 to 125° C. for 1 to 36 hours.

The reaction is terminated by addition of water, and the residue obtained after aqueous work-up and extraction is purified by column chromatography on silica gels using a solvent mixture of cyclohexane and ethyl acetate.

Furthermore, in the course of preparing the bicyclic carbamate, modification of the double bond of the cyclohexene framework can also be carried out. For example, a hydrogenation of the double bond can also be achieved in the course of a reductive removal of the protective group PG. For this purpose, a reaction of the cyclic 3-ene-2-oxy-1-carboxylic acid derivatives in particular under a hydrogen atmosphere in the presence of a palladium catalyst is suitable. However, reaction procedures in this regard are also generally known.

Other modification variants, such as the opening of the double bond in the course of substitution reactions, for example with heteroatom (groups) such as in particular halogens or hydroxy groups, can also preferably be carried out in the course of preparing the bicyclic carbamate.

2.2. Specific example: Synthesis of 3a-phenylhexahydrobenzo[d]oxazol-2(3H)-one 180 mg (0.40 mmol, 1.00 eq.) rac-4-methoxybenzyl 6-((triethylsilyl)oxy)-1,2,3,6-tetrahydro-[1,1'-biphenyl]-1-carboxylate is dissolved in 4 ml methanol, a spatula tip of palladium (10%) on activated charcoal is added and the reaction mixture is stirred under a hydrogen atmosphere at room temperature for 17 hours.

The catalyst is then filtered off and the filtrate is freed from the solvent in vacuo. The residue is dissolved in 4 ml dichloromethane, the solution is cooled to 0° C. and 308 µl trifluoroacetic acid (4.00 mmol, 10.00 eq.) is added. After stirring for 4 h at room temperature, the solvent is removed using a rotary evaporator and the residue is purified by column chromatography on silica gel (0→40% ethyl acetate versus cyclohexane) to give 81 mg (0.37 mmol, 92%) of an endo/exo mixture (3:2) of 2-hydroxy-1-phenylcyclohexanecarboxylic acid as a colorless oil.

In another approach, to 163 mg of the 2-hydroxy-1-phenylcyclohexanecarboxylic acid (0.74 mmol, 1.00 eq.) dissolved in 6.5 ml toluene, 308 µl of triethylamine (2.22 mmol, 3.00 eq.) and 479 µl of diphenylphosphoryl azide (2.22 mmol, 3.00 eq.) are added. The solution is first heated to 80° C. for 2 hours, wherein gas evolution is observed, and then stirred overnight at room temperature.

To the reaction mixture, add 10 ml ethyl acetate and 10 ml water, and extract with ethyl acetate (3×10 ml). The combined organic phases are washed with a saturated NaHCO$_3$ solution and a saturated NaCl solution, dried over Na$_2$SO$_4$, filtered and concentrated in vacuo. The residue is purified by column chromatography on silica gel (0→60% ethyl acetate vs. cyclohexane) to give 115 mg of an endo/exo mixture (1:1) 3a-phenylhexahydrobenzo[d]oxazol-2(3H)-one (0.53 mmol, 72%) as a light yellow oil.

2.3. Overview and Characterization of the Bicyclic Carbamate Derivatives Prepared The following table provides an overview of the bicyclic carbamate derivatives prepared according to the invention and the yields obtained in each case.

| product | characterization |
|---|---|
| structure with numbered atoms; yield: 58% | $^1$H NMR (400 MHz, CDCl$_3$): δ [ppm] = 7.42 (d, $^3$J = 8.2 Hz, 2H, H9), 7.37-7.23 (m, 3H, H10-11), 6.28 (d, $^3$J = 10.2 Hz, 1H, H6), 5.53-5.36 (m, 2H, NH/H5), 5.28 (s, 1H, H7), 2.69 (dd, J = 12.7, 7.4 Hz, 1H, H3A), 2.36-2.09 (m, 2H, H3B/H4A), 1.86-1.72 (m, 1H, H4B).<br>$^{13}$C-NMR (101 MHz, CDCl$_3$): δ [ppm] = 160.2 (s, 1C, C1), 139.1 (s, 1C, C8), 128.7 (d, 2C, C10/C12), 128.1 (d, 1C, C11), 127.9 (d, 1C, C5), 126.6 (d, 2C, C9/C13), 123.4 (d, 1C, C6), 83.3 (d, 1C, C7), 64.7 (s, 1C, C2), 31.4 (t, 1C, C3), 24.7 (t, 1C, C4). |

| product | characterization |
|---|---|
| 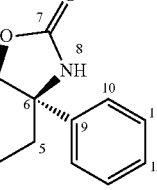<br>yield: 23% | ¹H NMR (400 MHz, CDCl₃): δ [ppm] = 7.49 (s, 1H, NH), 7.41-7.28 (m, 5H, H9-13), 6.36-6.21 (m, 1H, H5), 6.06-5.91 (m, 1H, H6), 5.05-4.94 (m, 1H, H7), 2.30 (m, 1H, H4A), 2.15-1.86 (m, 3H, H4B/H3).<br>¹³C-NMR (101 MHz, CDCl₃): δ [ppm] = 159.6 (s, 1C, C1), 143.1 (s, 1C, C8), 134.6 (d, 1C, C5), 128.9 (d, 2C, C10), 127.8 (d, 1C, C11), 124.6 (d, 2C, C9), 123.3 (d, 1C, C6), 78.3 (d, 1C, C7), 61.9 (s, 1C, C8), 33.5 (t, 1C, C3), 21.6 (t, 1C, C4). |
| 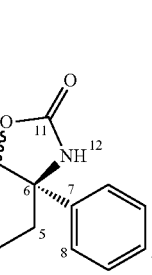<br>yield: 72% | ¹H-NMR (400 MHz, CDCl₃): δ [ppm] = 7.66-7.22 (m, 5H, H₈₋₁₀), 6.66 and 5.77 (s, 1H, H₁₂), 4.75-4.39 (m, 1H, H₁), 2.86-1.11 (m, 8H, H₂₋₅).<br>¹³C-NMR (101 MHz, CDCl₃) δ [ppm] = 160.2, 159.6, 143.3, 139.8, 129.4, 128.8, 128.1, 127.8, 126.6, 125.3, 87.5, 82.2, 64.2, 61.9, 34.9, 33.9, 25.8, 24.7, 24.3, 21.8, 19.6, 17.8. |

3. Synthesis of Cyclic 2-amino-1-one Derivates

3.1. General Procedure

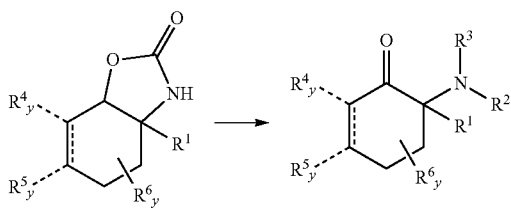

The bicyclic carbamate derivatives from the previous reaction step are dissolved in THF or dioxane and a 3- to 20-fold excess of a lithium salt, for example lithium aluminum hydride or lithium hydroxide, is added. The reaction mixtures obtained are then stirred at 25 to 180° C. for 15 to 24 hours.

After this time, the reaction is terminated by the addition of water or dilute hydrochloric acid, whereupon the reaction mixture is worked up aqueously and the crude product is freed from the remaining organic solvent after separation of the water phase.

Subsequently, the residue obtained is dissolved in acetone and a 3- to 8-fold excess of chromium(VI) oxide in conc. sulfuric acid is added in the cold. The obtained reaction mixture is stirred for 1 to 5 hours at −10 to 40° C. The reaction is finally terminated by the addition of isopropanol, whereupon aqueous work-up is carried out and the product is finally isolated by extraction.

3.2. Specific Example: Synthesis of 2-(methylamino)-2-phenylcyclohexanone

To a solution of 115 mg 3a-phenylhexahydrobenzo[d]oxazol-2(3H)-one (0.53 mmol, 1.00 eq.) in 2.5 ml THF, add 100 mg lithium aluminum hydride (2.60 mmol, 5.00 eq.) in portions at 0° C. After stirring the grayish suspension for one hour at room temperature, the mixture is refluxed for 17 hours.

After cooling to room temperature, the suspension is diluted with 3 ml of ether and cooled to 0° C. Then 100 µl of water, 100 µl of a 15% aqueous NaOH solution, and another 300 µl of water are added dropwise. After stirring for 15 minutes at room temperature, anhydrous MgSO₄ is added and the mixture is stirred for another 15 minutes. The solid is then filtered off and the filtrate is freed from the solvent under reduced pressure.

The residue obtained is dissolved in 10.6 ml acetone and mixed dropwise at 0° C. with 1.1 ml of a 2 M solution of CrO₃ in H₂SO₄ (2.20 mmol, 4.15 eq.). The reaction is then stirred for 2 hours at room temperature and then terminated by the addition of 20 ml of isopropanol. The solution is adjusted to pH 12 with 2 M NaOH, the aqueous phase is extracted with ether (3×10 ml), the combined organic phases are dried over Na₂SO₄, filtered and freed from solvent using a rotary evaporator to give 106 mg (0.52 mmol, 99%) of 2-(methylamino)-2-phenylcyclohexanone as a yellow oil.

3.3. Overview and Characterization of the Prepared Cyclic 2-Amino-1-One Derivatives In the following table, an overview of the cyclic 2-amino-1-one derivatives prepared according to the invention and the yields obtained in each case are given in turn.

| product | characterization |
|---|---|
| 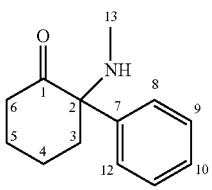<br>yield: 99% | $^1$H-NMR (400 MHz, CDCl$_3$): δ [ppm] = 7.39-7.27 (m, 2H, H9/H11), 7.24-7.18 (m, 1H, H10), 7.18-7.13 (m, 2H, H8/H12), 2.86-2.77 (m, 1H, H3A), 2.38-2.19 (m, 2H, H6), 1.95 (s, 3H, H13), 1.93-1.84 (m, 1H, H5A), 1.80-1.60 (m, 4H, H3B/H5B/H4).<br>$^{13}$C-NMR (101 MHz, CDCl$_3$): δ [ppm] = 211.5 (s, 1C, C1), 138.8 (s, 1C, C7), 128.8 (d, 2C, C9/C11), 127.5 (d, 1C, C10), 127.1 (d, 2C, C8/C12), 69.9 (s, 1C, C2), 39.8 (t, 1C, C6), 35.4 (t, 1C, C3), 28.9 (q, 1C, C13), 27.8 (t, 1C, C5), 22.3 (t, 1C, C4). |
| 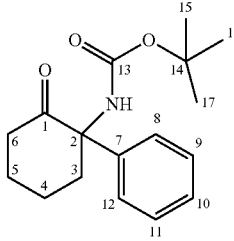<br>yield: 76% | $^1$H-NMR (400 MHz, CDCl$_3$): δ [ppm] = 7.38-7.32 (m, 4H, H8-9/H11-12), 7.31-7.24 (m, 1H, H10), 6.34 (s, 1H, NH), 3.62 (d, $^3$J = 12.9 Hz, 1H, H3A), 2.39 (d, $^3$J = 13.3 Hz, 1H, H6A), 2.34-2.19 (m, 1H, H6B), 2.05-1.90 (m, 2H, H3B/H5A), 1.90-1.80 (m, 2H, H4), 1.80-1.65 (m, 1H, H5B), 1.32 (s, 9H, H15-17).<br>$^{13}$C-NMR (101 MHz, CDCl$_3$): δ [ppm] = 208.0 (s, 1C, C1), 153.6 (s, 1C, C13), 138.0 (s, 1C, C7), 128.6 (d, 2C, C9/C11), 127.7 (d, 2C, C8/C12), 127.3 (d, 1C, C10), 79.0 (s, 1C, C14), 66.4 (s, 1C, C2), 38.7 (t, 1C, C6), 36.1 (t, 1C, 3), 28.3 (q, 3C, C15-17), 28.2 (t, 1C, C5), 22.6 (t, 1C, C4). |
| 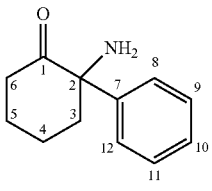<br>yield: 75% over three steps starting from the carbamate | $^1$H-NMR (400 MHz, CDCl$_3$): δ [ppm] = 7.38 (t, $^3$J = 7.6 Hz, 2H, H9/H11), 7.31 (m, 1H, H10), 7.26 (d, $^3$J = 7.6 Hz, 2H, H8/H12), 2.93-2.82 (m, 1H, H3A), 2.50-2.32 (m, 2H, H6), 2.03-1.92 (m, 1H, H5A), 1.84-1.63 (m, 4H, H3B/H4/H5B).<br>$^{13}$C-NMR (101 MHz, CDCl$_3$): δ [ppm] = 213.5 (s, 1C, C1), 141.6 (s, 1C, C7), 129.3 (d, 2C, C9/C11), 127.8 (d, 1C, C10), 126.1 (d, 2C, C8/C12), 66.5 (s, 1C, C2), 39.9 (t, 1C, C6), 39.3 (t, 1C, C3), 28.2 (t, 1C, C5), 22.H (t, 1C, C4). |
| 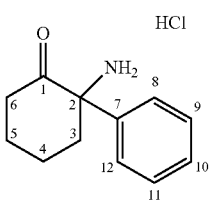<br>yield: 75% over three steps starting from the carbamate | $^1$H-NMR (400 MHz, CD$_3$OD): δ [ppm] = 7.50-7.40 (m, 3H, H9-11), 7.40-7.34 (m, 2H, H8/H12), 3.10-3.02 (m, 1H, H3A), 2.45-2.29 (m, 2H, H6), 2.06-1.93 (m, 2H, H3B, H5A), 1.90-1.77 (m, 1H, H4A), 1.77-1.60 (m, 2H, H4B/H5B).<br>$^{13}$C-NMR (101 MHz, CD$_3$OD): δ [ppm] = 205.7 (s, 1C, C1), 132.8 (s, 1C, C7), 130.0 (d, 1C, C10), 129.8 (d, 2C, C9/C11), 127.1 (d, 2C, C8/C12), 66.9 (s, 1C, C2), 38.5 (t, 1C, C6), 34.3 (t, 1C, C3), 27.3 (t, 1C, C5), 21.4 (t, 1C, C4). |

4. Modification of the Cyclohexane Backbone of Cyclic 2-amino-1-one Derivatives The cyclic 2-amino-1-one derivatives prepared according to the invention can be further modified in a variety of ways. In particular, the cyclohexane framework can be provided here with additional functional groups or further residues, such as alkyl residues.

Particularly preferably in this context is a hydroxylation of the cyclohexane framework in the 6-position, which can be achieved, for example, via a Rubottom oxidation, as explained below under item 4.1. using the example of the synthesis of tertbutyl-(1-(2-chlorophenyl)-3-hydroxy-2-oxocyclohexyl)carbamate.

Furthermore, in the context of the present invention it is more preferably if a modification, in particular alkylation, of the 2-amino group or optionally 6-hydroxy group is carried out, which is explained in the example of the synthesis of 2-(2-chlorophenyl)-2-(dimethylamino)-6-methoxycyclohexanone under point 4.2.

4.1. Specific Example for the 6-hydroxylation of Cyclic 2-amino-1-one Derivatives To a solution of 920 mg tert-butyl (2-oxo-1-phenylcyclohexyl) carbamate (2.85 mmol, 1.0 eq) in 15 ml anhydrous THF, add 3.7 ml lithium diisopropylamide (2 M solution in THF, 7.40 mmol, 2.6 eq) at −78° C. under a nitrogen atmosphere dropwise within 7 minutes. The solution is stirred at −78° C. for 1 hour, then warmed to room temperature for 5 minutes, then cooled back to −78° C. At this temperature, 942 µl of trimethylsilyl chloride (7.40 mmol, 2.6 eq.) is added and stirred for another 30 minutes at −78° C. and then warmed to room temperature within 1 hour.

The reaction is terminated by the addition of 10 ml of saturated NH$_4$Cl solution, the aqueous phase is extracted with ethyl acetate (3×10 ml), the combined organic phases are washed with saturated NaCl solution, dried over Na$_2$SO$_4$, filtered, and the solvent is removed under reduced pressure, whereupon a yellowish oil is isolated as crude product.

To a solution of this crude product in 15 ml of CH$_2$Cl$_2$, 539 mg of meta-chloroperbenzoic acid (3.13 mmol, 1.1 eq.) is added at −15° C. and stirred at this temperature for 1 hour. The reaction mixture is then warmed to room temperature, diluted with 15 ml of CH$_2$Cl$_2$, and mixed with 10 ml of a 1:1 mixture of saturated Na$_2$S$_2$O$_3$ and saturated NaHCO$_3$ solution. The aqueous phase is extracted with CH$_2$Cl$_2$ (3×10 ml), the combined organic phases are washed with saturated NaCl solution, dried over Na$_2$SO$_4$, filtered and concentrated in vacuo.

The residue obtained is dissolved in 15 ml THF, added to a solution of 1.08 g TBAF·3H$_2$O (3.42 mmol, 1.2 eq.) in 3.42 ml THF at −5° C. and stirred for 10 min at this temperature. Then 7 ml of saturated NaHCO$_3$ solution is added, the aqueous phase is extracted with ethyl acetate (3×10 ml), the combined organic phases are dried over Na$_2$SO$_4$, filtered, and removing the solvent in vacuo. The residue is purified by column chromatography on silica gel with an ethyl acetate gradient against cyclohexane (0→60%). 523 mg of tert-butyl (1-(2-chlorophenyl)-3-hydroxy-2-oxocyclohexyl) carbamate is obtained as a yellowish resin (1.54 mmol, 36%).

4.2. Specific Example for the Synthesis of 2-(2-chlorophenyl)-2-(dimethylamino)-6-methoxycyclohexanone To 200 mg of tert-butyl (1-(2-chlorophenyl)-3-hydroxy-2-oxocyclohexyl) carbamate (0.59 mmol, 1.00 eq.) dissolved in 4 ml of THF, 684 mg of silver(I) oxide (2.95 mmol, 5.00 eq.), 403 µl of methyl iodide (6.47 mmol, 11.00 eq.) and 176 mg of powdered activated molecular sieve 4 Å are added under a nitrogen atmosphere. The suspension is heated to 40° C. for 6 hours.

The solid is then removed using a syringe filter and the filtrate is concentrated in vacuo. The residue is purified by column chromatography on silica gel (0→15% ethyl acetate versus cyclohexane). 180 mg of tert-butyl (1-(2-chlorophenyl)-3-methoxy-2-oxocyclohexyl) carbamate is obtained as a colorless solid (0.51 mmol, 86%).

Next, 37 mg of tert-butyl (1-(2-chlorophenyl)-3-methoxy-2-oxocyclohexyl) carbamate (0.11 mmol, 1.00 eq.) is dissolved in 1 ml of CH$_2$Cl$_2$ and 81 µl of trifluoroacetic acid (1.10 mmol, 10.00 eq.) is added. The solution is stirred at room temperature for 4.5 hours and then the solvent is removed under reduced pressure.

The residue is dissolved in 1 ml of water and mixed with 1 ml of a 1:1 mixture of saturated NaHCO$_3$ and saturated K$_2$CO$_3$ solution. The aqueous phase is extracted with ethyl acetate (3×3 ml), the combined organic phases are dried over Na$_2$SO$_4$, filtered and the solvent removed in vacuo. 29 mg of 2-amino-2-(2-chlorophenyl)-6-methoxycyclohexanone is obtained as a cloudy yellowish oil (0.11 mmol, 99%).

In a separate setup, to a solution of 47 mg of 2-amino-2-(2-chlorophenyl)-6-methoxycyclohexanone (0.19 mmol, 1.00 eq.) and 139 µl of an aqueous 37% formaldehyde solution (1.85 mmol, 10.00 eq.), 37 mg of sodium cyanoborohydride (0.59 mmol, 3.20 eq.) dissolved in 1 ml of acetonitrile is added and stirred for 15 min at room temperature. The pH is checked regularly and adjusted to pH 7 with conc. acetic acid. The reaction solution is stirred at room temperature for 1 hour.

Then the solvent is removed in vacuo and the residue is taken up in 5 ml of a saturated NaHCO$_3$ solution. The aqueous phase is extracted with CH$_2$Cl$_2$ (3×3 ml), the combined organic phases are dried over Na$_2$SO$_4$, filtered and the filtrate is freed from the solvent in vacuo. The residue is purified by column chromatography on silica gel (0→60% ethyl acetate versus cyclohexane). 36 mg of 2-(2-chlorophenyl)-2-(dimethylamino)-6-methoxycyclohexanone is obtained (0.13 mmol, 69%).

4.3. Specific Example for the Synthesis of rac-(2R, 6R)-2-amino-6-hydroxy-2-phenylcyclohexanone from tert-butyl (2-oxo-1-phenylcyclohexyl) carbamate Under a nitrogen atmosphere, 1.4 ml of triethylsilane (8.76 mmol, 29.21 eq.) is mixed with 12 drops of a 2% solution of a platinum(0)-1,3-divinyl-1,1,3,3-tetramethyldisiloxane complex in xylene and stirred for 15 minutes at room temperature. A solution of 87 mg (0.30 mmol, 1.00 eq.) tert-butyl (2-oxo-1-phenylcyclohexyl) carbamate in 2.8 ml THF is then added dropwise and stirred at room temperature for 21 hours. The initially yellowish solution turns greenish brown as the reaction proceeds. The reaction solution is then concentrated under reduced pressure and purified by column chromatography on silica gel with an ethyl acetate gradient against cyclohexane (0→10%). 112 mg of the corresponding silylenolether (0.28 mmol, 93%) is isolated as a gray-brown oil and further reacted directly.

For this purpose, 112 mg (0.28 mmol, 1.00 eq.) of the silylenolether is dissolved in 2.52 ml of dichloromethane under a nitrogen atmosphere and cooled to −15° C. At this temperature, 90 mg of meta-chloroperbenzoic acid (5.52 mmol, 1.90 eq.) is added and the reaction mixture is stirred for 2 hours. Then 2 ml of a saturated Na$_2$SO$_3$ solution is added and the aqueous phase is extracted with dichloromethane (3×5 ml). The combined organic phases are washed with a saturated NaCl solution, dried over Na$_2$SO$_4$ and removing the solvent under reduced pressure.

The residue is dissolved in 2.75 ml THF and 550 µl of a 1 M solution of tetrabutylammonium fluoride in THF (0.55 mmol, 2.00 eq.) is added. The reaction mixture is stirred for 2 h at room temperature and then 2 ml of a saturated NaHCO$_3$ solution and 2 ml of dichloromethane are added. The organic phase is separated and the aqueous phase is extracted twice more with dichloromethane (2×2 ml). The combined organic phases are dried over Na$_2$SO$_4$, filtered and the solvent is removed under reduced pressure. The residue is purified by column chromatography on silica gel (0→20% ethyl acetate vs cyclohexane). 42 mg rac-tert-butyl((1R,3R)-3-hydroxy-2-oxo-1-phenylcyclohexyl)carbamate (0.14 mmol, 50%) is isolated as a colorless oil.

The obtained 42 mg (0.14 mmol, 1.00 eq.) rac-tert-butyl ((1R,3R)-3-hydroxy-2-oxo-1-phenylcyclohexyl)carbamate are dissolved in 1.4 ml dichloromethane and 106 µl (1.40 mmol, 10.00 eq.) trifluoroacetic acid is added to the solution. After stirring for 6 hours at room temperature, the solvent is removed using a rotary evaporator and the residue is reacted with 3 ml of a 1:1 mixture of saturated Na$_2$CO$_3$ and saturated NaHCO$_3$ solution. The aqueous phase is extracted with dichloromethane (3×5 ml), the combined organic phases are dried over Na$_2$SO$_4$, filtered and the solvent is removed under reduced pressure. 28 mg rac-(2R,6R)-2-amino-6-hydroxy-2-phenylcyclohexanone (0.14 mmol, 98%) is obtained as a yellow solid.

4.4. Overview and Characterization of the Prepared Further Modified Cyclic 2-amino-1-one Derivatives The following table gives an overview of the modified cyclic 2-amino-1-one derivatives prepared according to the invention and the yields obtained in each case.

| product | characterization |
|---|---|
| (structure: 2-amino-6-hydroxy-2-phenylcyclohexan-1-one)<br>yield: 85% | ¹H-NMR (400 MHz, CDCl₃): δ [ppm] = 7.42-7.37 (m, 2H, H9/H11), 7.34-7.30 (m, 1H, H10), 7.24-7.19 (m, 2H, H8/H12), 4.22 (dd, ³J = 12.1, 7.0 Hz, 1H, H6), 2.93-2.88 (m, 1H, H3A), 2.39-2.30 (m, 1H, H5A), 1.83-1.67 (m, 3H, H3B/H4), 1.60-1.50 (m, 1H, H5B).<br>¹³C-NMR (101 MHz, CDCl₃): δ [ppm] = 214.0 (s, 1C, C1), 140.5 (s, 1C, C7), 129.6 (d, 2C, C9/C11), 128.3 (d, 1C, C10), 126.1 (d, 2C, C8/C12), 73.7 (d, 1C, C6), 66.5 (s, 1C, C2), 39.3 (t, 1C, C3), 37.6 (t, 1C, C5), 19.3 (t, 1C, C4). |
| (structure: Boc-protected amino methoxy chlorophenyl cyclohexanone)<br>yield: 86% | ¹H-NMR (400 MHz, CDCl₃): δ [ppm] = 7.81 (d, ³J = 7.9 Hz, 1H, H12), 7.40-7.34 (m, 2H, H9/H10), 7.32-7.27 (m, 1H, H11), 6.70 (s, 1H, NH), 3.83 (d, ³J = 14.7 Hz, 1H, H3A), 3.76 (dd, ³J = 11.9, 6.3 Hz, 1H, H6), 3.40 (s, 3H, H18), 2.34-2.25 (m, 1H, H5A), 1.86-1.79 (m, 2H, H4), 1.72-1.61 (m, 2H, H3B/H5B), 1.32 (s, 9H, H15-17).<br>¹³C NMR (101 MHz, CDCl₃): δ [ppm] = 206.9 (s, 1C, C1), 153.3 (s, 1C, C13), 134.6 (s, 1C, C7), 133.6 (s, 1C, C8), 131.5 (d, 1C, C12), 131.0 (d, 1C, C9), 129.5 (d, 1C, C11), 126.4 (d, 1C, C10), 81.1 (d, 1C, C6), 79.2 (s, 1C, C14), 67.2 (s, 1C, C2), 57.7 (q, 1C, C18), 38.8 (t, 1C, C3), 37.2 (t, 1C, C5), 28.3 (q, 3C, C15-17), 19.8 (t, 1C, C4). |
| (structure: 2-amino-6-methoxy-2-(2-chlorophenyl)cyclohexan-1-one)<br>yield: 99% | ¹H NMR (400 MHz, CDCl₃): δ [ppm] = 7.59 (d, ³J = 8.0, 1H, H12), 7.37-7.30 (m, 2H, H9/H11), 7.26 (t, ³J = 7.5, 1H, H10), 3.77 (dd, ³J = 11.5, 6.4 Hz, 1H, H6), 3.36 (s, 3H, H13), 2.88 (d, ³J = 14.5, 1H, H3A), 2.24-2.15 (m, 1H, H5A), 1.75-1.66 (m, 2H, H4), 1.64-1.52 (m, 2H, H3B, H5B).<br>¹³C NMR (101 MHz, CDCl₃): δ [ppm] = 210.4 (s, 1C, C1), 136.8 (s, 1C, C7), 133.5 (s, 1C, C8), 131.4 (d, 1C, C9), 130.1 (d, 1C, C9), 129.2 (d, 1C, 12), 127.7 (d, 1C, C11), 82.0 (d, 1C, C6), 67.6 (s, 1C, C2), 57.7 (q, 1C, C13), 40.9 (t, 1C, C3), 36.5 (t, 1C, C5), 19.4 (t, 1C, C4). |
| (structure: 2-(methylamino)-6-methoxy-2-(2-chlorophenyl)cyclohexan-1-one)<br>yield: 17% | ¹H NMR (400 MHz, CDCl₃): δ [ppm] = 7.56-7.46 (m, 1H, H12), 7.45-7.28 (m, 3H, H9-11), 3.92-3.77 (m, 1H, H6), 3.43 (s, 3H, H13), 3.03 (d, ³J = 14.3, 1H, H3A), 2.32-2.25 (m, 1H, H5A), 2.05 (s, 3H, H14), 1.77-1.58 (m, 4H, H3B/H4/H5B).<br>¹³C NMR (101 MHz, CDCl₃): δ [ppm] = 209.2 (s, 1C, C1), 135.6 (s, 1C, C7), 134.2 (s, 1C, C8), 131.6 (d, 1C, C9), 129.9 (d, 1C, C12), 129.4 (d, 1C, C10), 126.8 (d, 1C, C11), 82.2 (d, 1C, C6), 71.2 (s, 1C, C2), 57.7 (q, 1C, C13), 38.3 (t, 1C, C3), 36.6 (t, 1C, C5), 28.6 (q, 1C, C14), 19.5 (t, 1C, C4). |
| (structure: 2-(dimethylamino)-6-methoxy-2-(2-chlorophenyl)cyclohexan-1-one)<br>yield: 69% | ¹H NMR (400 MHz, CDCl₃): δ [ppm] = 7.47 (dd, J = 7.8, 1.4 Hz, 1H), 7.43-7.38 (m, 2H), 7.34 (ddd, J = 7.8, 6.3, 2.6 Hz, 1H), 3.97 (dd, J = 11.6, 6.4 Hz, 1H), 3.48 (s, 3H), 3.02 (dq, J = 13.9, 2.9 Hz, 1H), 2.23 (s, 6H), 1.81-1.72 (m, 2H), 1.67-1.40 (m, 3H).<br>¹³C NMR (101 MHz, CDCl₃): δ [ppm] = 207.8, 135.0, 131.7, 131.6, 130.3, 129.5, 126.9, 83.0, 75.3, 57.4, 39.4, 37.8, 36.0, 19.2. |
| (structure: 2-(dimethylamino)-6-hydroxy-2-(2-chlorophenyl)cyclohexan-1-one)<br>yield: 45% | ¹H NMR (400 MHz, CDCl₃): δ [ppm] = 7.47-7.43 (m, 1H), 7.43-7.37 (m, 2H), 7.35-7.30 (m, 1H), 4.31 (dd, J = 11.2, 6.7 Hz, 1H, H6), 3.10-3.00 (m, 1H, H3A), 2.35-2.28 (m, 1H, H5A), 2.25 (s, 6H, H13-14), 1.79-1.66 (m, 2H, H3B/H4A), 1.49-1.39 (m, 2H, H4B/H5B).<br>¹³C NMR (101 MHz, CDCl₃): δ [ppm] = 211.9 (s, 1C, C1), 135.5 (s, 1C, C8), 131.6 (d, 1C), 131.2 (s, 1C, C7), 129.9 (d, 1C), 129.6 (d, 1C), 126.9 (d, 1C), 74.7 (d, 1C, C6), 74.7 (s, 1C, C2), 39.8 (t, 1C, C5), 39.2 (q, 2C, C13-14), 38.6 (t, 1C, C3), 19.1 (t, 1C, C4). |

| product | characterization |
|---|---|
| 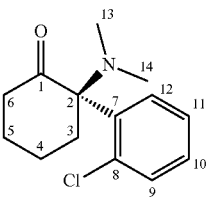<br>yield: 70% | ¹H NMR (400 MHz, CDCl₃): δ [ppm] = 7.45-7.40 (m, 2H), 7.37 (t, ³J = 8.1, 1H), 7.31-7.25 (t, ³J = 7.5 Hz, 1H), 2.95 (d, J = 14.3 Hz, 1H), 2.68-2.58 (m, 1H), 2.54-2.44 (m, 1H), 2.28 (s, 6H, H13/H14), 2.03-1.91 (m, 1H), 1.90-1.70 (m, 3H), 1.60-1.48 (m, 1H).<br>¹³C NMR (101 MHz, CDCl₃): δ [ppm] = 210.0 (s, 1C, C1), 134.8 (s, 1C), 133.8 (s, 1C), 131.5 (d, 1C), 129.9 (d, 1C), 128.9 (d, 1C), 126.5 (d, 1C), 74.5 (s, 1C, C2), 41.9 (t, 1C), 39.3 (q, 2C), 38.4 (t, 1C), 29.3 (t, 1C), 22.3 (t, 1C). |
| 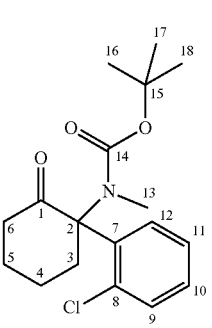<br>yield: 78% | ¹H NMR (400 MHz, CDCl₃): δ [ppm] = 7.45-7.41 (m, 1H), 7.25-7.17 (m, 2H), 6.91-6.87 (m, 1H), 3.42-3.30 (m, 1H), 3.02 (s, 3H, H13), 2.81-2.69 (m, 1H), 2.53-2.45 (m, 1H), 2.25-2.16 (m, 1H), 2.11-2.01 (m, 1H), 1.92-1.80 (m, 1H), 1.80-1.71 (m, 2H), 1.40 (s, 9H, H16-18).<br>¹³C NMR (101 MHz, CDCl₃): δ [ppm] = 201.3 (s, 1C, C1), 156.3 (s, 1C, C14), 135.3 (s, 1C), 134.7 (s, 1C), 132.8 (d, 1C), 128.7 (d, 1C), 128.4 (d, 1C), 126.5 (d, 1C), 75.0 (s, 1C, C2), 40.0 (t, 1C), 34.4 (t, 1C), 31.4 (q, 1C, C13), 28.1 (q, 3C, C16-18), 27.8 (t, 1C), 22.0 (t, 1C). |
| 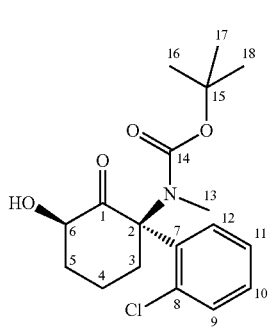<br>yield: 30% | ¹H NMR (400 MHz, CDCl₃): δ [ppm] = 7.46-7.35 (m, 2H), 7.35-7.22 (m, 2H), 4.37 (dd, ³J = 11.8, 6.9 Hz, 1H, H6), 3.89 (br, 1H, OH), 3.25-3.14 (m, 1H, H3A), 2.84-2.77 (m, 1H, H3B), 2.74 (s, 3H, H13), 2.35-2.26 (m, 1H, H5A), 1.84-1.65 (m, 2H, H4A/H5B), 1.49-1.43 (m, 1H, H4B), 1.40 (s, 9H, H16-18).<br>¹³C NMR (101 MHz, CDCl₃): δ [ppm] = 205.8 (s, 1C, C1), 156.0 (s, 1C, C14), 135.7 (s, 1C, C7), 134.5 (s, 1C, C8), 132.6 (d, 1C), 131.8 (d, 1C), 129.6 (d, 1C), 126.8 (d, 1C), 80.5 (s, 1C, C15), 75.4 (d, 1C, C6), 74.5 (s, 1C, C2), 36.4 (t, 1C, C5), 35.7 (t, 1C, C3), 33.6 (q, 1C, C13), 28.4 (q, 3C, C16-18), 19.6 (t, 1C, C4). |
| 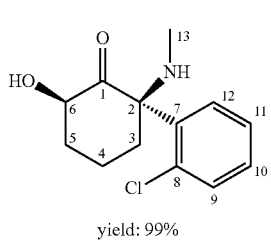 [SMILES: CN[C@@]1(c2ccccc2Cl)CCC[C@@H](O)C1=O]<br>yield: 99% | ¹H NMR (400 MHz, CDCl₃): δ [ppm] = 7.51 (d, ³J = 7.9, 1H, H12), 7.42-7.35 (m, 2H), 7.32-7.28 (m, 1H), 4.20 (dd, J = 11.6, 6.7 Hz, 1H, H6), 3.08-3.02 (m, 1H, H3A), 2.44-2.31 (m, 1H, H5A), 2.09 (s, 3H, H13), 1.79-1.71 (m, 1H, H4A), 1.68-1.54 (m, 2H, H3B/H4B), 1.53-1.42 (m, 1H, H5B).<br>¹³C NMR (101 MHz, CDCl₃): δ [ppm] = 212.5 (s, 1C, C1), 135.2 (s, 1C, C7), 134.5 (s, 1C, C8), 131.6 (d, 1C), 129.8 (d, 1C), 129.5 (d, 1C), 126.9 (d, 1C), 73.7 (d, 1C, C6), 70.7 (s, 1C, C2), 39.9 (t, 1C, C5), 38.8 (t, 1C, C3), 28.6 (q, 1C, C13), 19.3 (t, 1C, C4). |
| 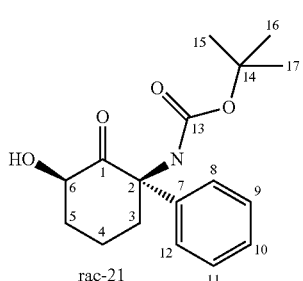<br>rac-21<br>yield: 50% | ¹H-NMR (400 MHz, CDCl₃): δ [ppm] = 7.40-7.35 (m, 2H, H9/H11), 7.33-7.27 (m, 3H, H8/H10/H12), 6.21 (s, 1H, NH), 4.07 (dd, ³J = 12.5, 6.7 Hz, 1H, H6), 3.69-3.51 (m, 1H, H3A), 2.38-2.37 (m, 1H, H5A), 2.13-1.93 (m, 1H, H3B), 1.91-1.79 (m, 2H, H4), 1.69-1.52 (m, 1H, H5B), 1.39-1.21 (m, 9H, H15-17).<br>¹³C-NMR (101 MHz, CDCl₃): δ [ppm] = 208.7 (s, 1C, C1), 129.0 (d, 1C, C10), 128.2 (d, 2C, C9/C11), 127.2 (d, 2C, C8/C12), 79.4 (s, 1C, C14), 72.7 (d, 1C, C6), 66.2 (s, 1C, C2), 37.3 (t, 1C, C5), 35.8 (t, 1C, C3), 28.3 (q, 3C, C15-17), 19.7 (t, 1C, C4). |

5. Demonstration of the Neuroregenerative Effect of Selected Cyclic 2-amino-1-one Derivatives on Neurons with Previously Reduced Neuronal or Synaptic Plasticity In order to investigate the potential neuroregenerative effect of the cyclic 2-amino-1-one derivatives of the invention, incubation experiments are performed on neurons of mouse embryos.

The cyclic 2-amino-1-one derivatives of the invention shown in FIG. 1 were used for this purpose.

Before the results of the incubation experiments are discussed in detail, a description of the set-up of the underlying incubation assay follows.

5.1. Incubation Assay Design and Experimental Procedure

Preparation of the Hippocampal Neuron Culture

A pregnant mouse is sacrificed by cervical dislocation and E17.5 embryos are collected.

To preserve the hippocampi of the embryos, the embryos are decapitated and the crania are opened with finely curved forceps. The skin and cranial bones are removed and the entire brain is dissected out of the skull. The brains are transferred under a stereomicroscope into 6 cm$^2$ cell culture dishes filled with approximately 5 ml of HBSS/HEPES buffer (0.7% HEPES).

The meninges are removed from the brain using two fine forceps and the hippocampi are dissected out and transferred to an Eppendorf tube containing approximately 1 ml of HBSS/HEPES buffer. The isolated hippocampi are then transferred to a 15 ml tube and the buffer removed. Trypsin (0.05% solution) is added (5 ml) and the tissue is incubated in a wash bath at 37° C. for 15 minutes. After incubation, the trypsin solution is removed again and the hippocampi are washed three times with HBSS/HEPES buffer and dissociated in 3 ml HBSS/HEPES by pipetting up and down with a glass Pasteur pipette.

Neurons are further isolated by pipetting up and down with a fire-polished Pasteur pipette at approximately half the original diameter. Cell density is determined using a hemocytometer, and neurons are plated at a density of 170,000 cells/6 cm$^2$ on 8 acid-treated and poly-Lysine-coated coverslips of 13 mm Ø in MEM (Minimum essential Medium Eagle: 1×MEM, 0.5% glucose, 0.2% NaHCO$_3$, 2 mM L-glutamine, 1×MEM essential amino acids, 2×MEM nonessential amino acids) together with 10% FCS (MEM-FCS).

24 hours after plating, coverslips containing neurons are transferred to 6 cm$^2$ dishes containing astrocytes at approximately 30-50% confluence, which had been equilibrated 24 hours earlier with N2 medium (1×MEM, 0.5% glucose, 0.2% pyruvic acid, 1× Neuropan 2 (PAN Biotech, p 07-11010)).

Finally, neurons were cultured at 37° C. in a 5% CO$_2$ incubator, wherein the N2 medium was changed once a week.

Astrocyte Culture

Astrocytes from E18.5 embryos are used as co-cultures for hippocampal neurons.

Brains are dissected as described for culturing hippocampal neurons. Instead of hippocampi, cortices are obtained from the embryos. The cortices are first treated in the same manner as the hippocampi.

Then, the dissociated cell suspension is resuspended in 10 ml MEM-FCS and plated on 75 cm$^2$ flasks (approximately 3 brains/flask). The astrocytes in the flasks are grown to 100% confluence and divided into 3 new flasks. For this purpose, the cells are washed with HBSS/HEPES buffer and incubated with a trypsin solution (0.05% trypsin) for 5-10 min at 37° C. before the cell suspension is evenly divided into 3 new flasks.

A 75 cm$^2$ flask containing 90-100% confluent astrocytes is spread on 30×6 cm$^2$ dishes as a co-culture for hippocampal neurons. Cells are then cultured at 37° C. in a 5% CO$_2$ incubator, wherein the medium is changed twice a week.

Drug Stimulation

After 21 days of cultivation, the cells are exposed to control (water), ketamine hydrochloride (Ket-H) as reference, and the cyclic 2-amino-1-one derivatives of the invention in the form of their respective hydrochlorides (HW-74, -182, -212, -252, 273) at concentrations of 0.5 µM, 1 µM, and 2 µM in water and incubated with them for 48 and 72 hours. Subsequently, cells are washed with HBSS/HEPES buffer and fixed with 4% paraformaldehyde in PBS buffer at 37° C. for 15 minutes.

Immunofluorescence Staining

Stimulated hippocampal neurons are stained in a humidity chamber. For this purpose, neurons are permeabilized with TBS/0.2% TritonX-100 solution (TBS-T) for 1 minute at room temperature and autofluorescence is quenched by incubation with ammonium chloride (50 mM) for 10 minutes at room temperature. Nonspecific binding sites are blocked by incubation with TBS-T/10% FCS solution at 4° C.

Neurons are incubated with primary antibodies (β-III-tubulin monoclonal mouse IgG1 (1:500, Promega, G7121); synaptobrevin 2/VAMP2 polyclonal rabbit antiserum (1:1000, Synaptic Systems, 104202)) at 4° C. in blocking solution. This is followed by washing by gently dipping three times in TBS-T and adding a drop of PBS.

Secondary antibodies (anti-mouse IgG-Atto488 (1:1000, Sigma-Aldrich, 62197; anti-rabbit IgG-Atto550 (1:1000, Sigma-Aldrich, 43328)) are then added to a blocking solution and incubated at room temperature for 2 hours, followed by washing in the same manner as described previously.

To stain the nuclei, the neurons are incubated with the DNA dye DAPI (10 ng/mL) diluted in PBS for 10 minutes at room temperature. Finally, the neurons are briefly washed with PBS before being transferred to a glass slide containing approximately 10 µl of Mowiol embedding medium per glass slide.

Analysis of the Density of the Neuronal Spine Structure.

Fluorescence images of the prepared neurons are taken with the Zeiss Axio Observer at 25× magnification. Analysis of the number of synaptic boutons is performed using ZEN software (Zeiss). Proximal dendrite segments of 40 µm are randomly selected (3 per neuron) and signal points for VAMP2 staining are detected using a preset intensity threshold. Results are expressed relative to the number of boutons obtained for the control (untreated) cells.

5.2. Results of the Incubation Assay

Figure 2:
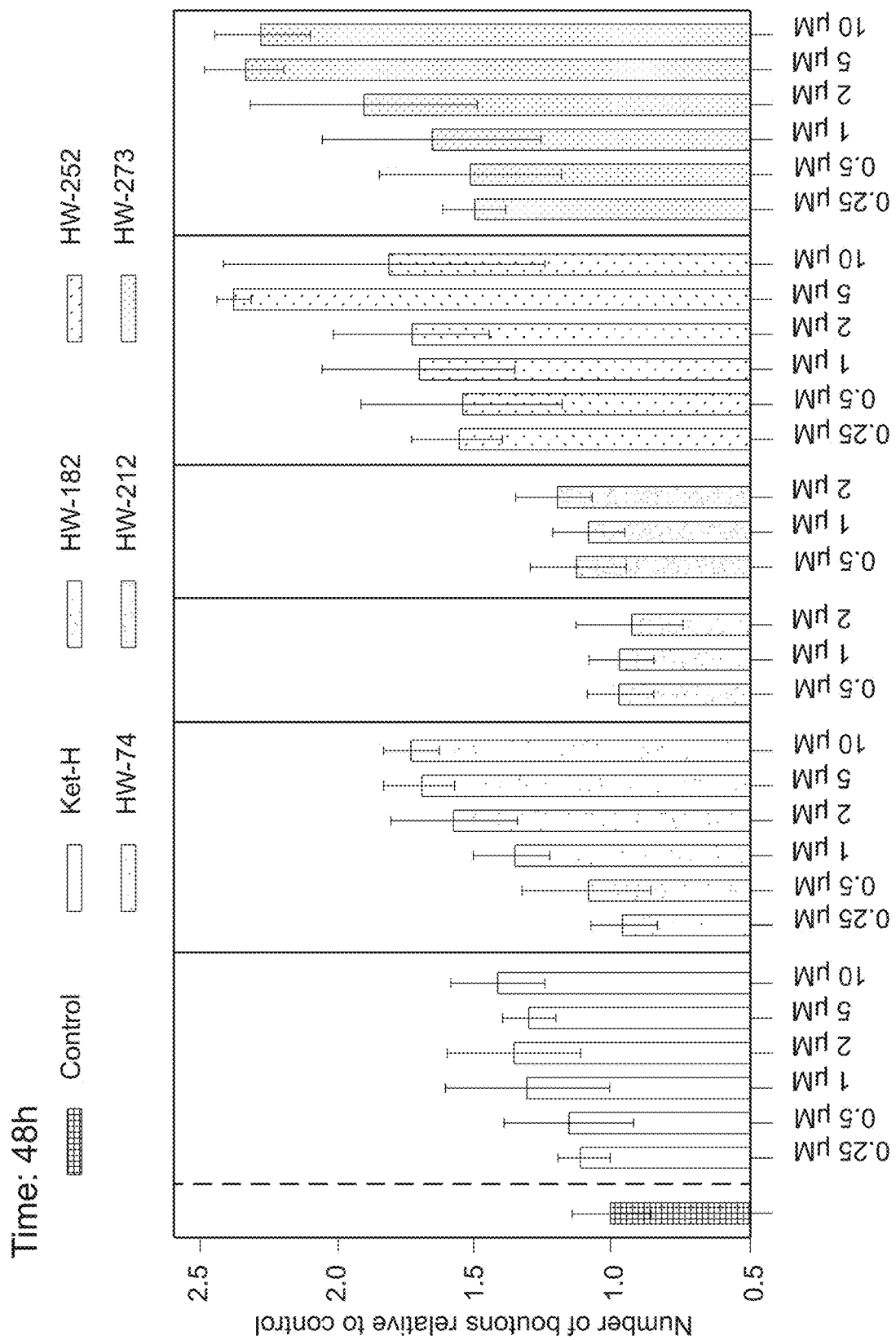
FIG. 2 is a graph showing the neuroregenerative effects of compounds HW-74, HW-182I HW-212I HW-ZSZI and HW-273 according to the invention observed within 48 hours after incubation of prepared neurons.
Figure 3:
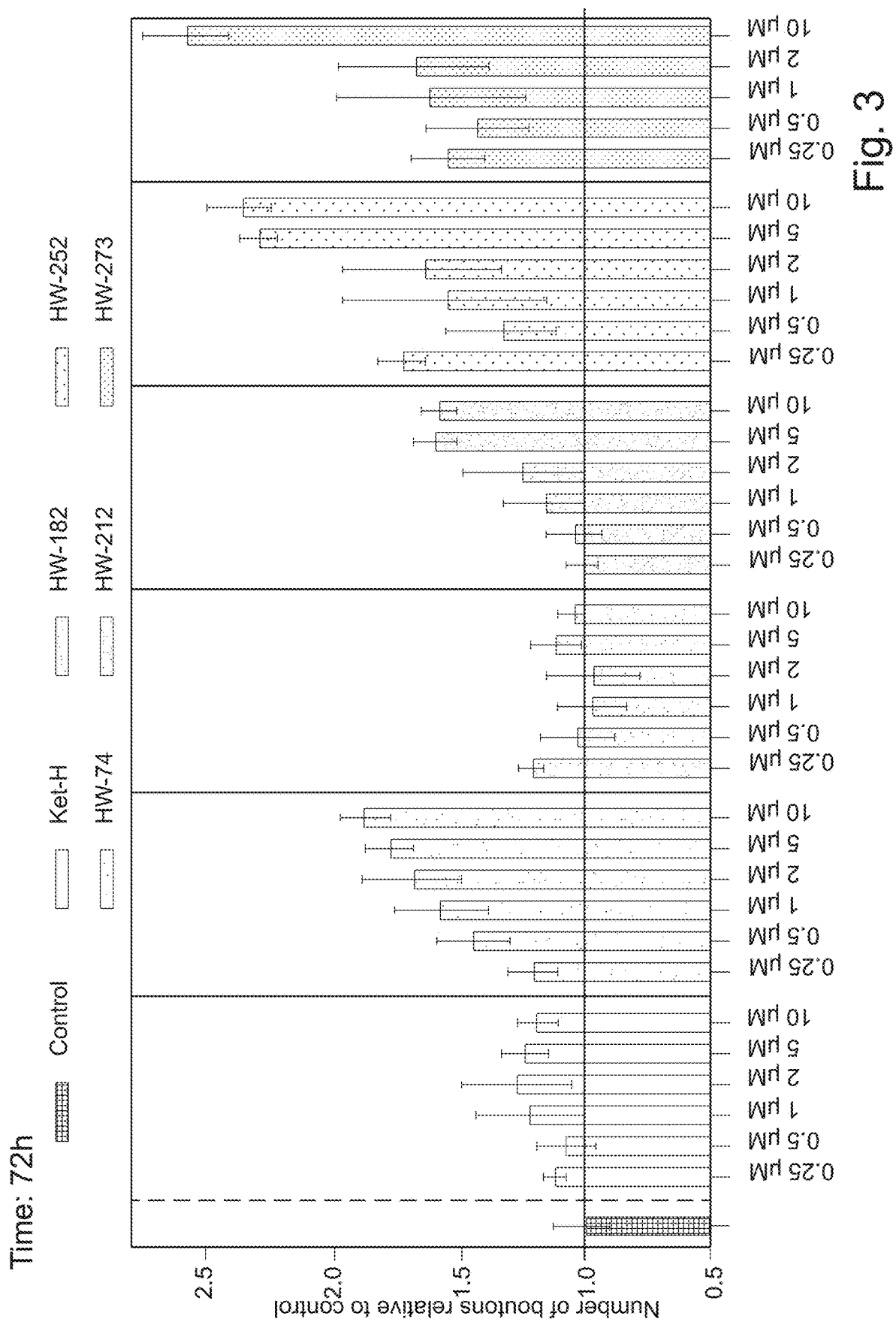
FIG. 3 is a graph showing the results of an incubation assav after 72 hours of incubation of prepared neurons with compounds HW-74, HW-182, HW-212, HW-ZSZ, and HW-273 according to the invention.
Figure 4:
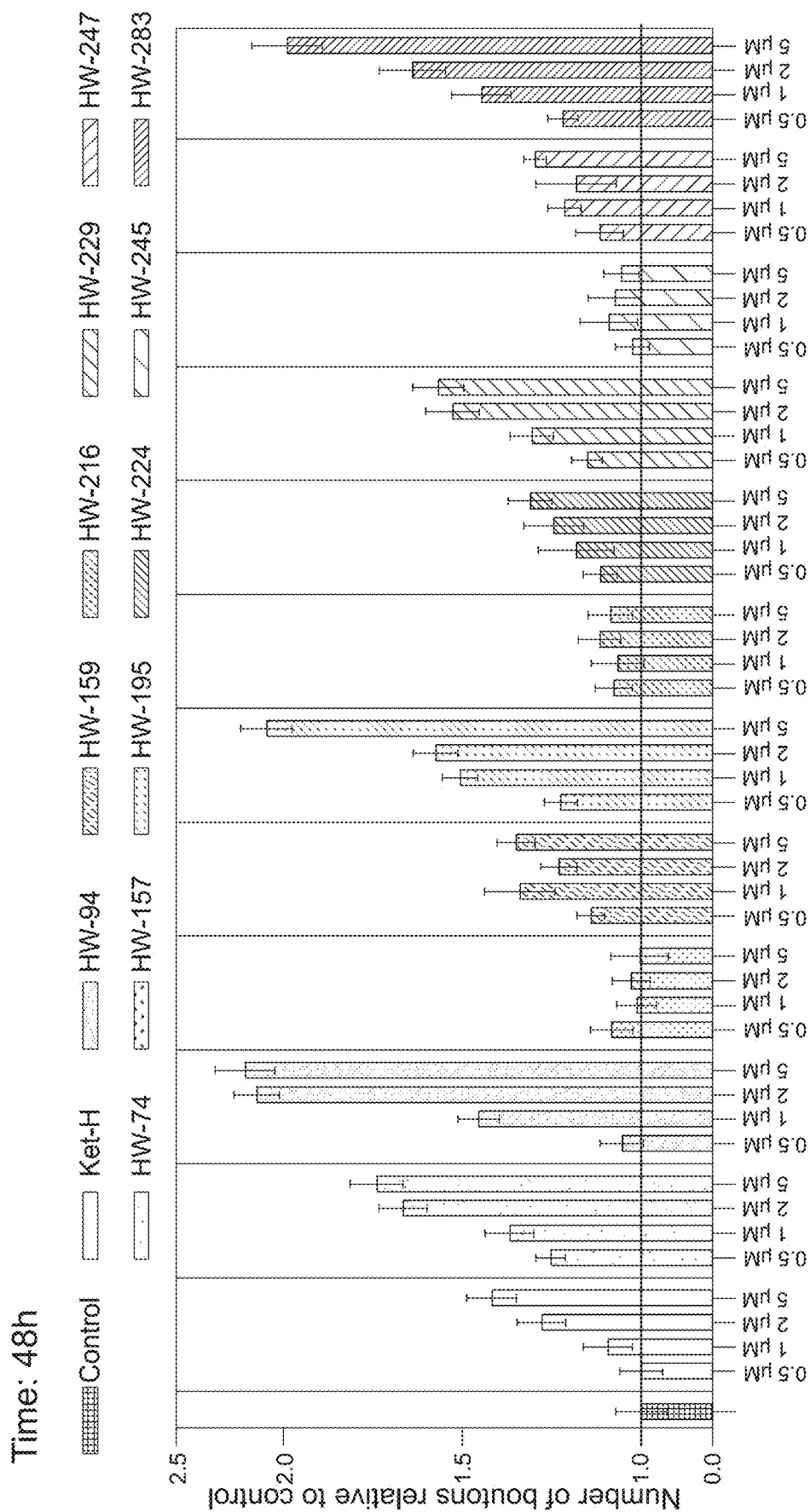
FIG. 4 is a graph showing the results of incubation assavs after 48 hours of incubation of prepared neurons with compounds HW-94, HW-157, HW-159, HW-195, HW-216, HW-224, HW-229, HW-245, HW-247, and HW-283 according to the invention.

An overview of the results of the incubation experiments with the aforementioned cyclic 2-amino-1-one derivatives according to the invention can be seen in FIGS. 2 to 4.

FIG. 2 gives an overview of the neuroregenerative effects of the compounds HW-74, HW-182, HW-212, HW-252 and HW-273 observed within 48 hours after incubation of the prepared neurons with the compounds according to the invention as well as the reference ketamine hydrochloride (Ket-H) and the control water.

Plotted here is the number of presynaptic boutons relative to the control against different concentrations (0.25 µM, 0.5

μM, 1 μM, 2 μM, 5 μM, and 10 μM) of the cyclic 2-amino-1-one derivatives of the invention and Ket-H, respectively.

For almost all compounds, except HW-182, a concentration-dependent increase in the formation of presynaptic boutons is observed. Here, the derivative HW-212 causes a moderate increase in the number of presynaptic boutons compared to the control. In particular for the compounds HW-252 and HW-273 a significantly increased production of presynaptic boutons can be observed, which in particular correlates with a high neuroregenerative potential. In this context, it is particularly noteworthy that the efficacy of the derivatives HW-252 and HW-273 clearly exceeds that of the parent compound Ket-H, so that a comparatively advantageous and significant improvement in the active properties and molecular structure can be assumed here.

FIG. 3 shows the results of the incubation assay after 72 hours of incubation of the prepared neurons with the aforementioned compounds according to the invention as well as the reference ketamine hydrochloride (Ket-H) and the control water.

In comparison with the results shown in FIG. 2, it can be seen that the compounds according to the invention, in particular the derivatives HW-252 and HW-273, have a significant neuroregenerative effect in the long term, even at low doses, and effectively stimulate the formation of new presynaptic boutons.

Moreover, the results confirm that the compounds according to the invention are in principle long-term effective in that they can induce the new formation of presynaptic boutons in a sustained manner.

Furthermore, FIG. 4 shows the results of incubation assays after 48 hours of incubation with compounds HW-94, HW-157, HW-159, HW-195, HW-216, HW-224, HW-229, HW-245, HW-247, and HW-283, again using ketamine hydrochloride (Ket-H) as a reference and water as a control. The aforementioned compounds have been used at concentrations of 0.5 μM, 1 μM, 2 μM and 5 μM. The methoxy-substituted derivatives HW-94, HW-195 and HW-283 were found to be comparatively most effective in the incubation assay, inducing significantly increased production of presynaptic boutons. Overall, it has also been observed that the effect of the compounds of the invention is particularly pronounced in the period of 48 hours and persists beyond that time and gradually decreases.

Figure 5:
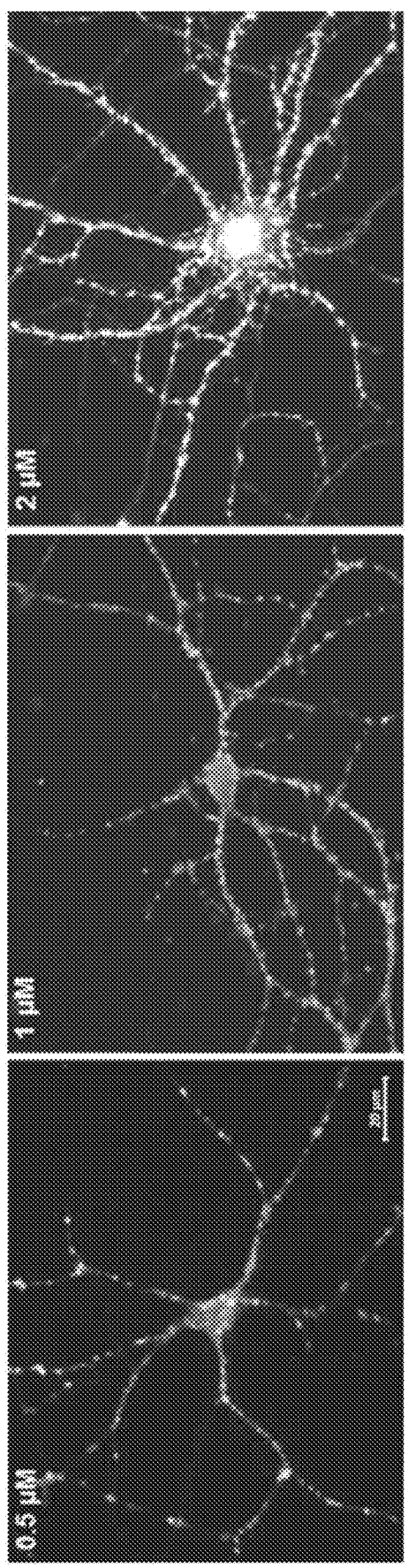
FIG. 5 is a series of fluorescence microscopic images of prepared neurons after incubation with compound HW-273 according to the invention at three different concentrations over a period of 72 hours.

Finally, FIG. 5 shows fluorescence microscopic images of prepared neurons after incubation with the derivative HW-273 at three different concentrations and over a period of 72 hours.

The images again clearly demonstrate a concentration-dependent, positive effect of the compound of the invention on the regeneration of neurons. Noteworthy here is in particular the strongly pronounced configuration of presynaptic boutons along the neurites of the neurons and, above all, the intensive sprouting of the neurons in response to the addition of HW-273. A comparable effect is not known or has not yet been observed, in particular for the comparative or parent compounds Ket-H and hydroxynorketamine. Thus, the derivatives according to the invention achieve a previously unknown action potential, which in particular also goes far beyond the mode of action of the underlying parent compounds.

With regard to the molecular structure of the most potent derivatives according to the invention, HW-252 and HW-273, it can finally be deduced that, first of all, in particular a low electron density at the aryl substituent has an advantageous effect on the action potential of the compounds according to the invention. Likewise, it is in particular advantageous if residues, for example alkyl residues, are introduced which increase the lipophilicity of the functional groups, in particular the 2-amino group and optionally 6-hydroxy group.

In this context, the process according to the invention now offers the decisive advantage that the beneficial structural elements mentioned in each case can all be introduced within the scope of the present invention without any problems or complications and can also be varied in a multitude of ways. Thus, the process according to the invention demonstrably allows access to a wide range of promising potential new active substances for the treatment of neurodegenerative diseases based on cyclic 2-amino-1-ketones.

The invention claimed is:

1. A process for preparing a cyclic 2-amino-1-one derivative, comprising:
    converting an aromatic acrylic acid derivative into a cyclic 3-ene-2-oxy-1-carboxylic acid derivative via a cyclization reaction, wherein:
    the cyclization reaction is a [4+2]cycloaddition; and
    the aromatic acrylic acid derivative is a compound of general formula I:

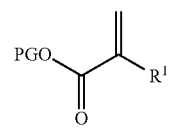

I wherein,
$R^1$ is aryl or heteroaryl; and
PG is a protecting group.

2. The process of claim 1, wherein the cyclic 2-amino-1-one derivative is selected from a 2-aminocyclohexan-1-one derivative and a 2-aminocyclohexen-1-one derivative.

3. The process of claim 1, wherein the aromatic acrylic acid derivative is converted into the cyclic 3-ene-2-oxy-1-carboxylic acid derivative by reaction with a 1,3-butadienol derivative.

4. The process of claim 1, wherein the cyclic 3-ene-2-oxy-1-carboxylic acid derivative is a compound of general formula IX:

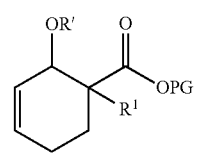

IX wherein:
$R^1$ is aryl or heteroaryl, and
when $R^1$ is aryl, $R^1$ is selected from a naphthyl, anthracyl, phenanthryl or aryl residue of general formula II:

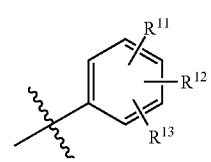

II wherein $R^{11}$, $R^{12}$ and $R^{13}$ are each independently selected from:

H, $NH_2$, OH, SH, F, Cl, Br, $NO_2$, $C_1$-$C_x$-monoalkylamino, $C_1$-$C_x$-dialkylamino, $C_1$-$C_x$-alkoxy, $C_1$-$C_x$-alkylsulfanyl, $C_1$-$C_x$-alkyl, $C_1$-$C_x$-perfluoroalkoxy, $C_1$-$C_x$-perfluoroalkyl; —COOH, —$CONH_2$, —COSH, —CHO; —COO($C_1$-$C_x$-alkyl), —CONH($C_1$-$C_x$-alkyl), —COS($C_1$-$C_x$-alkyl), —C(O)($C_1$-$C_x$-alkyl), phenyl, and naphthyl, and x is 2 to 20;

when $R^1$ is heteroaryl, $R^1$ is selected from:

pyrryolyl, imidazyl, pyrazoyl, oxazyl, isoxazyl, thiazoyl, furyl, thienyl residues and substituted derivatives thereof, or pyridyl, pyrazyl, pyridazyl, pyrimidyl residues and substituted derivatives thereof;

PG is selected from benzyl, para-methoxybenzyl, dimethoxybenzyl, alkyloxycarbonyl, triphenylmethyl, alkyl, and allyl groups; and R' is selected from trimethylsilyl, triethylsilyl, triisopropylsilyl, tert-butyldimethylsilyl, triphenylsily, and tert-butyldiphenylsilyl.

5. The process of claim 1, further comprising:
converting the cyclic 3-ene-2-oxy-1-carboxylic acid derivative into a bicyclic carbamate derivative.

6. The process of claim 1, wherein during the converting of the cyclic 3-ene-2-oxy-1-carboxylic acid derivative, the double bond of the cyclohexene is functionalized, generating a compound of general formula XII:

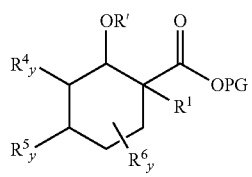

XII wherein:

$R^4$, $R^5$, and $R^6$ are each independently selected from H, $NH_2$, OH, SH, F, Cl, Br, $NO_2$, $C_1$-$C_x$-monoalkylamino, $C_1$-$C_x$-dialkylamino, $C_1$-$C_x$-alkoxy, $C_1$-$C_x$-alkylsulfanyl, $C_1$-$C_x$-alkyl, $C_1$-$C_x$-perfluoroalkoxy, $C_1$-$C_x$-perfluoroalkyl, —COOH, —$CONH_2$, —COSH, —CHO, —COO($C_1$-$C_x$-alkyl), —CONH($C_1$-$C_x$-alkyl), —COS($C_1$-$C_x$-alkyl), and —C(O)($C_1$-$C_x$-alkyl);

x is 2 to 20; and y is 0 or 1, with the proviso that y is 1 for at least one of $R^4$, $R^5$, or $R^6$.

7. The process of claim 5, wherein the bicyclic carbamate derivative is a compound of general formula XIII:

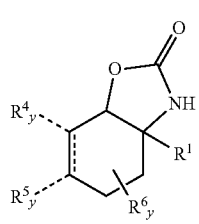

XIII wherein:

$R^1$ is aryl or heteroaryl, and when $R^1$ is aryl, $R^1$ is selected from a naphthyl, anthracyl, phenanthryl or aryl residue of general formula II:

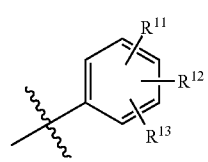

II wherein $R^{11}$, $R^{12}$ and $R^{13}$ are each independently selected from:

H, $NH_2$, OH, SH, F, Cl, Br, $NO_2$, $C_1$-$C_x$-monoalkylamino, $C_1$-$C_x$-dialkylamino, $C_1$-$C_x$-alkoxy, $C_1$-$C_x$-alkylsulfanyl, $C_1$-$C_x$-alkyl, $C_1$-$C_x$-perfluoroalkoxy, $C_1$-$C_x$-perfluoroalkyl; —COOH, —$CONH_2$, —COSH, —CHO; —COO($C_1$-$C_x$-alkyl), —CONH($C_1$-$C_x$-alkyl), —COS($C_1$-$C_x$-alkyl), —C(O)($C_1$-$C_x$-alkyl), phenyl, and naphthyl;

when $R^1$ is heteroaryl, $R^1$ is selected from:

pyrryolyl, imidazyl, pyrazoyl, oxazyl, isoxazyl, thiazoyl, furyl, thienyl residues and substituted derivatives thereof, or pyridyl, pyrazyl, pyridazyl, pyrimidyl residues and substituted derivatives thereof;

$R^2$ and $R^3$ are each independently selected from H, $C_1$-$C_x$-alkyl, and $C_1$-$C_x$-cycloalkyl;

$R^4$, $R^5$, and $R^6$ are each independently selected from H, $NH_2$, OH, SH, F, Cl, Br, $NO_2$, $C_1$-$C_x$-monoalkylamino, $C_1$-$C_x$-dialkylamino, $C_1$-$C_x$-alkoxy, $C_1$-$C_x$-alkylsulfanyl, $C_1$-$C_x$-alkyl, $C_1$-$C_x$-perfluoroalkoxy, $C_1$-$C_x$-perfluoroalkyl, —COOH, —$CONH_2$, —COSH, —CHO, —COO($C_1$-$C_x$-alkyl), —CONH($C_1$-$C_x$-alkyl), —COS($C_1$-$C_x$-alkyl), and —C(O)($C_1$-$C_x$-alkyl);

x is 2 to 20; and y is 0 or 1.

8. The process of claim 5, further comprising converting the bicyclic carbamate derivative into the cyclic 2-amino-1-one derivative, wherein the cyclic 2-amino-1-one derivative is selected from a 2-aminocyclohexan-1-one derivative and a 2-aminocyclohexen-1-one derivative.

9. The process of claim 1, wherein the cyclic 2-amino-1-one derivative is a compound of general formula XVII:

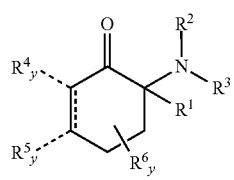

XVII wherein:

$R^1$ is aryl or heteroaryl, and when $R^1$ is aryl, $R^1$ is selected from a naphthyl, anthracyl, phenanthryl or aryl residue of general formula II:

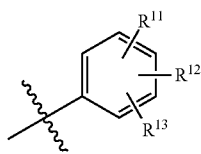

II wherein $R^{11}$, $R^{12}$ and $R^{13}$ are each independently selected from:

H, $NH_2$, OH, SH, F, Cl, Br, $NO_2$, $C_1$-$C_x$-monoalkylamino, $C_1$-$C_x$-dialkylamino, $C_1$-$C_x$-alkoxy, $C_1$-$C_x$-alkylsulfanyl, $C_1$-$C_x$-alkyl, $C_1$-$C_x$-perfluoroalkoxy, $C_1$-$C_x$-perfluoroalkyl; —COOH, —$CONH_2$, —COSH, —CHO; —COO($C_1$-$C_x$-alkyl), —CONH($C_1$-$C_x$-alkyl), —COS($C_1$-$C_x$-alkyl), —C(O)($C_1$-$C_x$-alkyl), phenyl, and naphthyl;

when $R^1$ is heteroaryl, $R^1$ is selected from:
pyrryolyl, imidazyl, pyrazoyl, oxazyl, isoxazyl, thiazoyl, furyl, thienyl residues and substituted derivatives thereof, or pyridyl, pyrazyl, pyridazyl, pyrimidyl residues and substituted derivatives thereof;

$R^2$ and $R^3$ are each independently selected from H, $C_1$-$C_x$-alkyl, and $C_1$-$C_x$-cycloalkyl, or $R^2$ and $R^3$ together form a pyrrolidyl, piperidyl, imidazyl, or pyridyl ring, or a substituted derivative thereof;

$R^4$, $R^5$, and $R^6$ are each independently selected from H, $NH_2$, OH, SH, F, Cl, Br, $NO_2$, $C_1$-$C_x$-monoalkylamino, $C_1$-$C_x$-dialkylamino, $C_1$-$C_x$-alkoxy, $C_1$-$C_x$-alkylsulfanyl, $C_1$-$C_x$-alkyl, $C_1$-$C_x$-perfluoroalkoxy, $C_1$-$C_x$-perfluoroalkyl, —COOH, —$CONH_2$, —COSH, —CHO, —COO($C_1$-$C_x$-alkyl), —CONH($C_1$-$C_x$-alkyl), —COS($C_1$-$C_x$-alkyl), and —C(O)($C_1$-$C_x$-alkyl);

x is 2 to 20; and
y is 0 or 1.

* * * * *